(12) United States Patent
Suzuki

(10) Patent No.: US 7,363,636 B2
(45) Date of Patent: Apr. 22, 2008

(54) DISK RECORDING AND/OR REPRODUCING APPARATUS WITH A DISK TRANSPORT

(75) Inventor: Yoshiaki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 11/154,581

(22) Filed: Jun. 17, 2005

(65) Prior Publication Data

US 2005/0223399 A1 Oct. 6, 2005

Related U.S. Application Data

(62) Division of application No. 10/296,233, filed as application No. PCT/JP02/03459 on Apr. 5, 2002.

(30) Foreign Application Priority Data

| Apr. 5, 2001 | (JP) | ............................. 2001-107506 |
| May 11, 2001 | (JP) | ............................. 2001-142183 |

(51) Int. Cl.
*G11B 33/02* (2006.01)

(52) U.S. Cl. .................................................... 720/647
(58) Field of Classification Search ................ 720/646, 720/647
See application file for complete search history.

(56) References Cited

U.S. PATENT DOCUMENTS

| 4,682,320 A | 7/1987 | d'Alayer de Costemore d'Arc |
| 5,978,339 A * | 11/1999 | Sasaki et al. ................ 720/646 |
| 6,363,045 B2 * | 3/2002 | Sato ............................ 720/647 |
| 6,377,451 B1 * | 4/2002 | Furuya ........................ 361/686 |
| 6,411,583 B1 * | 6/2002 | Yamamoto et al. ......... 720/647 |
| 6,910,217 B2 * | 6/2005 | Kan-o .......................... 720/646 |
| 2002/0044517 A1 | 4/2002 | Kan-o |
| 2003/0016612 A1 * | 1/2003 | Lin ............................ 369/75.1 |

FOREIGN PATENT DOCUMENTS

| EP | 0 742 558 A2 | 11/1996 |
| EP | 0 991-067 A2 | 4/2000 |
| JP | 61-210556 | 9/1986 |
| JP | 11-120658 | 4/1999 |
| JP | 11-328799 | 11/1999 |

\* cited by examiner

*Primary Examiner*—Brian E. Miller
(74) *Attorney, Agent, or Firm*—Oblon, Spivak, McClelland, Maier & Neustadt, P.C.

(57) ABSTRACT

A disk recording and/or reproducing apparatus includes a housing with a disk entrance and exit slot into and from which a disk is inserted and ejected, a gate on the housing so as to cover the disk entrance and exit slot, and a disk transport mechanism for transporting the disk to pass the disk entrance and exit slot. The gate member includes a gate cover closing the disk entrance and exit slot and which has a recess slot through which the disk passes. A mechanism is provided for changing resistance force of a recess slot peripheral edge portion that contacts the disk when the disk passes the recess slot in response to the direction in which the disk passes the recess slot.

11 Claims, 49 Drawing Sheets

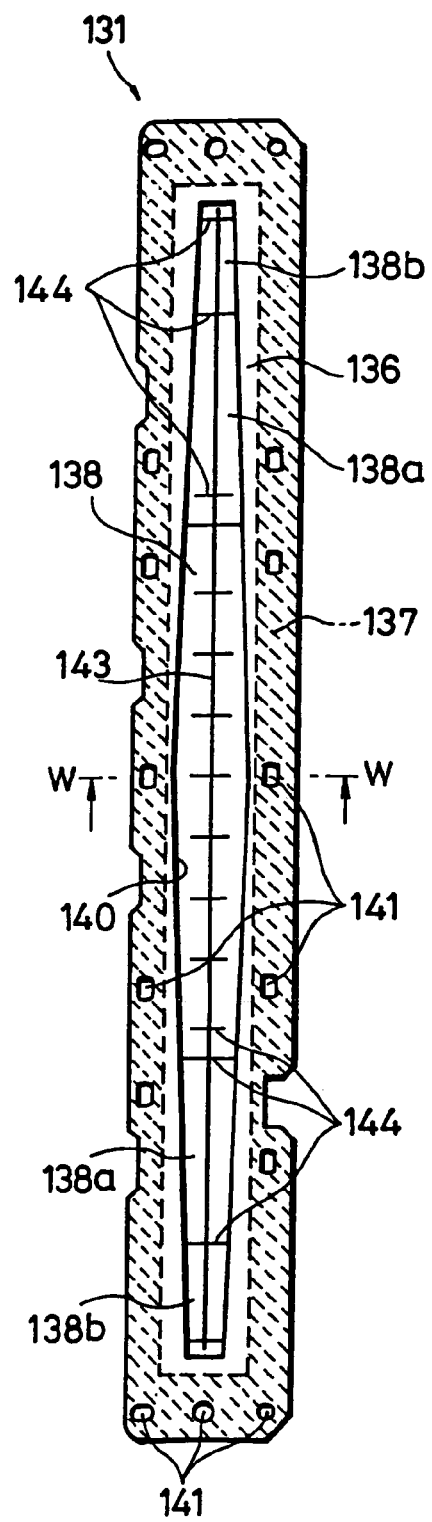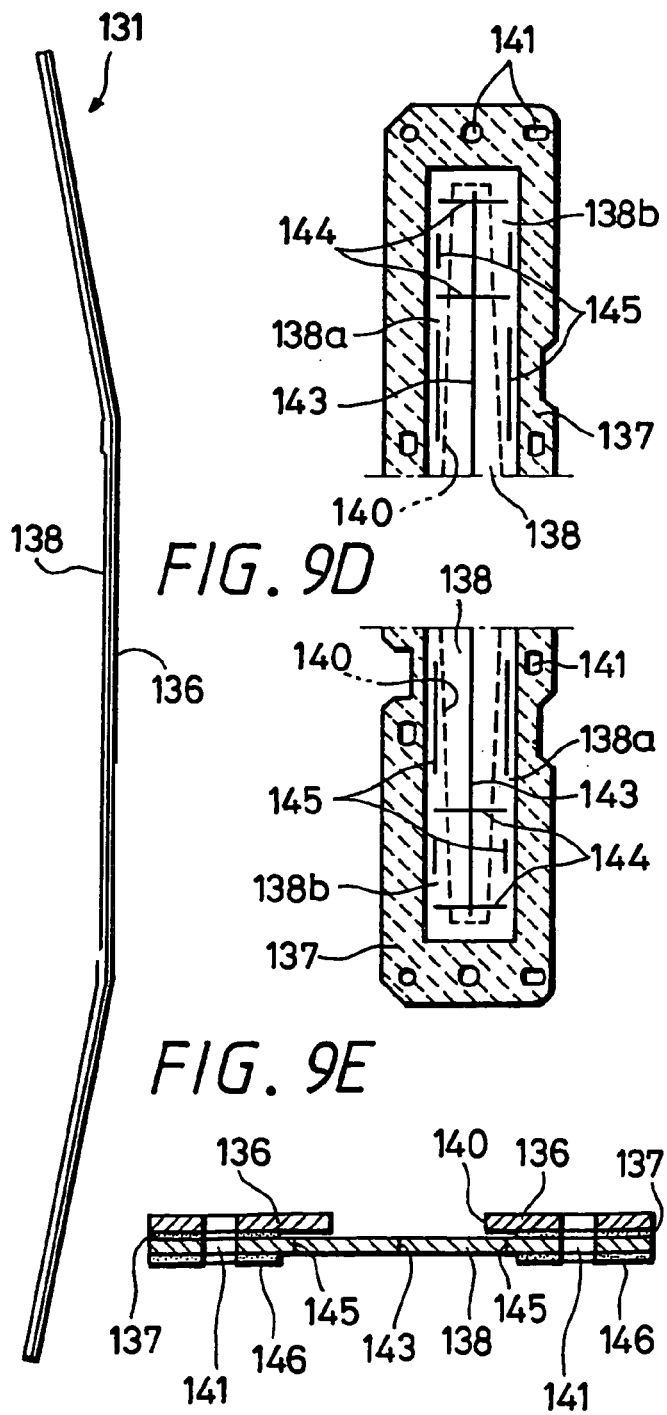
FIG. 9A  FIG. 9B  FIG. 9C  FIG. 9D  FIG. 9E

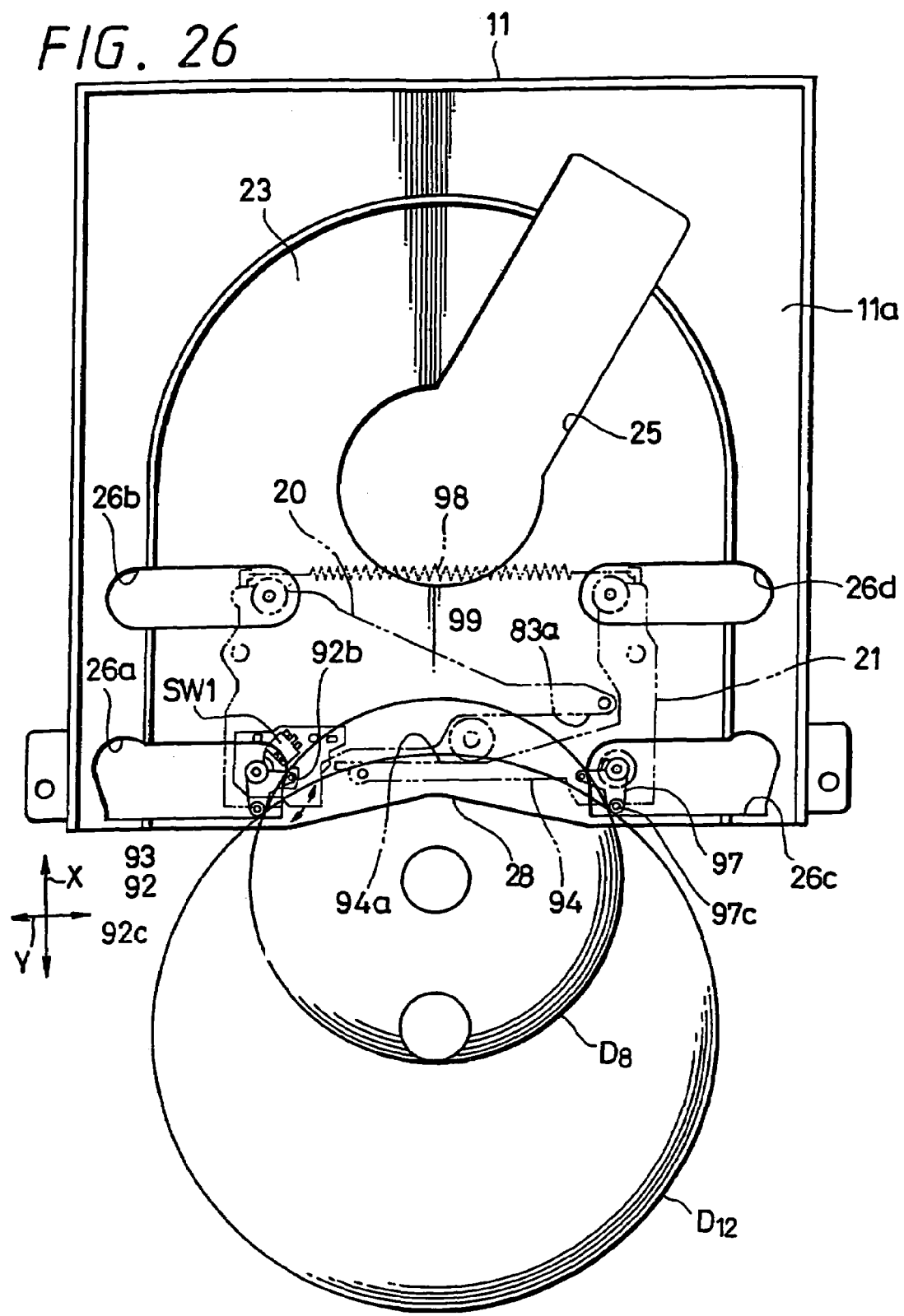

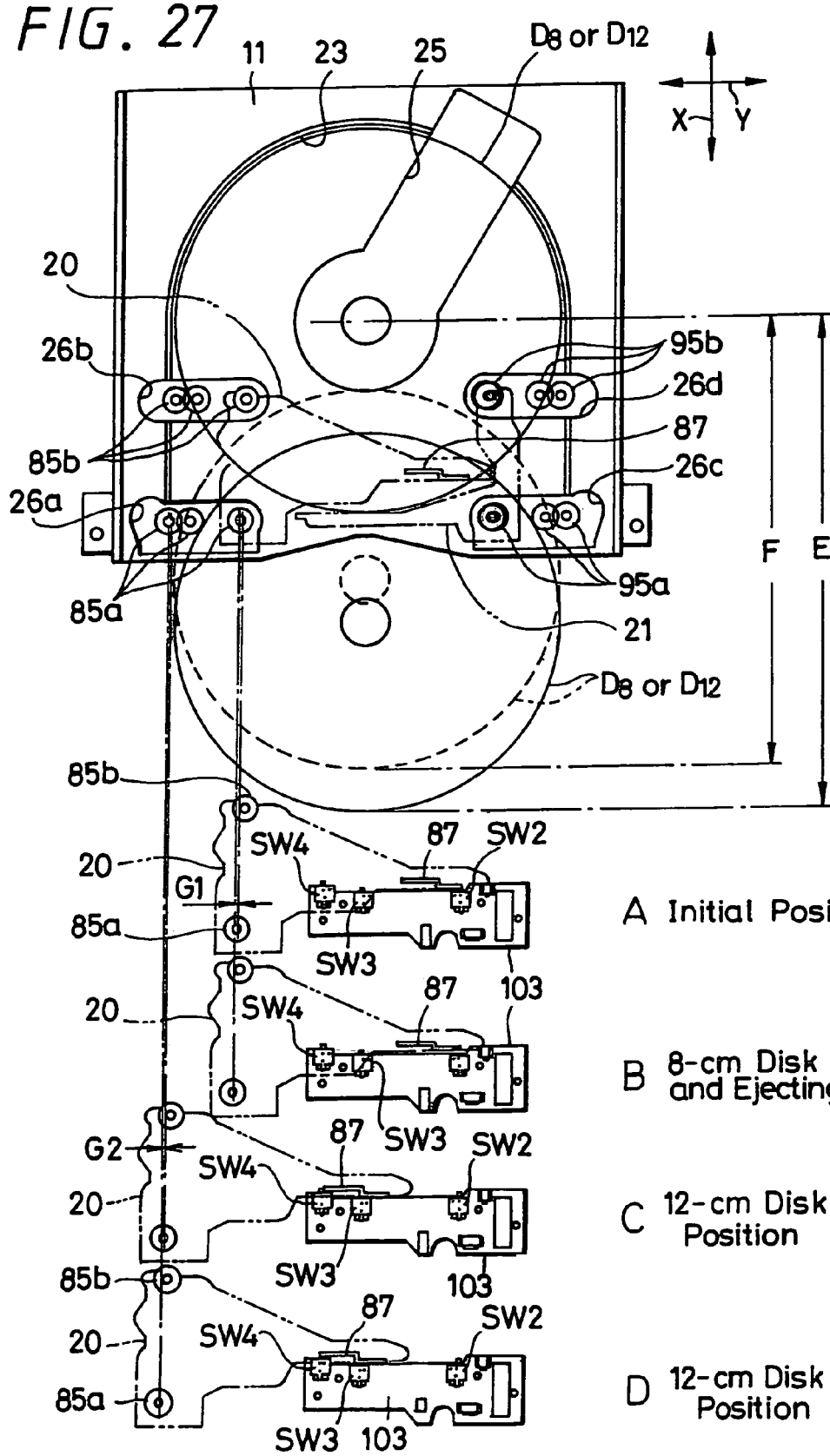

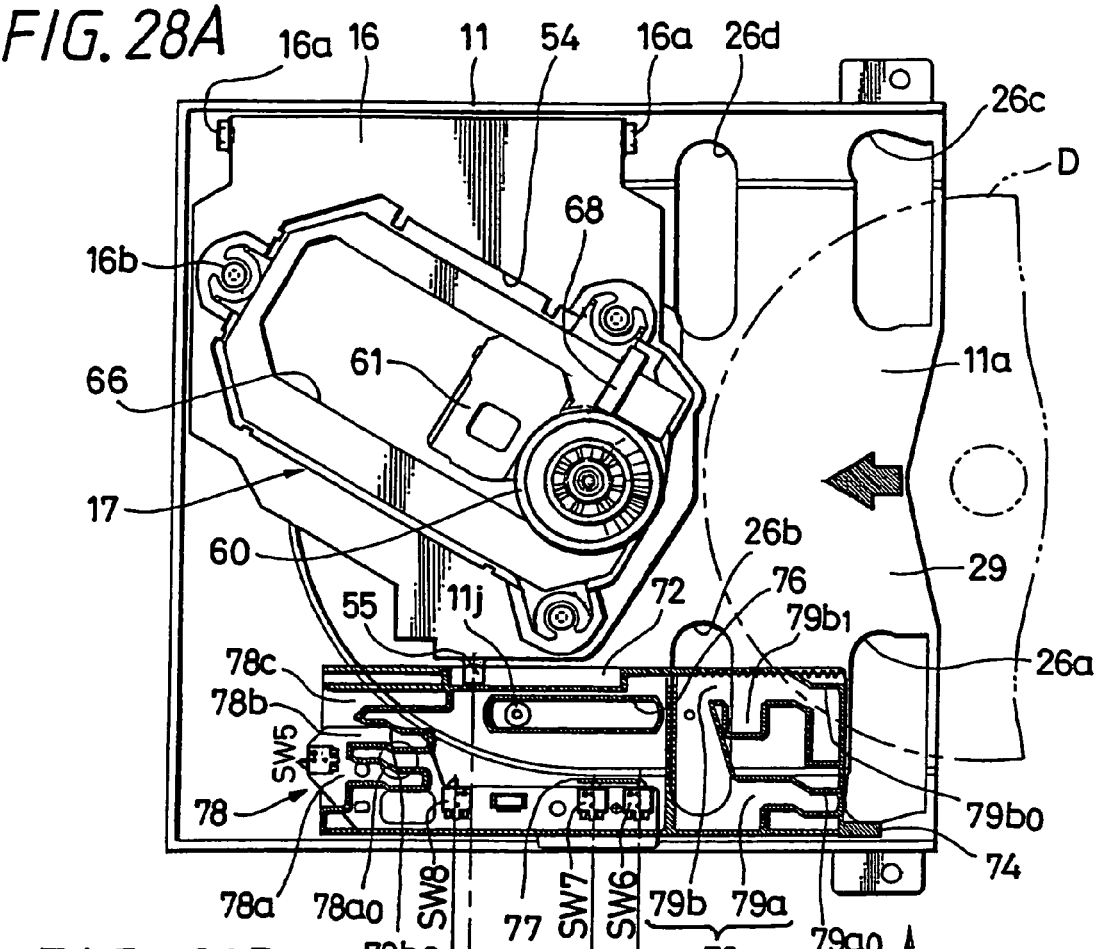
FIG. 28A
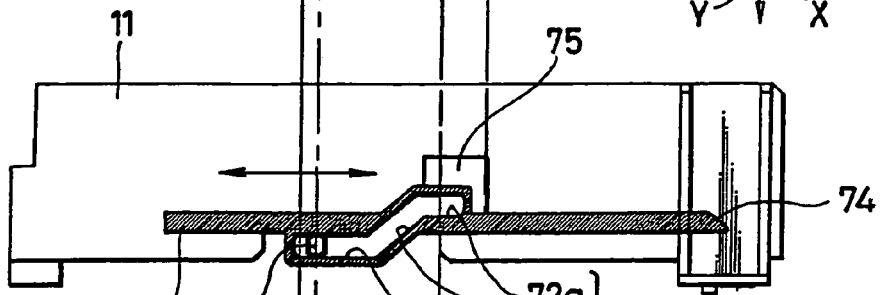
FIG. 28B
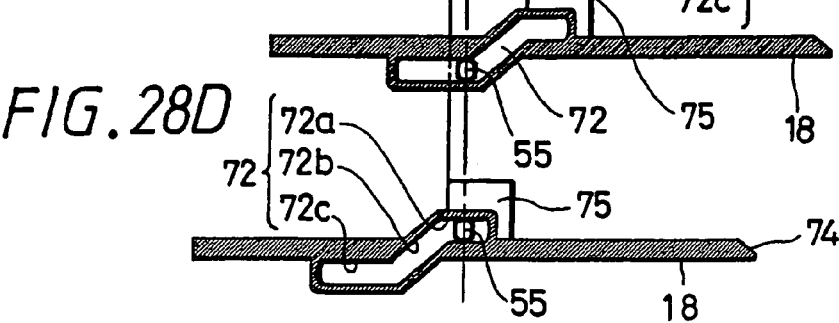
FIG. 28C
FIG. 28D

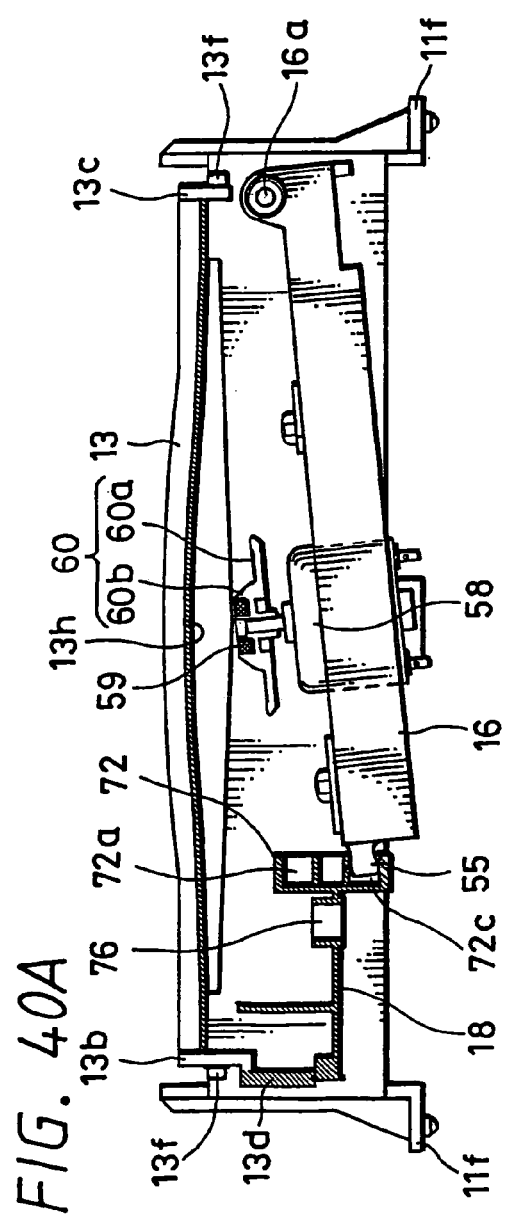
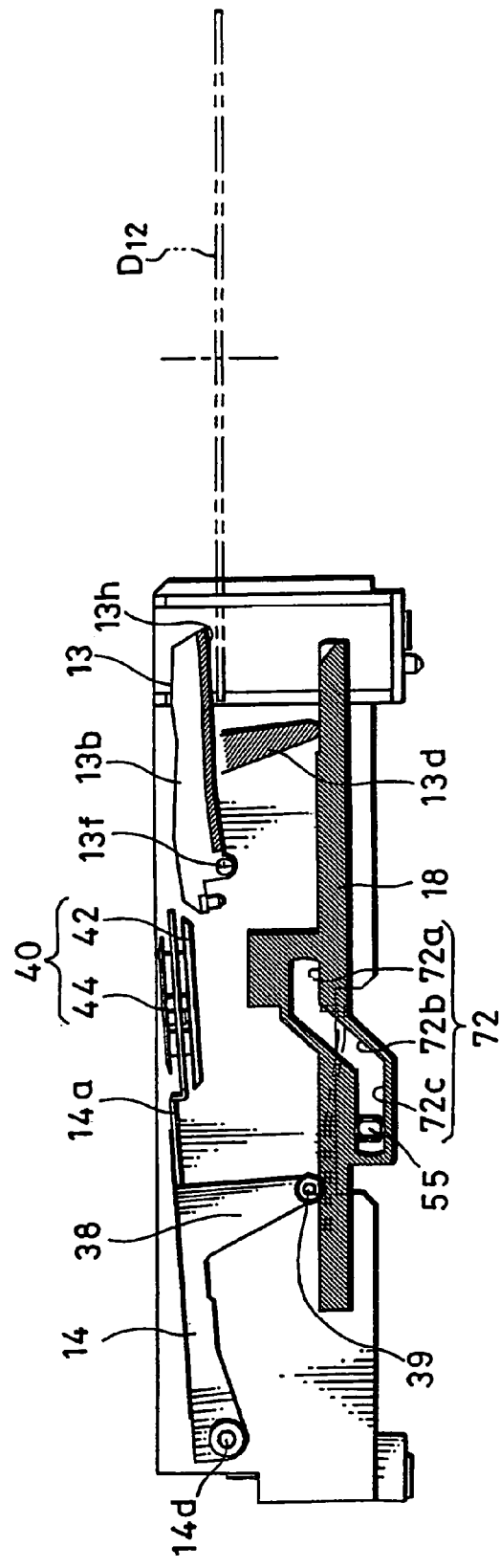
FIG. 40A
FIG. 40B

FIG. 49

Optical Disk (8cm Disk)

Loading of Disk (LOAD) | Ejection of Disk (EJECT)

| No. | Items to Be Detected |
|---|---|
| SW1 | Insertion of Disks(Both of 8cm-Disk, 12cm-Disk) |
| SW2 | Completion of Loading And Ejection of 8cm-Disk |
| SW3 | Completion of Ejection of 12cm-Disk |
| SW4 | Completion of Loading of 12cm-Disk |

| No. | Items to Be Detected |
|---|---|
| SW5 | Existence of Disk |
| SW6 | Chucking-Off of Disk |
| SW7 | Transport Direction of Disk |
| SW8 | Chucking-On of Disk |

DISK RECORDING AND/OR REPRODUCING APPARATUS WITH A DISK TRANSPORT

CROSS REFERENCE TO RELATED APPLICATION

This application is a divisional of application Ser. No. 10/296,233, filed May 5, 2003, the entire contents of which are incorporated herein by reference.

TECHNICAL FIELD

The present invention relates to a disk recording and/or reproducing apparatus in which a disk-like recording medium such as an optical disk and a magneto-optical disk is transported between a disk loading portion for recording and/or reproducing information and a disk entrance and exit slot into and from which this disk-like recording medium is inserted and ejected.

Further, the present invention relates to a disk recording and/or reproducing apparatus having a slot-in system disk loading mechanism by which a disk-like recording medium is inserted into and ejected from the disk recording and/or reproducing apparatus through a disk entrance and exit slot.

BACKGROUND ART

Disk recording and/or reproducing apparatuses have hitherto been provided to record and/or reproduce information signals from disk-like recording mediums generally called optical disks such as a CD (compact disc) or a CD-Rom (CD-read-only memory) or a magneto-optical disk (OD: optical magnetic disk).

This disk recording and/or reproducing apparatus comprises a disk rotation mechanism for rotating a turntable to spin a disk-like recording medium thereon, an optical pickup device for writing and reading an information signal on and from the disk-like recording medium that is being rotated by this disk rotation mechanism, a disk transport mechanism for transporting the disk-like recording medium between a disk loading unit with the turntable within a main chassis that houses the disk rotation mechanism and the disk entrance and exit slot and the like.

As the disk recording and/or reproducing apparatus having such arrangement, there is known such a disk recording and/or reproducing apparatus as described in Japanese laid-open patent application No. 10-340513, for example. FIG. 53 of the present application shows a schematic arrangement of such disk recording and/or reproducing apparatus. In FIG. 53, reference numeral 1 generally denotes a disk recording and reproducing apparatus. This disk recording and reproducing apparatus 1 has a housing 2 with a front surface in which there is formed an oblong slit-like disk entrance and exit slot 2a. Information is recorded on and reproduced from an optical disk D, which is a disk-like recording medium inserted into and ejected from this disk entrance and exit slot 2a, by the disk recording and reproducing apparatus 1.

In order to insert and eject the optical disk D into and from this disk recording and reproducing apparatus 1, a disk transport mechanism 4 is provided at the inside of the disk entrance and exit slot 2a of the housing 2. The disk transport mechanism is composed of a transport roller 5 for applying force to the optical disk D so that the optical disk may be inserted into and ejected from the disk recording and reproducing apparatus, a guide member 6 provided above the transport roller 5 in an opposing relation and the like. The transport roller 5 is formed as a hand drum-like roller member with a narrow central portion made of a material such as synthetic rubber having a relatively large friction coefficient. The guide member 6 serves to guide the optical disk D to a turntable and is made of a material such as synthetic resin having a small friction coefficient.

The guide member 6 has an arc-like groove portion 6a formed on its surface opposing the transport roller 5 to face the outer peripheral surface of the transport roller 5. Further, the surface on which thee guide member 6 has the groove portion 6a is formed as an arc-like guide surface 6b in which an intermediate portion is recessed in the longitudinal direction. Then, the transport roller 5 is constantly biased to the side of the guide member 6 by spring force of a spring, not shown. The optical disk D is inserted into the space between the transport roller 5 and the guide member 6. The optical disk D held by the transport roller and the guide member from the upper and lower directions is transported to the disk loading portion provided within the housing 2 or to the disk entrance and exit slot 2a provided outside the housing 2 in response to its rotational direction as the transport roller 5 rotates.

In this case, when the optical disk D is inserted into the disk recording and reproducing apparatus from the disk entrance and exit slot 2a of the housing 2, the transport roller 5 is rotated by a motor, not shown, to sandwich the optical disk D between it and the guide member. At that time, a gap formed between the transport roller 5 and the guide member 6 is barrel-like space whose width increases in its central portion and whose width decreases at the respective ends thereof. Therefore, outer peripheral edges of the upper and lower surfaces of the optical disk D are constantly brought in contact with the transport roller 5 and the guide member 6, and the optical disk D is transported by friction force generated in this contact portions. Then, when the center hole d of the optical disk D corresponds to the central portion of the turntable, a chucking arm, not shown, is lowered to make a chucking member overlap each other. At that time, the transport roller 5 is detached from the guide member 6 and lowered.

On the other hand, when a user selects the eject operation of the optical disk D by operating an eject button or the like, the transport roller 5 is elevated and spring-biased toward the guide member 6 by spring force of the spring. As a result, the optical disk D is sandwiched by the transport roller 5 and the guide member 6 from the upper and lower directions, and the optical disk D is released from being clamped to the turntable. Consequently, by rotation force of the transport roller 5, the optical disk D is transported to the side of the disk entrance and exit slot 2a and is placed in the state in which it can be ejected from the disk recording and reproducing apparatus.

However, in the disk recording and reproducing apparatus according to the prior art, since the hand drum-like transport roller 5 with the narrow central portion is made of the material such as the synthetic rubber having the relatively large friction coefficient and this transport roller 5 is urged against the guide member 6 by spring force, the surface of the transport roller 5 undergoes elastic deformation to thereby change into a cylindrical flat surface. This flat surface is brought into pressed contact with a signal recording surface of the optical disk D.

For this reason, when the optical disk D is inserted into the disk recording and reproducing apparatus under the condition that the signal recording surface is being attached with minute foreign objects (dusts, etc.), the foreign objects are pressed against and dragged along the signal recording surface by the transport roller 5 so that the signal recording surface is damaged. In consequence, when the signal recording surface is damaged, not only the signal recording surface looks like a considerably damaged signal surface but also a signal that was recorded before hand cannot be read out from the optical disk and a new information signal cannot be written on the optical disk.

In conventional disk recording and reproducing apparatuses, since the disk entrance and exit slot 2*a* into and from which the optical disk D is inserted and ejected is maintained while in the state of being opened, dusts tend to easily enter into the housing 2.

Further, since a disk transport mechanism 4 includes the transport roller 5 and the guide member 6 to sandwich the optical disk D and the optical disk D is transported to the disk surface direction by rotation force of the transport roller 5, the optical disk D can be held and transported by sufficiently large force. However, during the period in which the optical disk is passing the intermediate portion of the transport process, holding of the optical disk D becomes unstable. Thus, when the optical disk D is ejected from the disk entrance and exit slot, the optical disk D is disengaged from the disk transport mechanism 4 and the optical disk D will drop from the disk entrance and exit slot under its own weight.

In view of the problems encountered by the prior art, when the disk-like recording medium is inserted into and ejected from the disk recording and/or reproducing apparatus, a disk transport mechanism can be prevented from contacting with a signal recording surface of a disk-like recording medium so that the signal recording surface can be protected from being damaged and the disk transport mechanism side can contact with only the outer peripheral edge of a disk-like recording medium and can transport the disk-like recording medium. Further, it is an object of the present invention to provide a disk recording and/or reproducing apparatus in which resistance force generated when a disk-like recording medium is inserted into and ejected from the apparatus can be changed. Accordingly, when the disk-like recording medium is inserted into the apparatus, the disk-like recording medium can easily be inserted into the disk recording and/or reproducing apparatus. On the other hand, when the disk-like recording medium is ejected from the disk recording and/or reproducing apparatus, the disk-like recording medium that was ejected somewhere in the disk entrance and exit slot can be held.

DISCLOSURE OF INVENTION

According to the present invention, there is provided a disk recording and reproducing apparatus which is comprised of a pair of transport rollers made capable of holding therebetween a disk-like recording medium in its diametrical direction and drive means for rotating a first transport roller of the pair of transport rollers, wherein a second transport roller of the pair of transport rollers is fixed and the drive means rotates the first transport roller to rotate the disk-like recording medium by rotation force so that the disk-like recording medium is transported between a disk loading portion for recording and/or reproducing information on and/or from the disk-like recording medium and a disk entrance and exit slot to and/or from which the disk-like recording medium is inserted and/or ejected.

Further, according to the present invention, there is provided a disk recording and/or reproducing apparatus which is comprised of a pair of transport rollers made capable of holding therebetween a disk-like recording medium in its diametrical direction, drive means for rotating a first transport roller of the pair of transport rollers and a support lever capable of supporting part of the outer peripheral edge of the disk-like recording medium and that can transport the disk-like recording medium in cooperation with the pair of transport rollers, wherein when a second roller of the pair of transport rollers is fixed and the drive means rotates the first transport roller to rotate and transport the disk-like recording medium by giving rotation force to the disk-like recording medium the support lever supplies the disk-like recording medium between the pair of transport rollers while pressing it.

Furthermore, according to the present invention, there is provided a disk recording and/or reproducing apparatus which is comprised of a housing having a disk entrance and exit slot into and from which a disk-like recording medium is inserted and ejected, a gate member loaded onto the housing so as to cover the disk entrance and exit slot and a disk transport mechanism for rotatably transporting the disk-like recording medium so that the disk-like recording medium passes through the disk entrance and exit slot, wherein the gate member includes a gate cover for closing the disk entrance and exit slot and which has a recess slot through which the disk-like recording medium passes and resistance force changing means for changing resistance force of a recess slot peripheral edge portion that contacts with the plane of the disk-like recording medium when the disk-like recording medium passes the recess slot in response to the direction in which the disk-like recording medium passes the recess slot.

BRIEF DESCRIPTION OF DRAWINGS

FIGS. 9 show the gate member of the disk recording and reproducing apparatus shown in FIG. 5, wherein FIG. 9A is a front view, FIG. 9B is a plan view, FIGS. 9C and 9D are rear views showing a main portion of the gate member and FIG. 9E is a cross-sectional view taken along the line W-W in FIG. 9A.

FIGS. 11 are diagrams to which reference will be made in explaining the state in which the optical disk is passing the gate member of the disk recording and reproducing apparatus shown in FIG. 5, wherein

FIGS. 17 show the drive-side roller assembly body of the disk recording and reproducing apparatus shown in FIG. 5, wherein

FIGS. 19 show the fixed-side roller assembly body of the disk recording and reproducing apparatus shown in FIG. 5, wherein

FIGS. 21 show a second embodiment of the fixed roller to be used for applying to the fixed-side roller assembly body shown in FIG. 16, wherein

FIGS. 22 show a third embodiment of a drive roller to be used for applying to the drive-side roller assembly body shown in FIG. 16, wherein

FIG. 26 is an explanatory diagram showing a relationship between two kinds of optical disks different in diameter loaded on the disk recording and reproducing apparatus shown in FIG. 5 and a first detection switch.

FIG. 27 is an explanatory diagram showing a relationship between second, third and fourth detection switches and the drive-side roller assembly body in the state in which two kinds of optical disks different in diameter are loaded onto the disk recording and reproducing apparatus shown in FIG. 5.

FIG. 28 is an explanatory diagram showing a relationship between fifth, sixth, seventh and eighth detection switches and a cam plate in the state in which the optical disk is loaded onto the disk recording and reproducing apparatus shown in FIG. 5.

FIGS. 30 are diagrams to which reference will be made in explaining the way in which the disk recording and reproducing apparatus shown in FIG. 5 is operating in FIG. 29, wherein

FIGS. 32 are diagrams to which reference will be made in explaining the way in which the disk recording and reproducing apparatus shown in FIG. 5 is operating, wherein

FIGS. 34 are diagrams to which reference will be made in explaining the way in which the disk recording and reproducing apparatus shown in FIG. 5 is operating in FIG. 33, wherein

FIGS. 36 are diagrams to which reference will be made in explaining the way in which the disk recording and reproducing apparatus shown in FIG. 5 is being operated in FIG. 35, wherein

FIGS. 38 are diagrams to which reference will be made in explaining the way in which the disk recording and reproducing apparatus shown in FIG. 5 is operating in FIG. 37, wherein

38B is an explanatory diagram showing the open/close shutter, the chucking arm, the cam plate and the like from the side.

Figure 5:
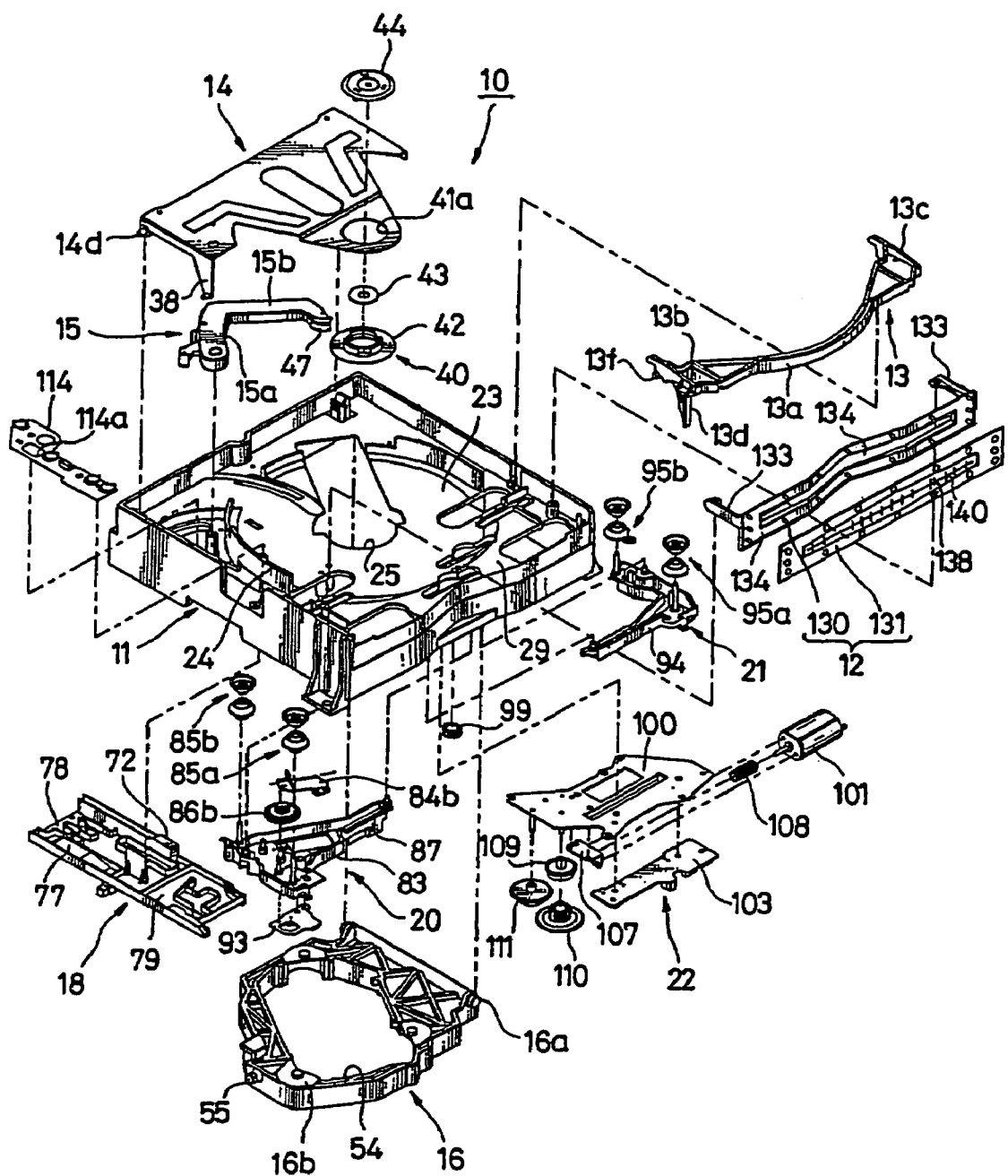
FIG. 5 is an exploded perspective view showing a recording and reproducing apparatus concerning a disk recording and/or reproducing apparatus according to an embodiment of the present invention.
Figure 39:
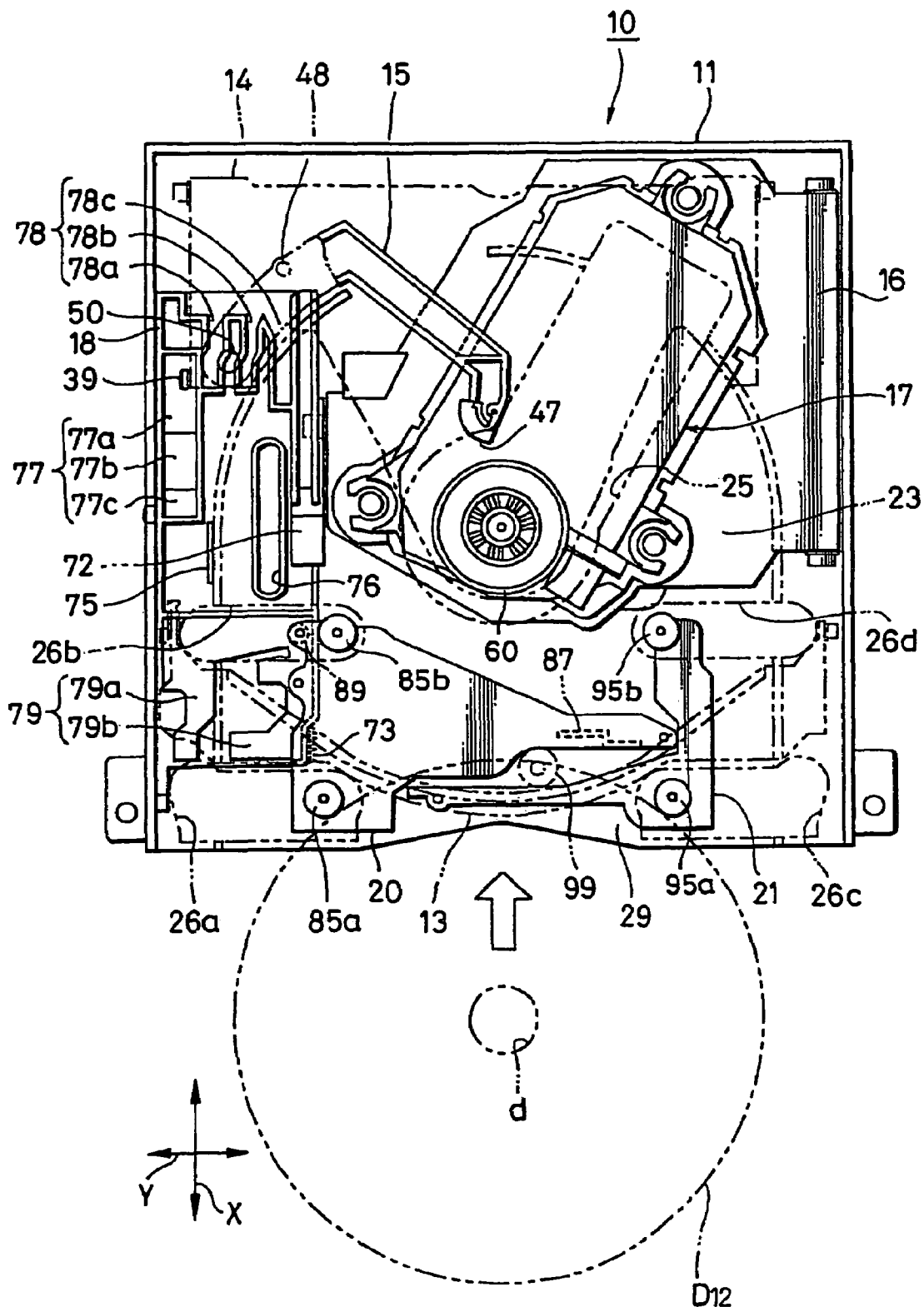

FIG. 39 is an explanatory diagram showing the state in which the optical disk is being inserted into the disk entrance and exit slot when a 12-cm optical disk is available in the disk recording and reproducing apparatus shown in FIG. 5.

FIGS. 40 are diagrams to which reference will be made in explaining the way in which the disk recording and reproducing apparatus shown in FIG. 5 is operating in FIG. 39, wherein FIG. 40A is an explanatory diagram showing the cam plate, the turntable and the like from the front and FIG. 40B is an explanatory diagram showing the open/close shutter, the chucking arm, the cam plate and the like from the side.

Figure 41:
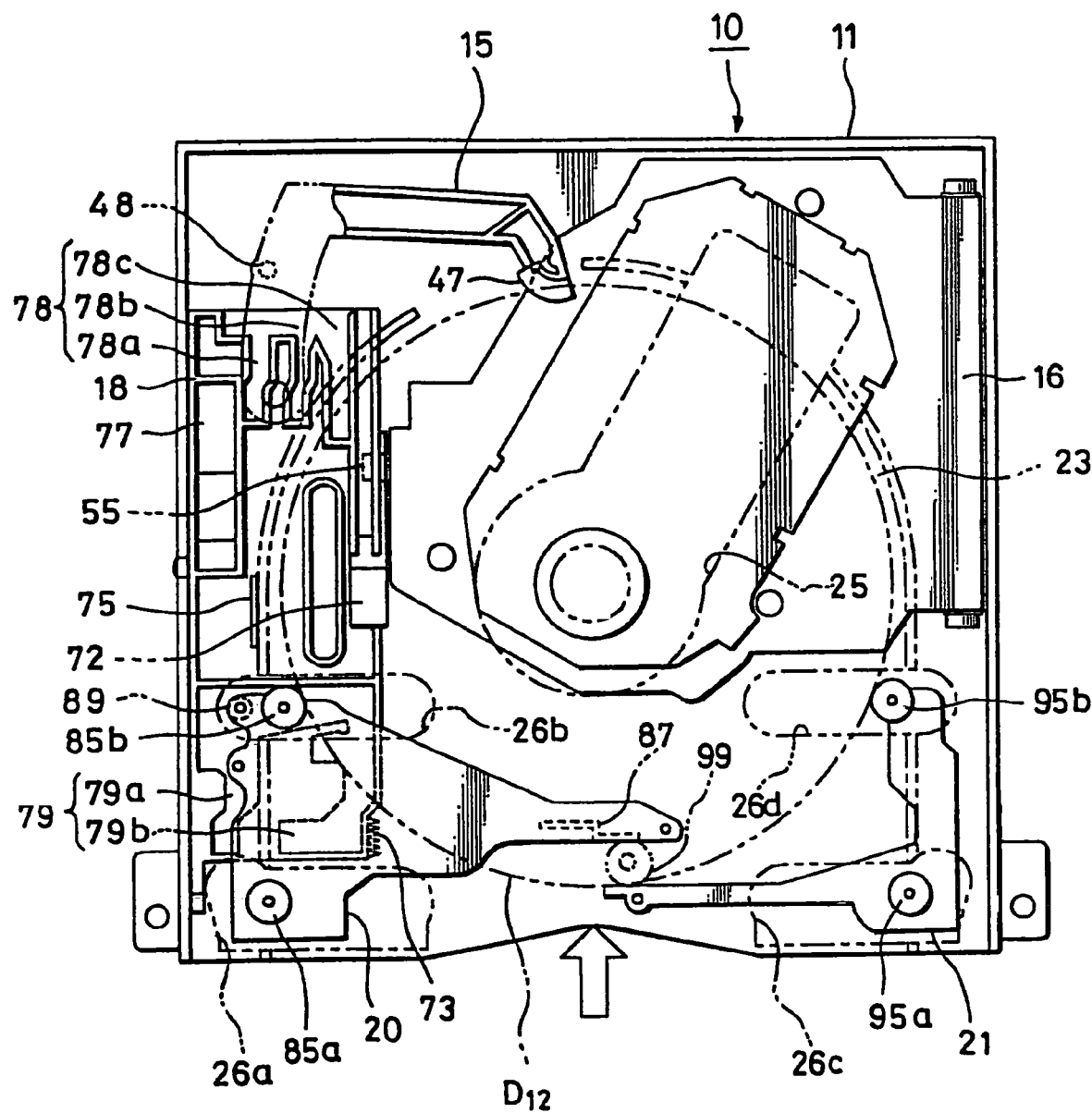

FIG. 41 is an explanatory diagram showing the state in which the optical disk is stored in a disk compartment when the 12-cm optical disk is available in the disk recording and reproducing apparatus shown in FIG. 5.

Figure 42A:
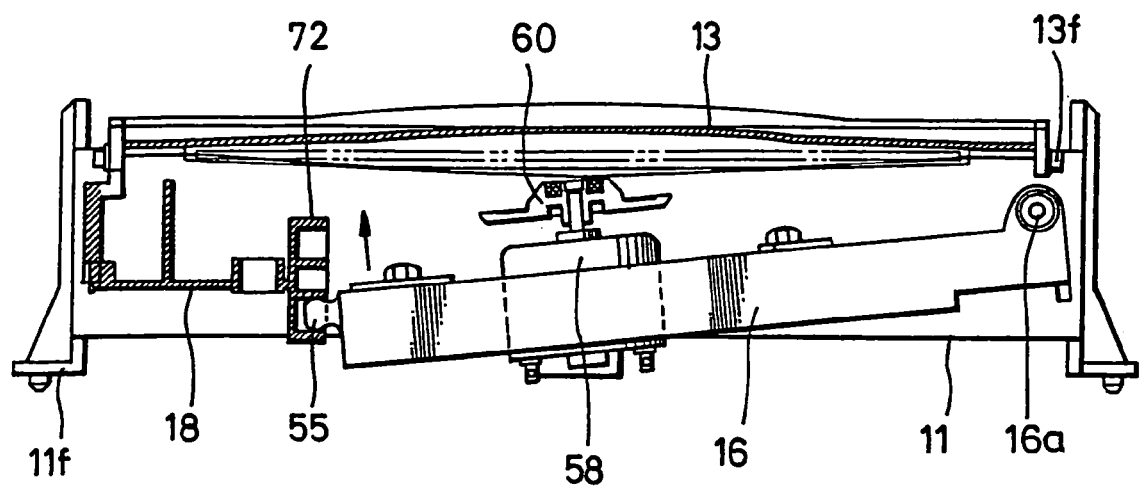
Figure 42B:
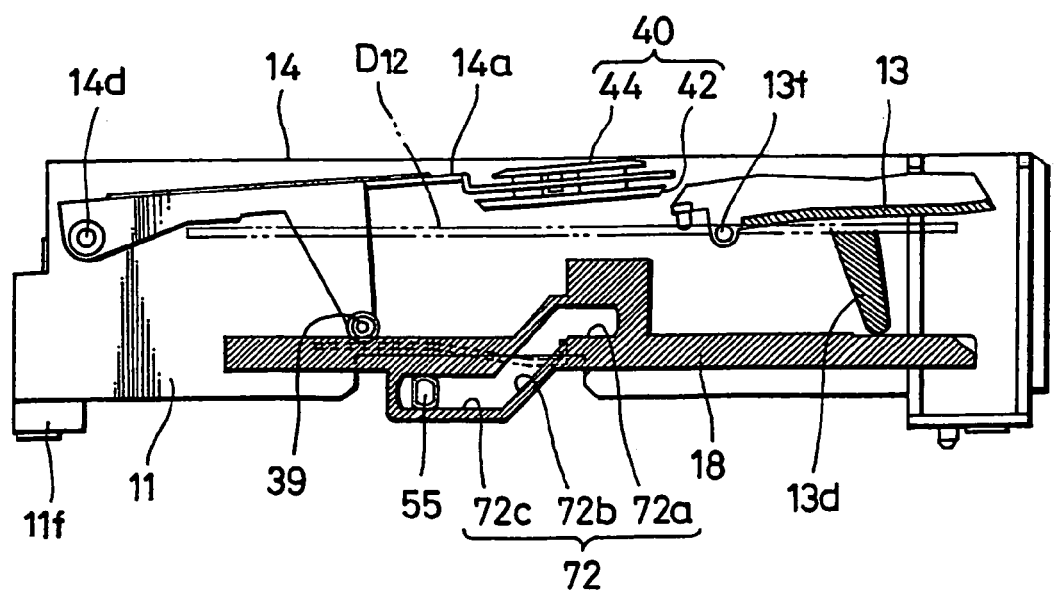

FIGS. 42 are diagrams to which reference will be made in explaining the way in which the disk recording and reproducing apparatus shown in FIG. 5 is operating in FIG. 41, wherein FIG. 42A is an explanatory diagram showing the cam plate, the turntable and the like from the side and FIG. 42B is an explanatory diagram showing the open/close shutter, the chucking arm, the cam plate and the like from the side.

Figure 43:
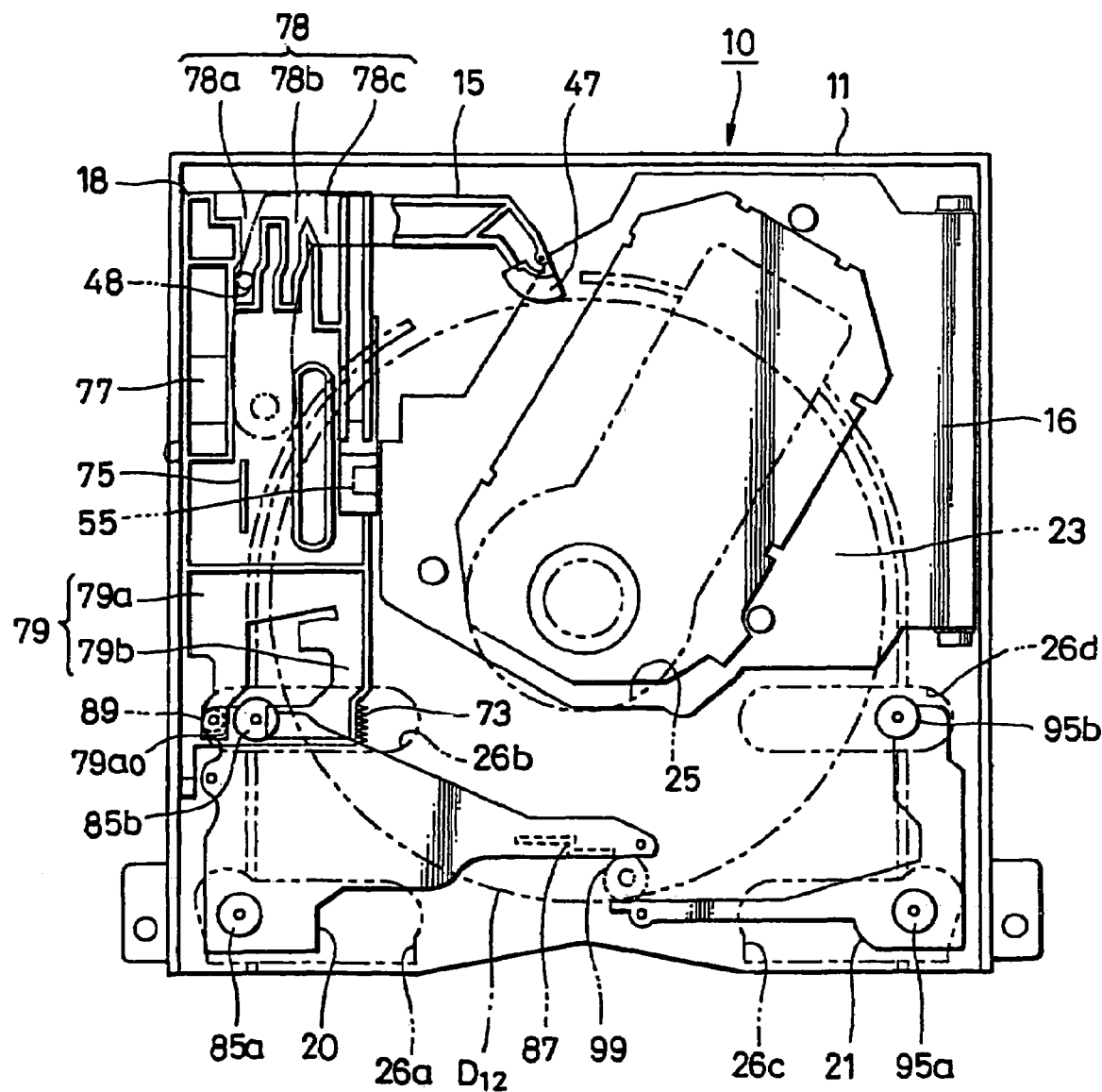

FIG. 43 is an explanatory diagram showing the state in which the loading of the optical disk has been finished when the 12-cm optical disk is available in the disk recording and reproducing apparatus shown in FIG. 5.

Figure 44A:
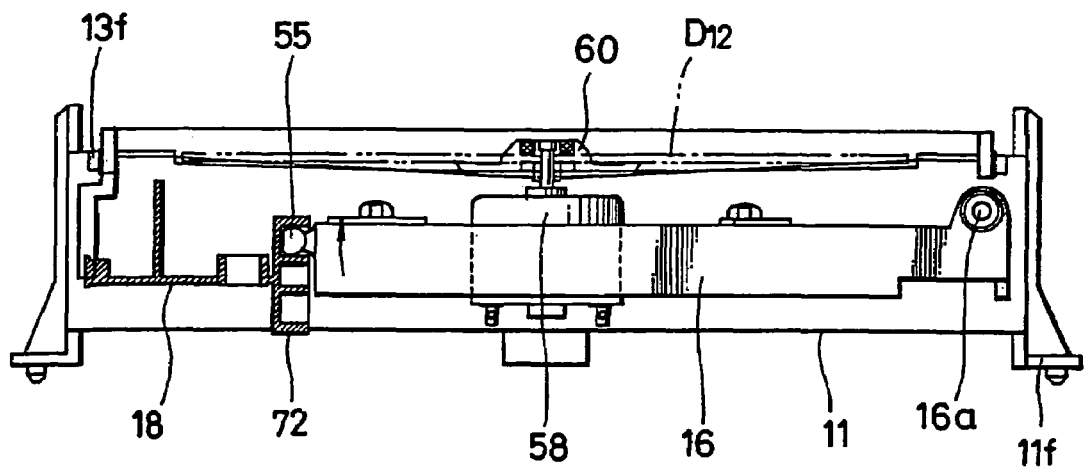
Figure 44B:
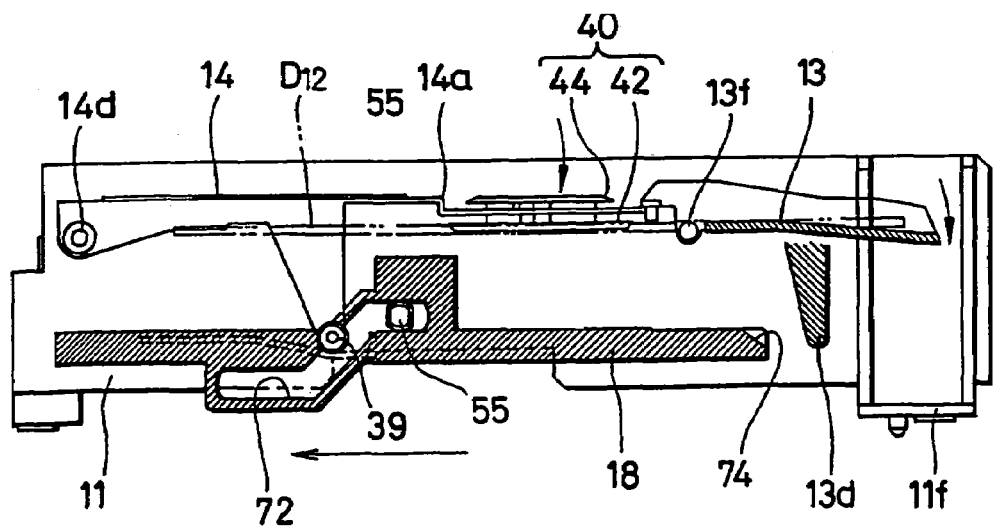

FIGS. 44 are diagrams to which reference will be made in explaining the way in which the disk recording and reproducing apparatus shown in FIG. 5 is operating in FIG. 43, wherein FIG. 44A is an explanatory diagram showing the cam plate, the turntable and the like from the front and FIG. 44B is an explanatory diagram showing the open/close shutter, the chucking arm, the cam plate and the like from the side.

Figure 45:
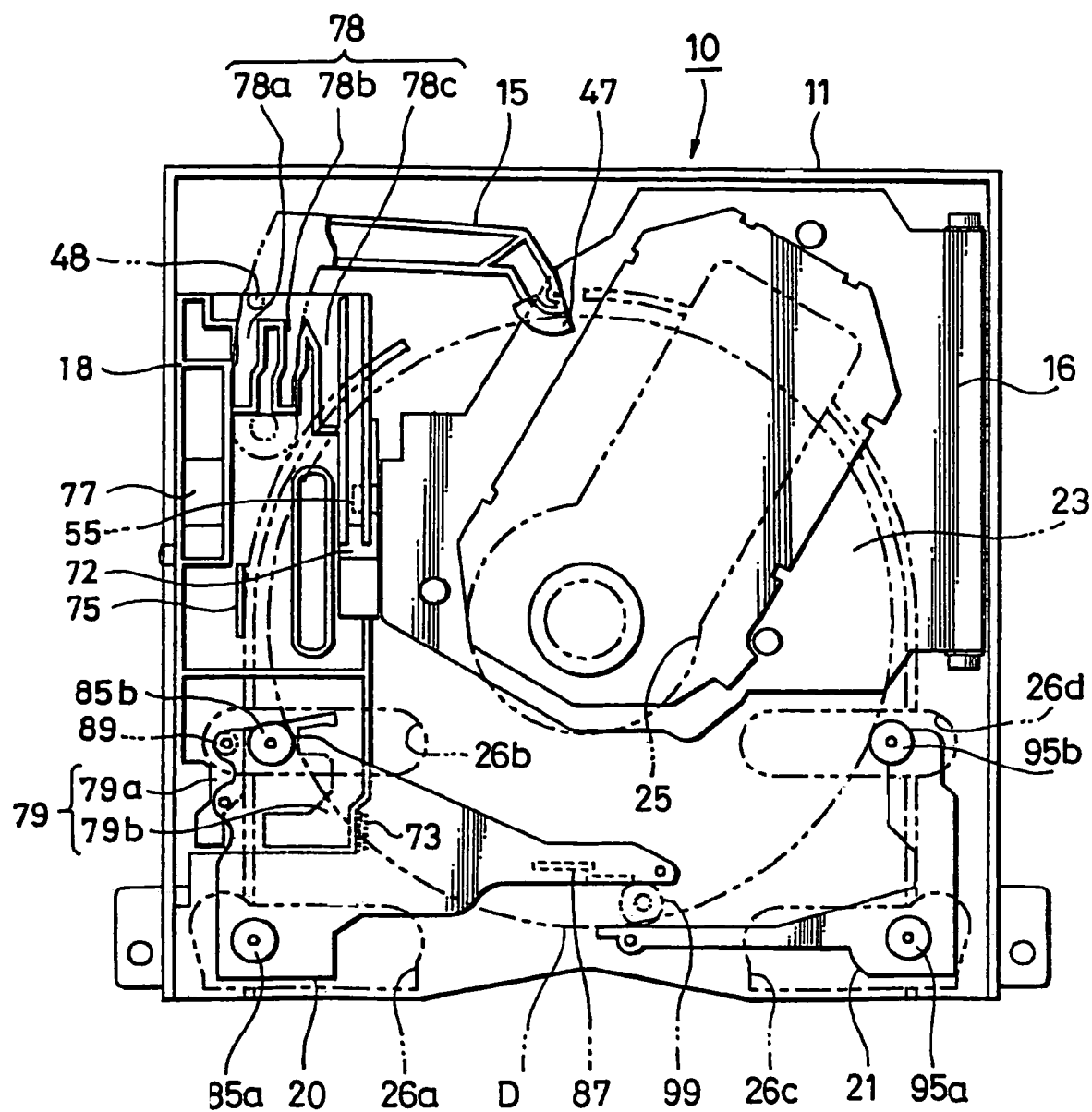

FIG. 45 is an explanatory diagram showing the state in which the optical disk is being ejected from the disk compartment when the 12-cm optical disk is available in the disk recording and reproducing apparatus shown in FIG. 5.

Figure 46A:
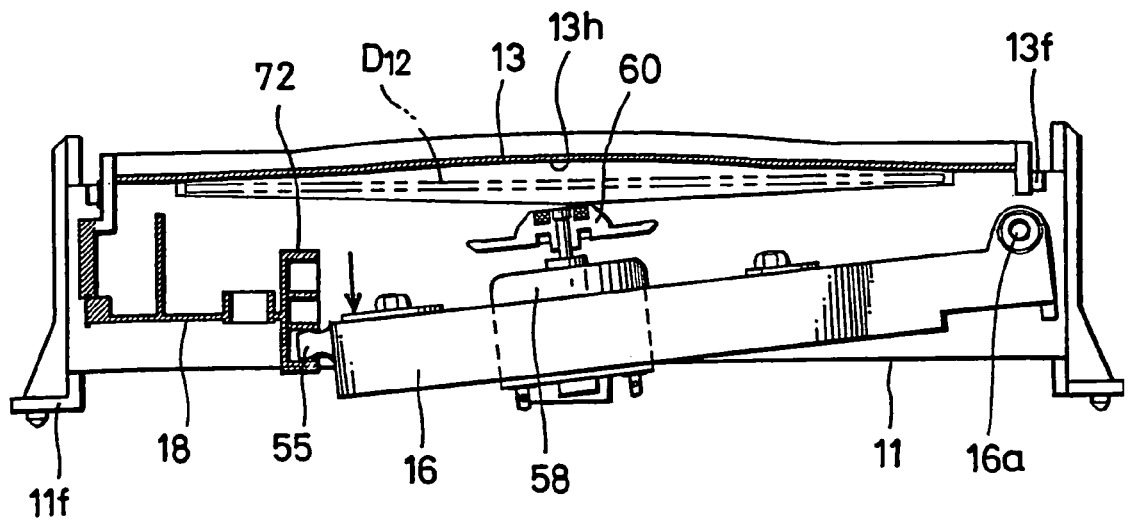
Figure 46B:
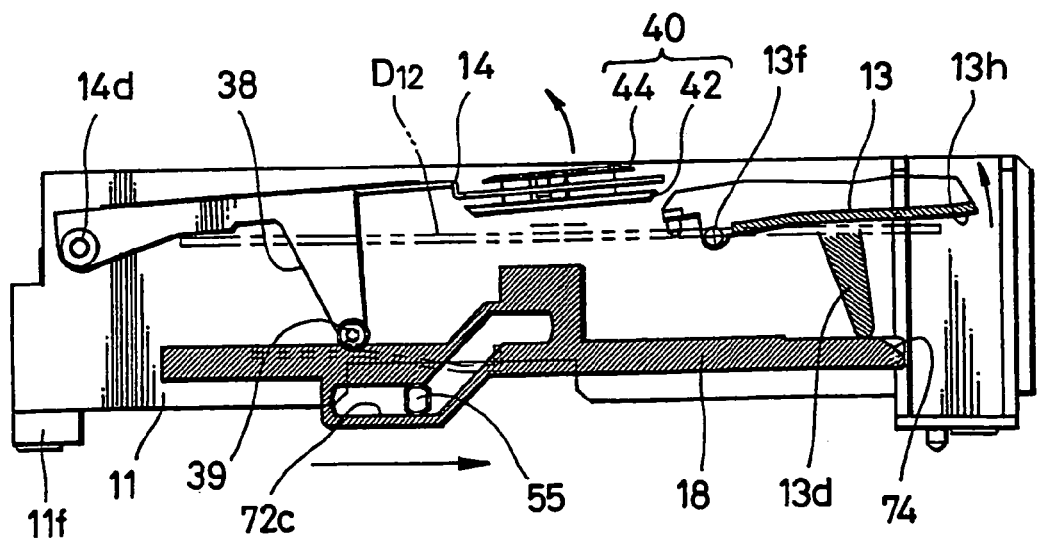

FIGS. 46 are diagrams to which reference will be made in explaining the way in which the disk recording and reproducing apparatus shown in FIG. 5 is operating in FIG. 45, wherein FIG. 46A is an explanatory diagram showing the cam plate, the turntable and the like from the front and FIG. 46B is an explanatory diagram showing the open/close shutter, the chucking arm, the cam plate and the like from the side.

Figure 47:
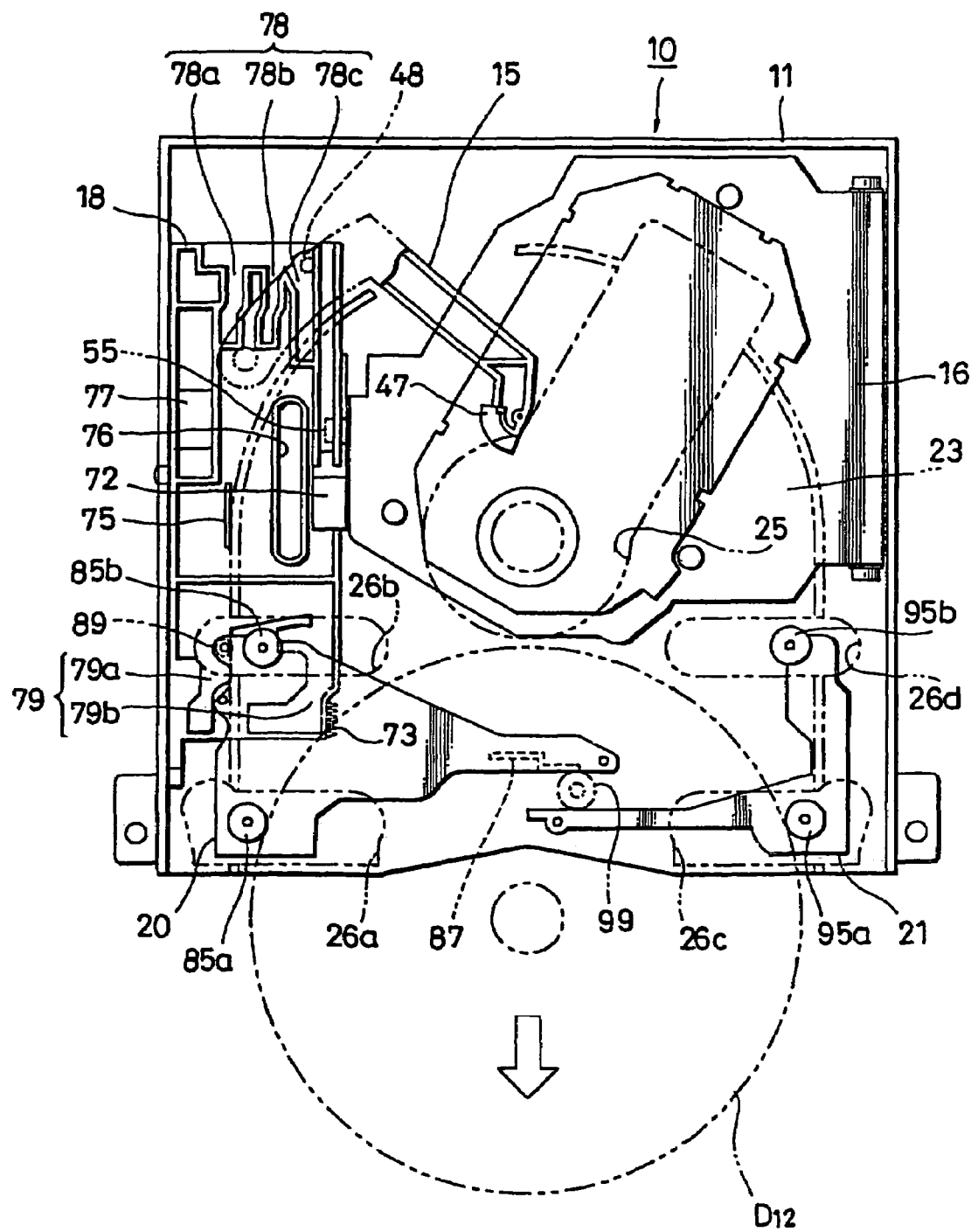

FIG. 47 is an explanatory diagram showing the state in which the optical disk is being ejected from the disk entrance and exit slot when the 12-cm optical disk is available in the disk recording and reproducing apparatus shown in FIG. 5.

Figure 48A:
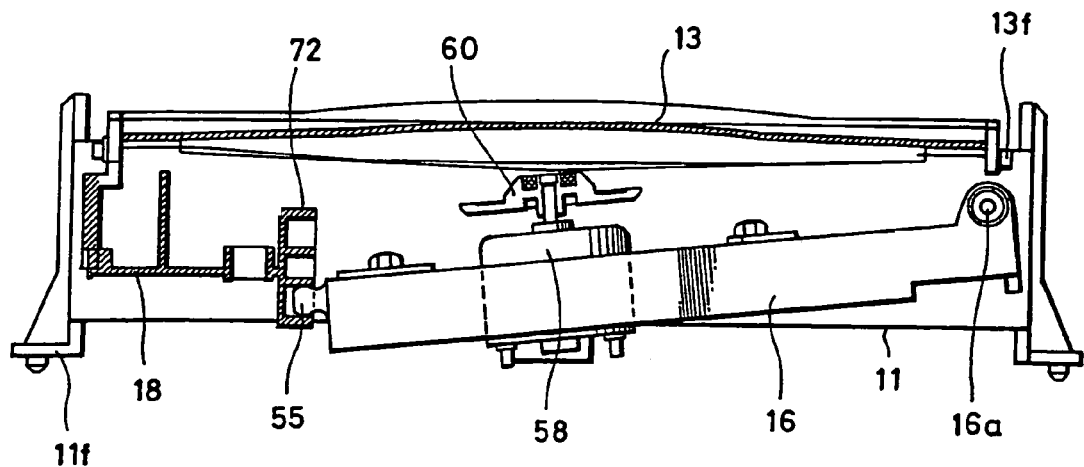
Figure 48B:
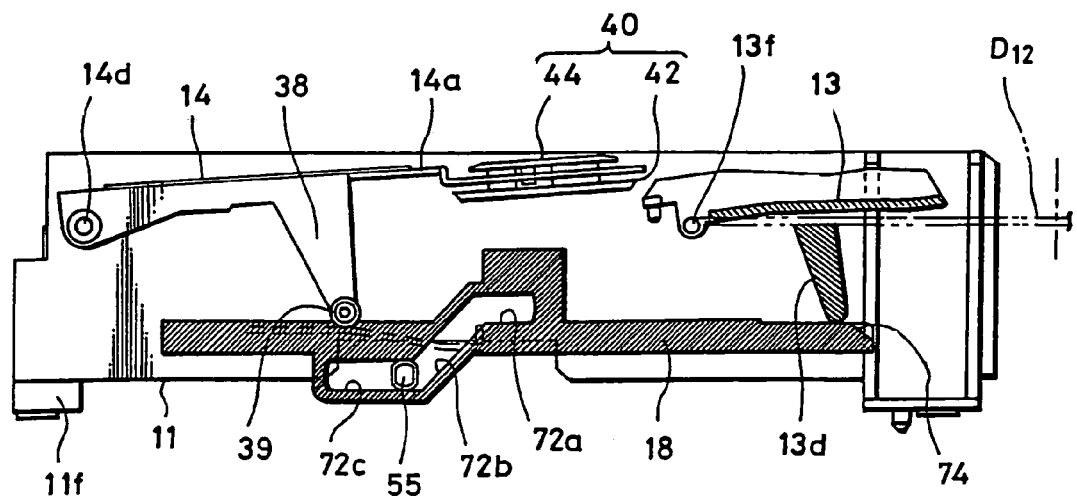

FIGS. 48 are diagrams to which reference will be made in explaining the way in which the disk recording and reproducing apparatus shown in FIG. 5 is operating in FIG. 47, wherein FIG. 48A is an explanatory diagram showing the cam plate, the turntable and the like from the front and FIG. 48B is an explanatory diagram showing the open/close shutter, the chucking arm, the cam plate and the like from the side.

FIG. 49 is a diagram showing operation timing charts that are useful for explaining operations of eighth detection switches and two drive motors when the 8 cm optical disk is available in the disk recording and reproducing apparatus shown in FIG. 5.

Figure 50:
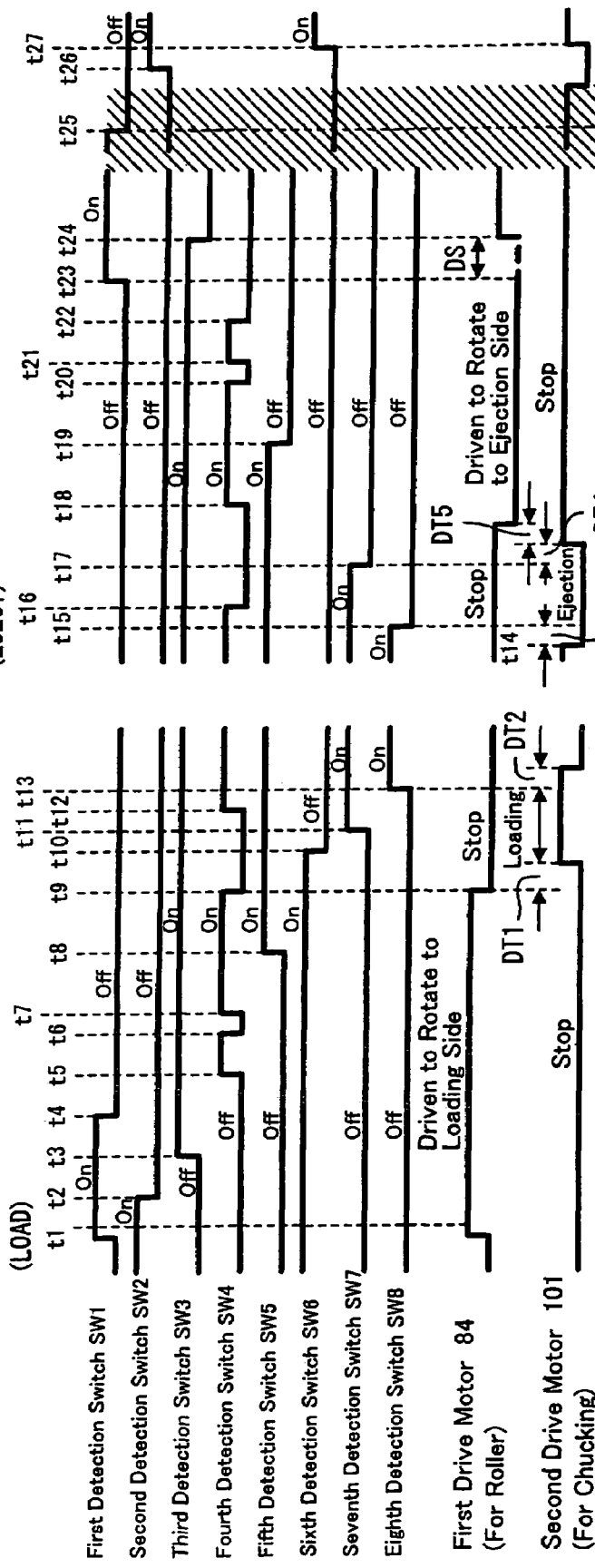

FIG. 50 is a diagram showing operation timing charts that are useful for explaining operations of eighth detection switches and two drive motors when the 12-cm optical disk is available in the disk recording and reproducing apparatus shown in FIG. 5.

Figure 51:
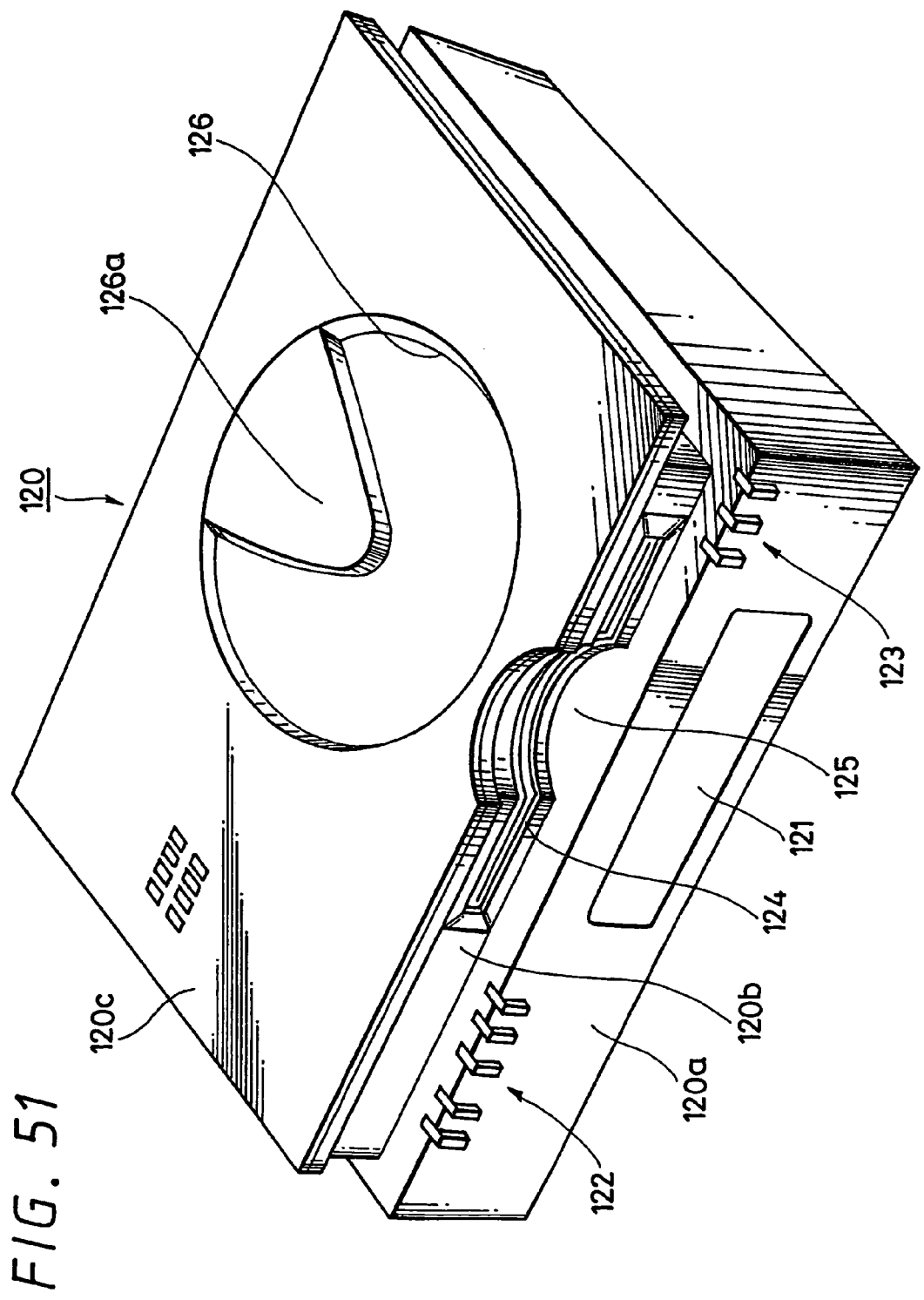

FIG. 51 is a perspective view showing an outward appearance of a casing in which the disk recording and reproducing apparatus shown in FIG. 5 is housed.

Figure 52:
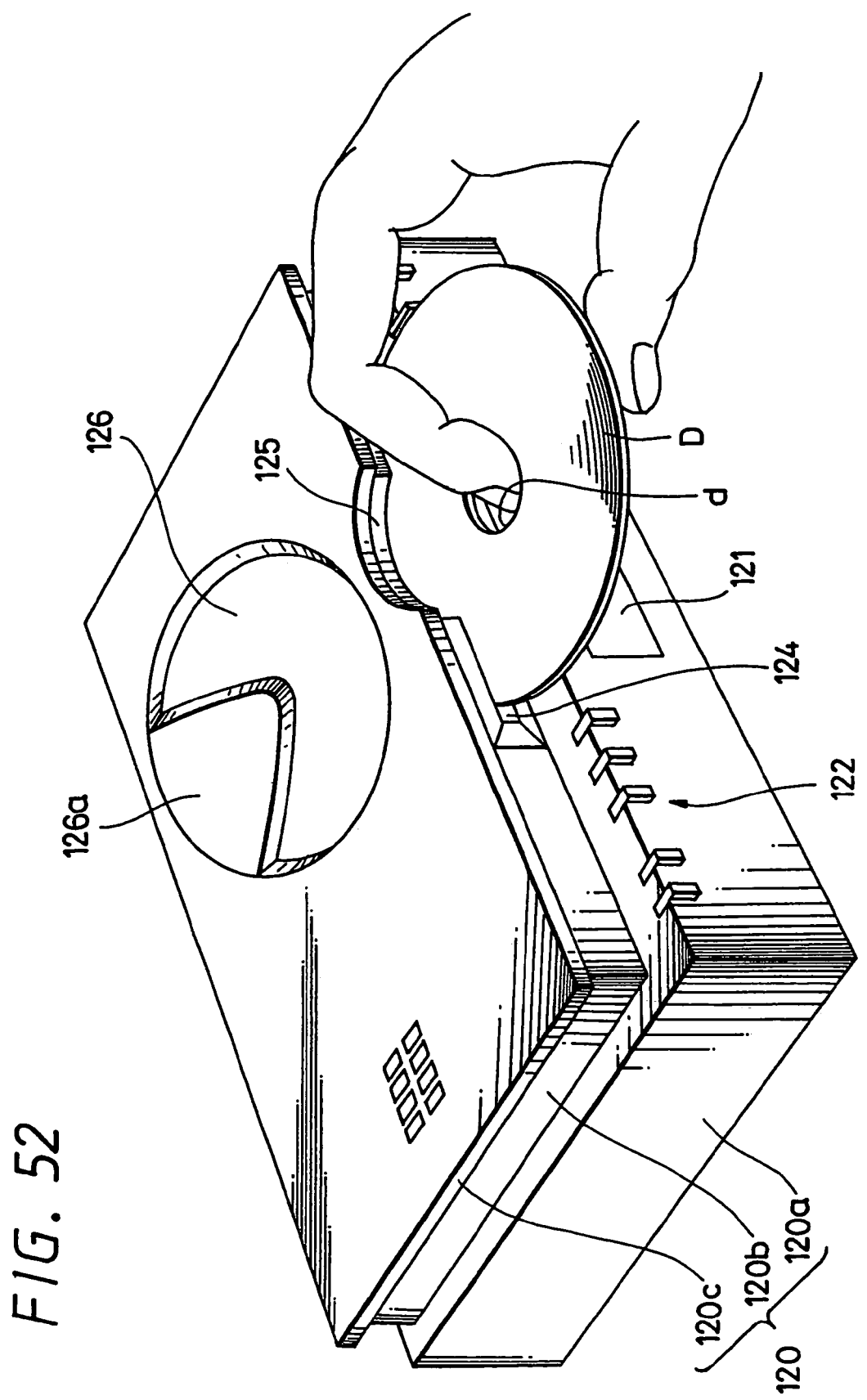

FIG. 52 is an explanatory diagram showing the manner in which the optical disk is being ejected from the casing in which the disk recording and reproducing apparatus shown in FIG. 5 is housed.

Figure 53:
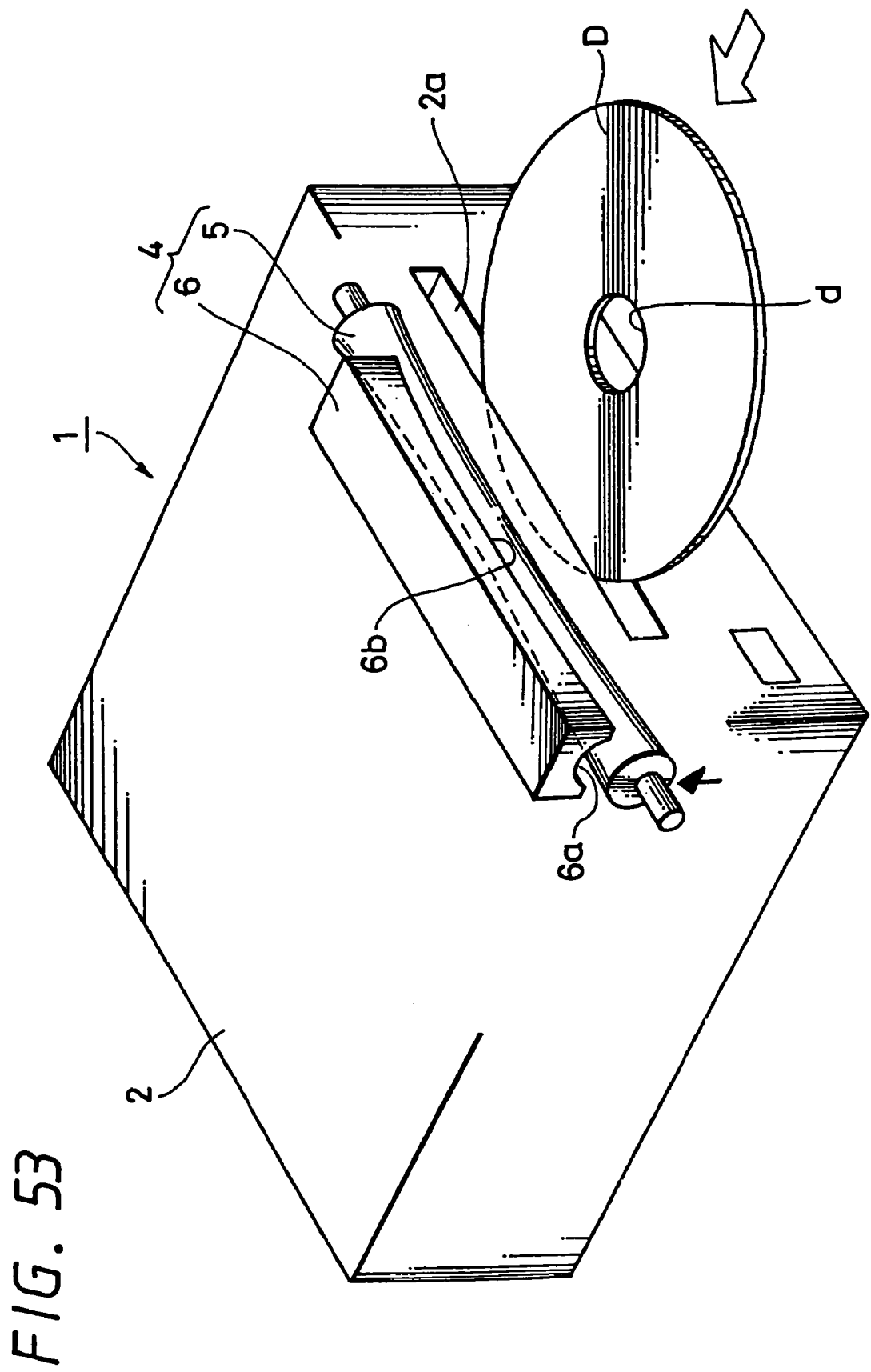

FIG. 53 is an explanatory diagram showing a conventional disk recording and reproducing apparatus.

BEST MODE FOR CARRYING OUT THE INVENTION

Figure 1:
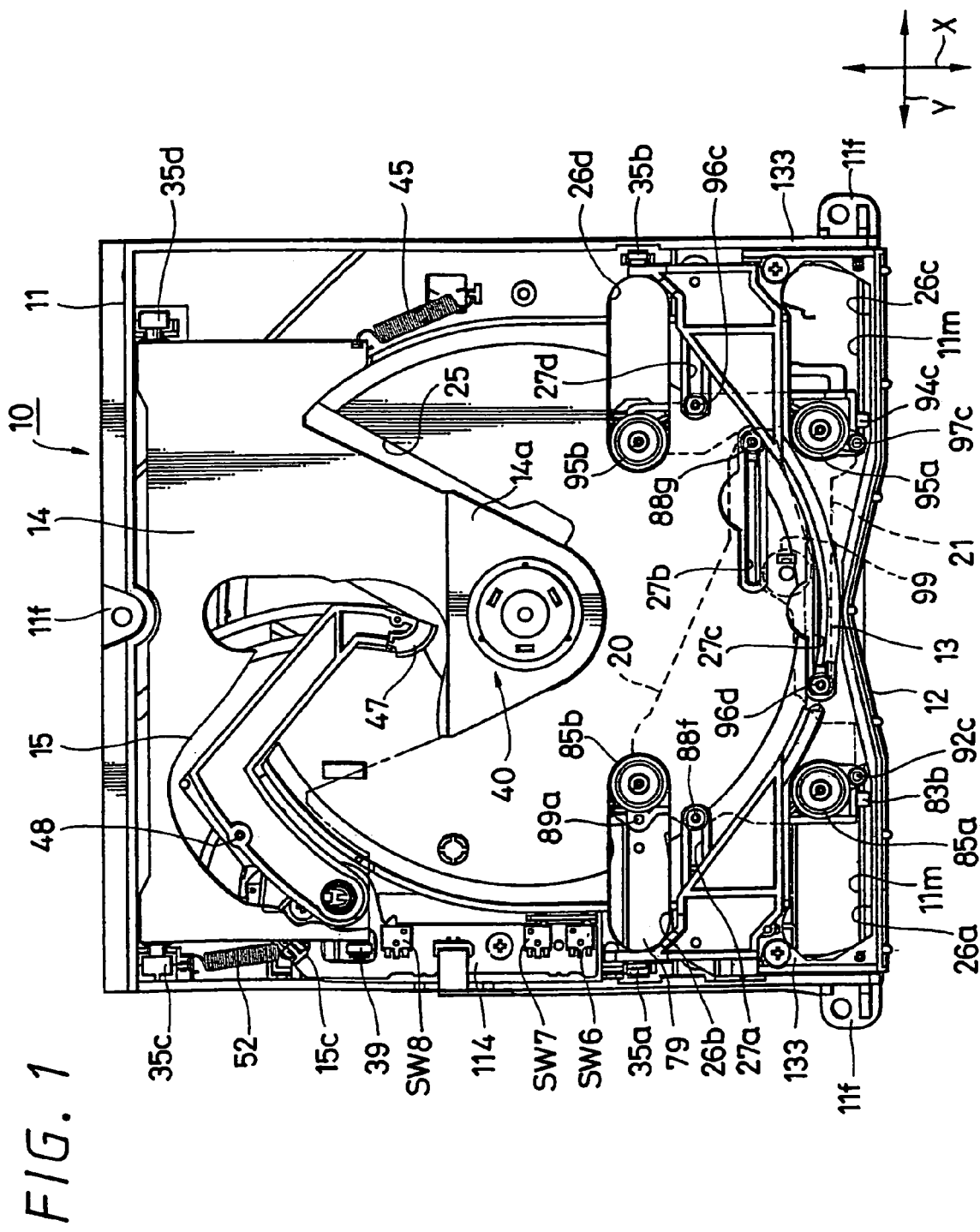
FIG. 1 is a fragmentary cross-sectional plan view showing a disk recording and reproducing apparatus concerning a disk recording and/or reproducing apparatus according to an embodiment of the present invention.

A disk recording and/or reproducing apparatus according to the embodiments of the present invention will be described-below with reference to the drawings. FIGS. 1 to 52 show a disk recording and/or reproducing apparatus according to the embodiments of the present invention. A disk recording and/or reproducing apparatus according to the present invention is applied to a disk recording and reproducing apparatus that can not only reproduce information but also record information.

A disk recording and reproducing apparatus 10 according to this embodiment can use either a 12-cm disk-like recording medium or an 8 cm disk-like recording medium and is able to use optical disks such as a CD-R (Write Once), a DVD-R or a video CD-R in which information can be written once or optical disks such as a CD-RW (ReWritable), a DVD-RW or a video CD-RW in which information can be written many times and optical disks such as a CD or a CD-ROM that can be read only as disk-like recording mediums.

As shown in FIGS. 1 to 5, the disk recording and reproducing apparatus 10 according to the present invention comprises a main chassis 11 serving as a base member that is opened in the upper and lower surfaces, a gate member 12, an open/close shutter 13, a chucking arm 14, a support lever 15, an assembly body holder 16, an pickup table assembly body 17, a cam plate 18, a drive-side roller assembly body 20, a fixed-side roller assembly body 21 and a chuck driving assembly body 22 and the like attached to this main chassis 11 such that they can rotate or slide relative to the main chassis or they can be fixed to the main chassis.

Figure 6:
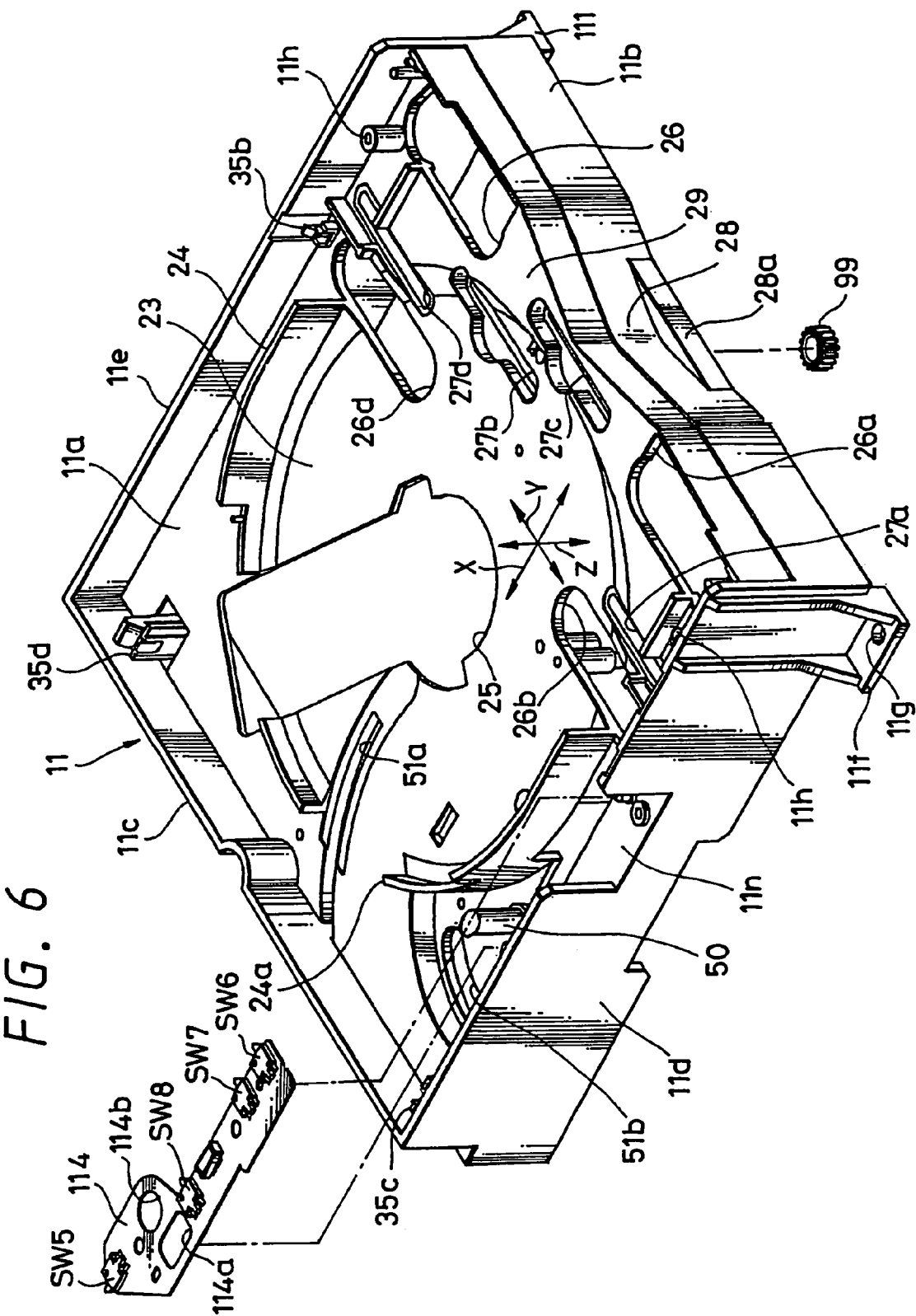
FIG. 6 is a perspective view showing a main chassis of the disk recording and reproducing apparatus shown in FIG. 5 in an enlarged scale.

As shown in FIG. 6 in an enlarged scale, the main chassis 11 is a false bottom-like box of a rectangular solid including a flat surface portion 11a of approximately square shape, a front surface portion 11b formed integrally with and continuing to the four sides of the flat surface portion 11a, a rear surface portion 11c and left and right side surface portions 11d, 11e. Although only the front surface portion 11b of the main chassis 11 projects downwardly to cover only the lower surface side of the flat surface portion 11a, both of the rear surface portion 11c and the left and right side surface portions 11d, 11e project downwardly and upwardly to cover not only the lower surface side but also the upper surface side of the flat surface portion 11a. The front and rear direction X that connects the front surface portion 11b and the rear surface portion 11c shows the direction in which an optical disk D is inserted into and ejected from the disk recording and reproducing apparatus.

Leg pieces 11f downwardly project from the front sides of the left and right side surfaces 11d, 11e and from approximately the center of the rear surface portion 11c of the main chassis 11. The leg pieces 11f have insertion holes 11g bored therein, and attachment screws inserted into the insertion holes 11g serve to fix the main chassis 11 to the predetermined position of a casing, which will be described later on.

The flat surface portion 11a of the main chassis 11 has at its approximately central portion set a disk compartment portion 23 that houses therein a 12-cm optical disk $D_{12}$ which shows a specific example of a large-diameter disk. Accordingly, it is natural that this disk compartment portion can house therein an 8-cm optical disk $D_8$ which shows a specific example of a small-diameter optical disk. The disk compartment portion 23 has a semicircular-like partition wall 24 formed from its side portion to its rear portion.

The disk compartment portion 23 has an opening portion 25 defined at its central portion to accept or eject the turntable of the pickup table assembly body 17 from or to the underside. The opening portion 25 continues from the central portion of the disk compartment portion 23 in the diagonally rearward direction and also extends through the partition wall 24 to the side of the rear surface portion 11c so that an optical pickup of an optical pickup device, which will be described later on, can move in the radius direction a predetermined length in an opposing relation to a signal recording surface of an optical disk that is rotated together with the turntable.

The flat surface portion 11a of the main chassis 11 has at its front side four roller through-holes 26a, 26b, 26c and 26d extending in the right and left direction Y perpendicular to the front and rear direction X and four guide oblong holes 27a, 27b, 27c and 27d similarly extending in the right and left direction Y. The four through-holes 26a to 26d are parallel to each other, and the first and third through-holes 26a and 26c are set at front two corner portions. The remaining two second and four through-holes 26b and 26d are located with predetermined spacing from the through-holes 26a, 26c in the front and rear direction X in such a manner that they may overlap in the front and rear direction X.

The four oblong holes 27a to 27d also are parallel to each other. The first oblong hole 27a is set between the first through-hole 26a and the second through-hole 26b, and the third oblong hole 27c is set between the first through-hole 26a and the third through-hole 26c. Then, the fourth oblong hole 27d is set between the third through-hole 26c and the fourth through-hole 26d, and the second oblong hole 27b is set between the third oblong hole 27c and the fourth oblong hole 27d.

The front surface portion 11b of this main chassis 11 has a V-like holding recess portion 28 recessed at its approximately central portion in the right and left direction Y to enable a user to hold the optical disk D with ease. The holding recess portion 28 has a reinforcement rib portion 28a formed at its lower portion to reinforce the strength of the front surface portion 11b. The front surface portion 11b has a V-like second guide portion 29 formed at its portion opposing to the shutter portion 13a of the open/close shutter 13 to form a gentle inclined plane with a recessed center in the right and left direction Y. The second guide portion 29 may be a U-like curved surface formed of a gentle curve. The front surface portion 11b has the gate member 12 fixed to its upper portion by a suitable fixing means such as set screws.

Figure 7:
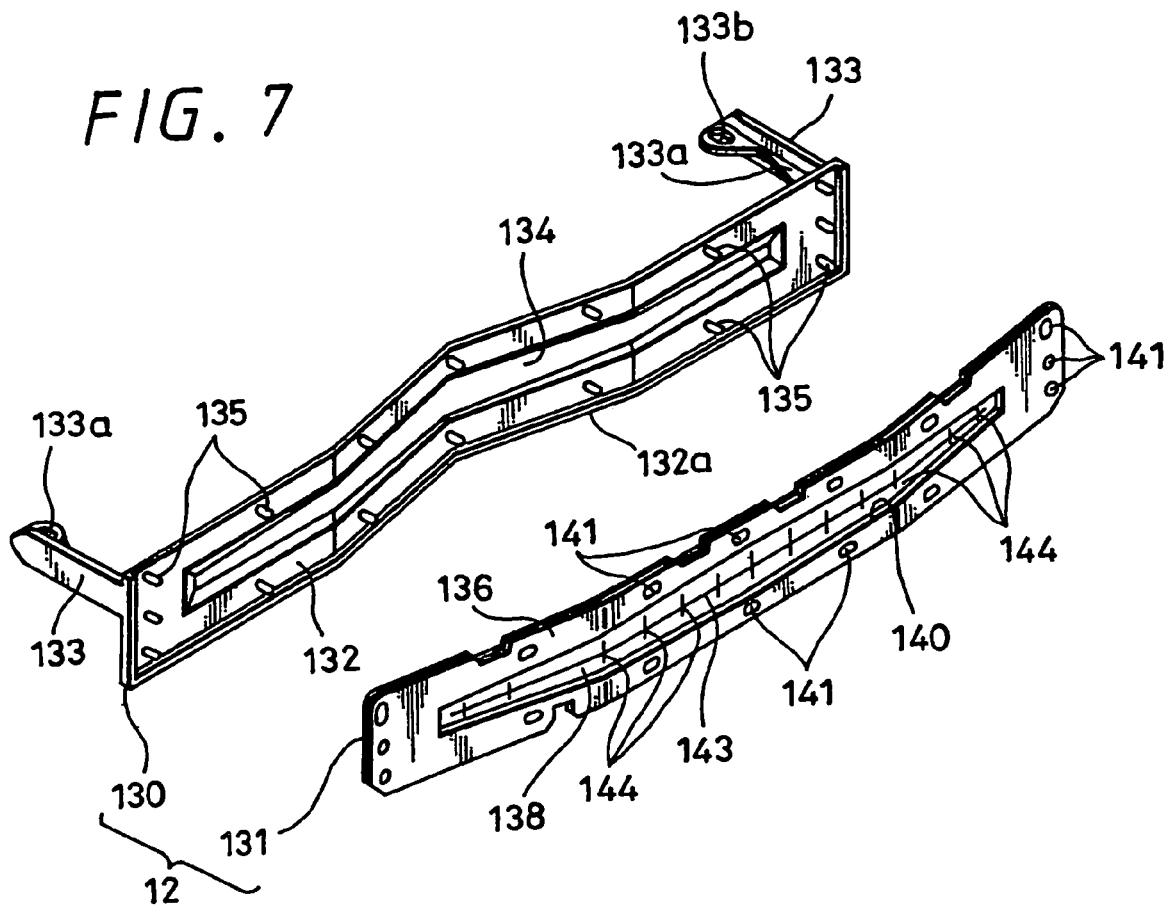
FIG. 7 is an exploded perspective view showing a gate member of the disk recording and reproducing apparatus shown in FIG. 5 in an enlarged scale.
Figure 8:
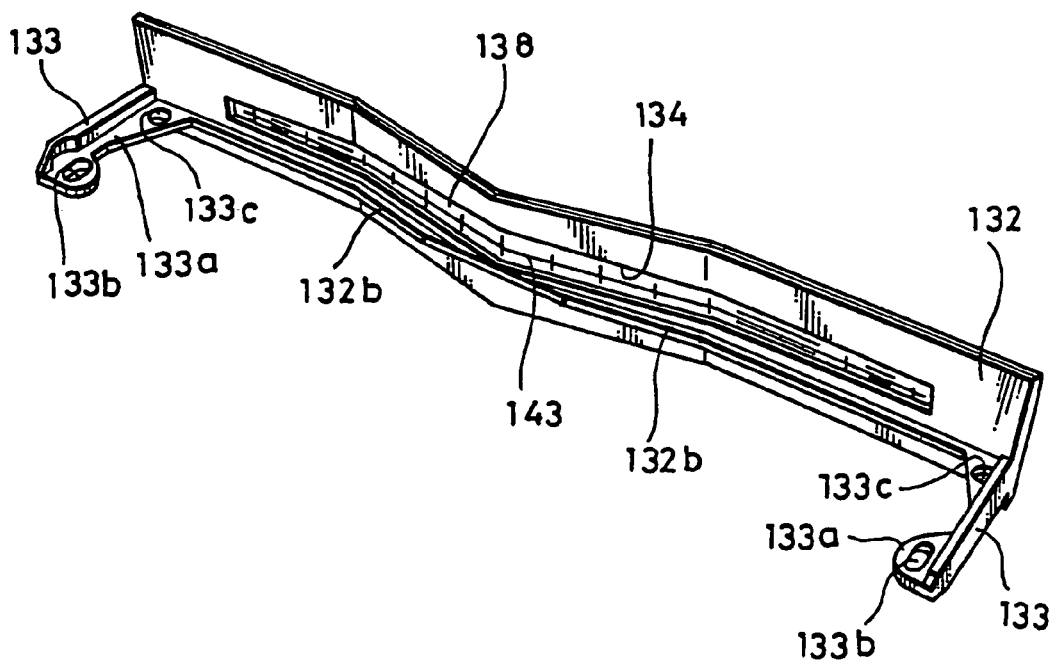
FIG. 8 is a perspective view showing the gate member of the disk recording and reproducing apparatus shown in FIG. 5 from the rear side.

The gate member 12 is composed of a gate holder 130 and a gate mask 131 as shown in FIG. 7. As shown in FIGS. 7 and 8, the gate holder 130 comprises a gate plate 132 formed of an oblong rectangular plate body to cover a disk entrance and exit slot 30 formed of an opening portion including the upper portion of the front surface portion 11b of the main chassis 11 and a pair of fixed arms 133, 133 continuing to the respective end portions of the gate plate 132 in the longitudinal direction. The gate plate 132 is formed such that its intermediate portion of the longitudinal direction is bent in a V-like fashion and projected to the rearward in response to the holding recessed portion 28 of the front surface portion 11b of the main chassis 11. This gate plate 132 is provided with a holder opening portion 134 shaped like an oblong opening.

The holder opening portion 134 has a length and a width long and wide enough to freely accept or eject the large-diameter disk $D_{12}$ having the diameter of 12 cm, and the central portion of the holder opening portion is wider than those of the respective end portions. Specifically, the upper edge portion of the holder opening portion 134 is formed as an inverse V-like inclined plane in which its central portion has a large upward recess and the lower edge portion of the holder opening portion is formed as a V-like inclined plane in which its central portion has a large downward recess. The shape of the disk entrance and exit slot 30 is not limited to the combination of the V-like inclined plane and the inverse V-like inclined plane and the disk entrance and exit slot may be formed as a U-like arc plane or may be formed like a barrel by opposing a U-like arc plane to an inverse U-like arc plane.

The gate plate 132 of the gate member 12 has a projection rail frame 132a continuing from its front surface to the lower portion and left and right respective end portions except the upper portion. The gate plate 132 has a large number of caulking protrusions 135 formed at is front surface to project in the forward direction to encircle the holder opening portion 134.

Figure 4:
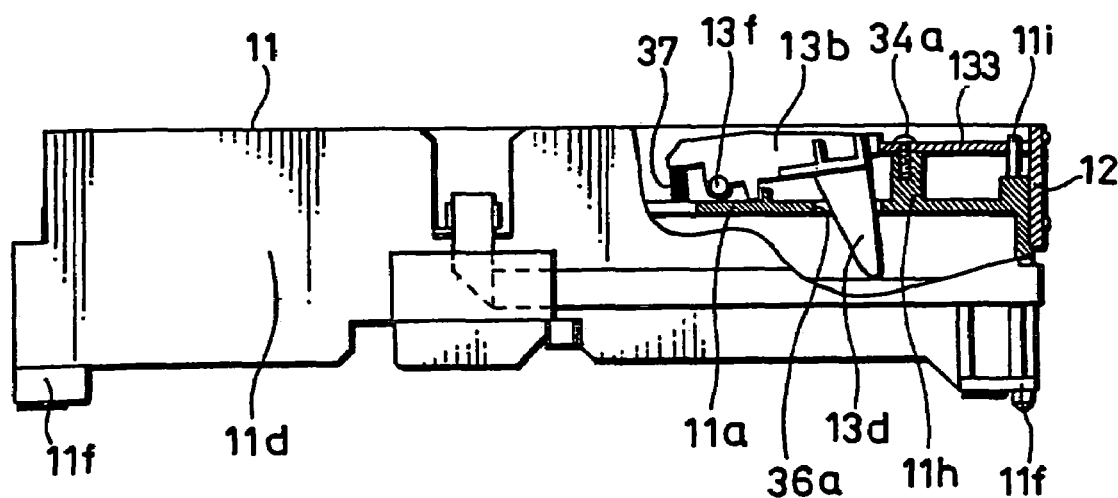
FIG. 4 is a fragmentary cross-sectional side view showing a disk recording and reproducing apparatus concerning a disk recording and/or reproducing apparatus according to an embodiment of the present invention.

As shown in FIGS. 7 and 8, each fixed arm 133 of the gate member 12 has a reinforcement rib 133a formed at its inner surface. Each reinforcement rib 133a has an insertion hole 133b bored at its tip end portion and has a positioning hole 133c bored at is base portion. A horizontal rib 132b is provided at the rear surface of the gate plate 132 to reinforce the gate plate and is also used to link the right and left reinforcement ribs 133a, 133a. The main chassis 11 has support projection portions 11h with tapped holes opened to the upper end portions and positioning pins 11i formed at its front surface portion 11a to oppose the respective insertion holes 113b and the respective positioning holes 133c as shown in FIG. 4.

The positioning holes 133c are engaged with the positioning pins 11i and the set screws 34a are inserted into the insertion holes 133b properly positioned at the support projection portions 11h, whereby the gate member 12 is attached to the upper portion of the front surface portion 11b of the main chassis 11. Although ABS (acrylonitrile-butadiene-styrene resin), for example, can be suitably applied to the material of the gate member 12, it is needless to say that other engineering plastics can be applied to the material of the gate member and that other metals such as stainless steel can also be applied to the material of the gate member.

A gate mask 131 with an opening large enough to completely cover the holder opening portion 134 is located at the front surface of the gate plate 132 of this gate member 12 and is integrally fixed to the front surface of the gate plate. As shown in FIGS. 9A to 9E and the like, the gate mask 131 is composed of a film-like frame 136 housed within the protrusion rail frame 132a of the gate plate 132 and a gate cover 138 the outward appearance shape of which is the same as that of the frame 136 and which is fixed to one surface of the frame 136 by a double-sided adhesive tape 137 (other suitable fixing means such as an adhesive agent may be used) which shows a specific example of the fixing means.

The frame 136 has a mask opening portion 140 of similar shape and size to those of the holder opening portion formed at its position opposing the holder opening portion 134. Further, the frame 136 and the gate cover 140 have a large number of engagement holes 141 bored thereon to respectively engage with a large number of caulking protrusions 135 of the gate plate 132. The caulking protrusions 135 are respectively fitted into these engagement holes 141 and the tip end portions of the caulking protrusions are caulked, whereby the gate mask 131 is fitted into and fixed to the gate holder 130. Although polyester, for example, can be suitably applied to the material of this frame 136, it is needless to say that other engineering plastics can be applied to the material of this frame and that other metals such as stainless steel can be applied to the material of this frame.

The gate cover 138 has a slot 143 long enough to freely pass the large-diameter disk $D_{12}$ having the diameter of 12 cm. The slot 143 is located at approximately the central portion of the frame 136, and the slot 143 has crossing slots 144 formed at their proper positions of the longitudinal direction to extend in the directions across the longitudinal direction at a plurality of positions. The crossing slots 144 can provide the gate cover 138 with small-diameter support members 138a to support the maximum outer peripheral edge of the small-diameter disk $D_8$ when the small-diameter disk passes the slot 143 and large-diameter support members 138b to support the maximum outer peripheral edge of the large-diameter disk $D_{12}$ when the large-diameter disk passes the slot.

The small-diameter support member 138a and the large-diameter support member 139b are respectively provided with slits 145 that are extended in parallel to the slot 143. These slits 145 are set to the positions distant from the slots 143 rather than the peripheral edge of the mask opening portion 140 of the frame 136. Since the slits 145 are located distant from the slots 143 rather than the peripheral edge of the mask opening portion 140 as described above, the deformed state of the gate cover 138 is changed in response to the direction in which the optical disk D passes so that changed resistances are given to the optical disk D each time the optical disk passes the gate cover.

Although cloth such as unwoven fabric having high flexibility (to be concrete, unwoven fabric manufactured by Toray Industries Inc. under the trade name of "EXCENEE" can be enumerated), for example, is suitably applied to the material of the gate cover 138, other cloths may be applied to the material of the gate cover and sheet or film made of plastics or rubber can also be applied to the material of the gate cover so long as it has similar characteristics. Reference numeral 146 in FIG. 9E denotes a double-sided tape that attaches the gate mask 131 to the gate plate 132 of the gate holder 130. It is needless to say that this double-sided tape 146 may be replaced with a fixing means such as an adhesive agent.

Since the slots 143 and the crossing slots 144 are formed on the gate cover 144 as described above, the peripheral edges of the slots are closely brought in contact with the surface and the rear of the optical disk D that is inserted into and ejected from the apparatus through the gate member 12 disposed at the disk entrance and exit slot 30 to thereby prevent or suppress dusts from entering the apparatus from the outside.

Further, since the gate cover 138 includes the slits 145 and the small-diameter support member 138a and the large-diameter support member 138b, as will be described later on, resistance generated when the optical disk D is inserted into the apparatus can decrease. On the other hand, when the optical disk D is ejected from the apparatus, resistance can increase to hold the optical disk D. Thus, when the optical disk is ejected from the apparatus, it is possible to prevent the optical disk D from unintentionally being ejected from the disk entrance and exit slot 30 under its own weight. This gate cover 130 comprises resistance change means that changes resistance generated at the peripheral edge portion of the slot in response to the direction in which the optical disk D pass the gate cover 138.

Figure 12:
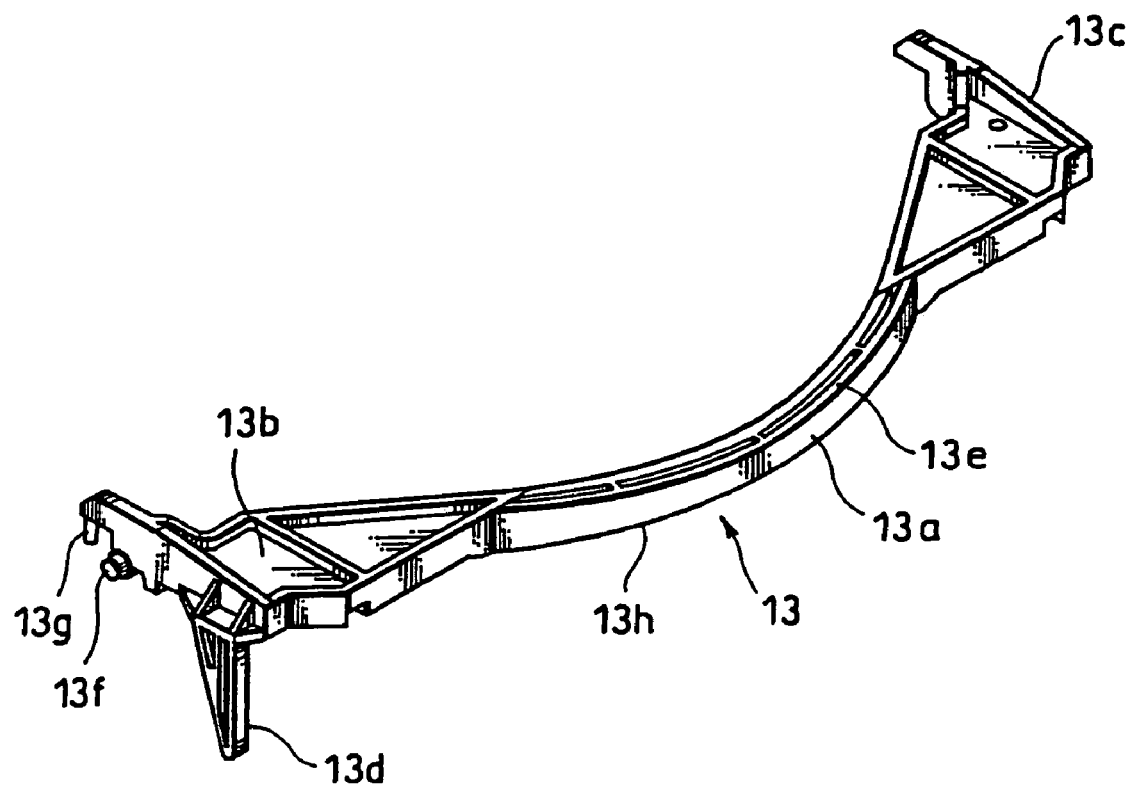
FIG. 12 is an enlarged perspective view showing an open/close shutter of the disk recording and reproducing apparatus shown in FIG. 5.

At the rear of the gate member 12, there is disposed the open/close shutter 13 such that the open/close shutter can be elevated or lowered in the upper and lower direction (can be rotated in the upper and lower direction). As shown in FIG. 12 in an enlarged-scale, the open/close shutter 13 is composed of a shutter portion 13a that can open and close the holder opening portion 134 of the gate member 12 from the inside, left and right arm portions 13b, 13c continuing from the respective ends of this shutter portion 13a in the longitudinal direction and a drive lever 13d projecting from the tip end side of one arm portion 13b in the lower direction. The shutter portion 13a is comprised of an arc-like rod body having a curved surface corresponding to the outer peripheral edge of the optical disk D and has a recess portion 13e formed at the upper portion of its intermediate portion in the longitudinal direction to avoid coming in contact with the member disposed on its upper portion when it is elevated or lowered (rotated in the upper direction).

The arm portions 13b, 13c of the open/close shutter 13 have a pair of rotary shaft portions 13f formed at their base end portions so as to project to the outside. The right and left rotary shaft portions 13f are set on the same axis, and prolongations from the longitudinal direction of the shutter portion 13a are set to become approximately coincident with the central portions of the respective rotary shaft portions 13f. In order to rotatably support this open/close shutter 13, as shown in FIG. 1, the second through-hole 26b and the fourth through-hole 26d of the flat surface portion 11a of the main chassis 11 have a pair of bearing portions 35a, 35b provided at their outsides to rotatably support the pair of rotary shaft portions 13f. The right and left arm portions 13b, 13c may be removed and the respective rotary shaft portions 13f may be provided at the respective ends of the shutter portion 13a along the longitudinal direction.

Further, the shutter portion 13a of the open/close shutter 13 has a first guide portion 13h of V-like or U-like shape with its center side being more deeply recessed than the side of the rotary shaft portion 13f on its lower surface (surface of the opposite side of the direction in which it is moved when the shutter is opened and which surface slidably contacts with the outer peripheral edge of the upper surface of the optical disk D).

The left-hand bearing portion 35a of the flat surface portion 11a of the main chassis 11 has a through-hole 36a bored at its front side to receive the drive lever 13d of the open/close shutter 13 as shown in FIG. 4. The left-hand bearing portion 35a of this flat surface portion 11a has an upwardly-projecting spring receiving protrusion formed at its nearby portion on the opposite side of the through-hole 36a. One end of a compression coil spring 37 is engaged to this spring receiving protrusion. The other end of the compression coil spring 37 is engaged with a spring receiving protrusion 13g that downwardly projects at the end portion of the opposite side of the drive lever 13d of the arm portion 13b of the open/close shutter 13. Under the spring force of this compression coil spring 37, the shutter portion 13a of the open/close shutter 13 is constantly spring-biased in the direction in which the open/close shutter closes the disk entrance and exit slot 30.

The flat surface portion 11a of the main chassis 11 has a pair of bearing portions 35c, 35d provided at its rear portion to rotatably support the chucking arm 14 as shown in FIG. 6. The bearing portions 35c, 35d and the above-mentioned bearing portions 35a, 35b are composed of combinations of receiving members having recess portions for upwardly supporting the bearing portions and pressing members disposed outside the receiving members and which have claw portions projecting toward the recess portion sides.

Figure 13:
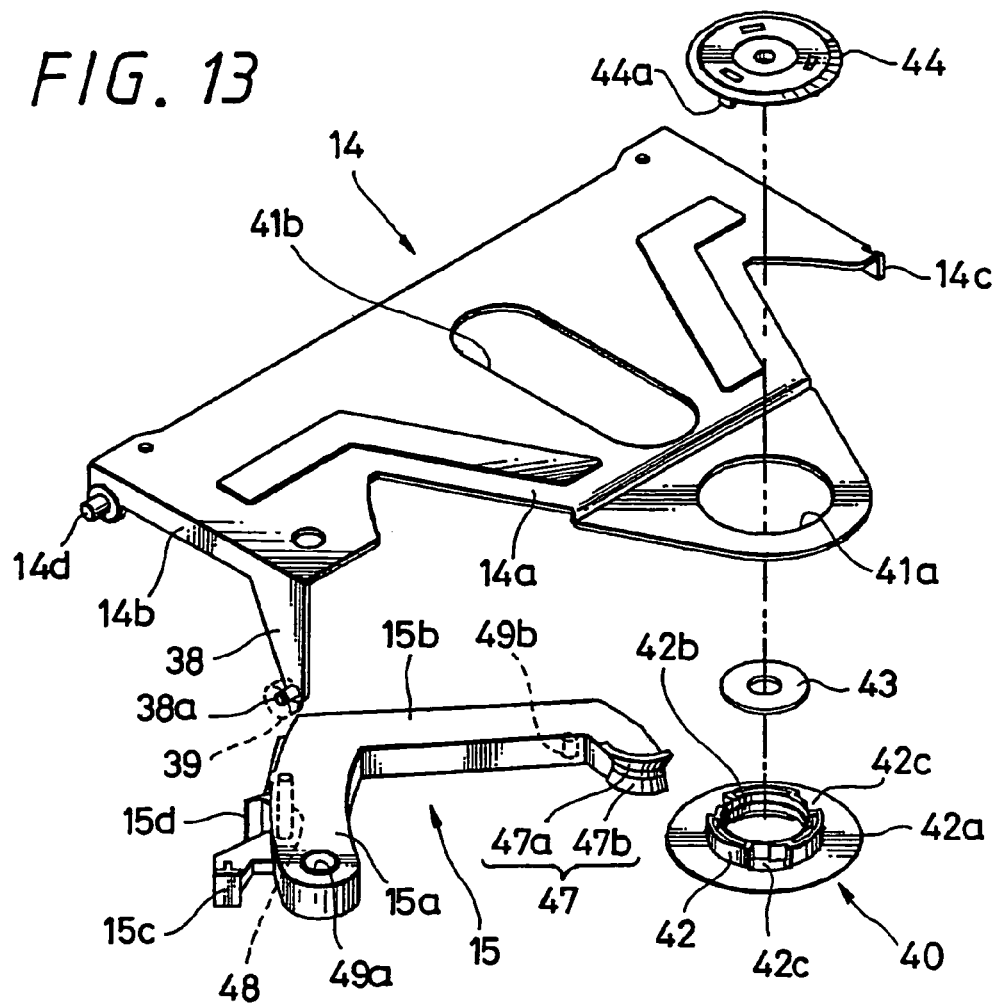
FIG. 13 is an enlarged exploded perspective view showing a chucking arm and a support lever of the recording and reproducing apparatus shown in FIG. 13.

As shown in FIG. 13 in an enlarged-scale, the chucking arm 14 is formed of a triangular plate material having an arm portion 14a at its center. Further, the chucking arm has a pair of side surface portions 14b, 14c serving as reinforcement side surface portions as well which are formed by bending part of the side portions 90 degrees in the same direction. The pair of side surface portions has a pair of shaft portions 14d projecting from their rear portions in the lateral directions in such a manner that these shaft portions may axially coincide with each other. The pair of bearing portions 35c, 35d rotatably supports the pair of shaft portions 14d, 14d so that the chucking arm 14 is supported in the way that the chucking arm can move upward and downward in the upper and lower direction Z with regard to the main chassis 11. This chucking arm 14 covers the upper rear portion of the disk compartment 23 including the opening portion 25.

Figure 25:
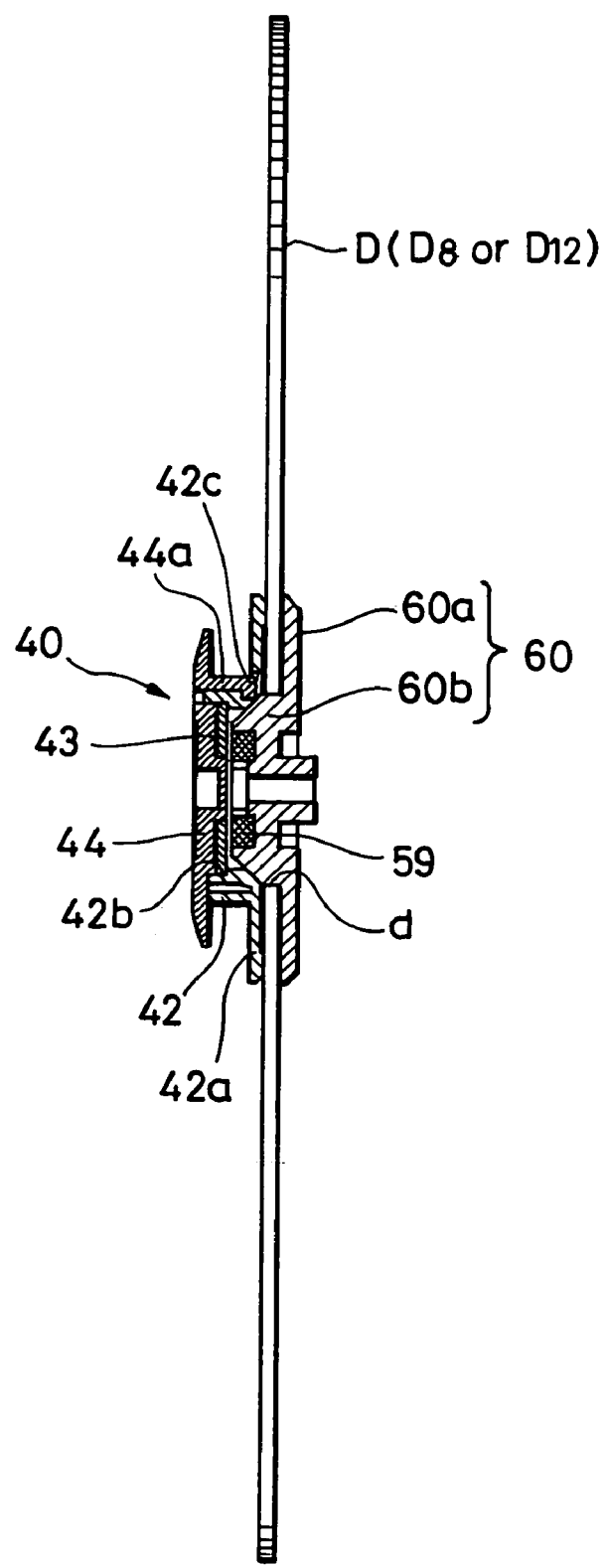
FIG. 25 is an explanatory diagram showing a chuck member in an enlarged cross-section of the disk recording and reproducing apparatus shown in FIG. 5.

Further, the chucking arm 14 has at one side surface portion 14b provided a drive lever 38 that projects in the lower direction. The drive lever 38 has at its tip end portion provided a shaft pin 38a that projects in the lateral direction. The shaft pin 38a supports thereon a roller 39 so that the roller can rotate freely. A through-hole 41a is bored through the tip end portion of the arm portion 14a of the chucking arm 14 so as to support a chucking member 40. The chucking member 40 supported by this through-hole 41a is composed of a chucking plate 42, a yoke 43 and a yoke presser 44 as shown in FIGS. 13 and 25.

The chuck plate 52 is shaped like an annular member that has an outgoing flange portion 42a formed at one surface of an annular core material. The chucking plate 42 has at its central portion provided a yoke housing portion 42b formed of an annular recess portion. The yoke housing portion 42b houses therein a disk-like yoke 43 made of a magnetic material such as an iron plate so that the disk-like yoke can be detached freely. Further, three recess holes 42c are formed on the outer peripheral surface of the core material of the chucking plate 42 at an equal interval along the circumferential direction. Each recess hole 42c extends up to the flange portion and three leg pieces 44a provided on the yoke presser 44 are inserted into these recess holes 42c such that the three leg pieces can engage with and/or disengage from the recess holes.

The three leg pieces 44a of the yoke presser 44 are located in the circumferential direction at an equal interval in response to the three recess portions 42c. Each leg piece 44a has at its tip end portion a pawl portion provided to maintain the engagement state between it and the core material. When the yoke presser 44 is slightly displaced from the chuck plate 42 in the circumferential direction, the leg pieces 44a and the recess hole 42c are engaged with each other or disengaged from each other in response to the rotation direction.

In the state in which the chuck plate 42 and the yoke presser 44 engage with each other, a clearance of a predetermined size is set between the flange portion 42a and the yoke presser 44. Accordingly, the chucking member 40 can move in the vertical direction perpendicular to the plane direction of the chucking arm 14 by an amount corresponding to such clearance. Further, a clearance of a predetermined size is also set between the core material of the chuck plate 42a and the through-hole 41a of the arm portion 14a. Accordingly, the chucking member 40 can move in the plane direction of the chucking arm 14 by an amount corresponding to such clearance.

The chucking arm 14 is biased in the direction in which it may approach the disk compartment 23 under the spring force of a chucking coil spring 45 as shown in FIG. 1. Specifically, one end of the coil spring 45 is fixed to one side surface portion 14c of the chucking arm 14 and the other end thereof is fixed to the receiving portion provided on the flat surface portion 11a of the main chassis 11. An opening window 41b that extends in the front and rear direction is formed at the rear of the through-hole 41a of this chucking arm 14. This opening window 41b is provided in order to visually confirm the state of the support lever 15 disposed under the chucking arm 14.

As shown in FIG. 13, the support lever 15 is composed of an arc-like circumferential-direction arm portion 15a, a radius-direction arm portion 15b continuing to one end of this circumferential-direction arm portion 15a in the radius direction, a disk holding portion 47 provided at the tip end portion of the radius-direction arm portion 15b, a spring receiving portion 15c and a sensor operation piece 15d provided on the circumferential-direction arm portion 15a and a cam pin 48 fixed to the circumferential-direction arm portion 15a.

A bearing hole 49a is formed at one end of the circumferential-direction arm portion 15a of the support lever 15 along the longitudinal direction, and a support shaft 50 that is fitted into this bearing hole 49a supports the support lever 15 such that the support lever may freely rotate in the plane direction of the flat surface portion 11a of the main chassis 11. As shown in FIG. 6, the support shaft 50 is erected on the outside of the partition wall 24 in the flat surface portion 11a and which is in the opposite side of the opening portion 25. Near the support shaft 50, the partition wall 24 includes a recess portion 24a into and from which the radius-direction arm portion 15b is inserted and ejected. The flat surface portion 11a having this recess portion 24a is provided with an arc-like guide groove 51a that can rotate about the support shaft 50.

The guide groove 51a is adapted to restrict movement of the support lever 15 and into which there is inserted a protrusion 49b provided near the disk holding portion 47 of the radius-direction arm portion 15b. The disk holding portion 47 of the support lever 15 is formed of a V-like groove portion of a V-like cross-section having an upper surface member 47a and a lower surface member 47b which are opened in the upper and lower directions. An outer peripheral edge of the optical disk D contacts with the bottom of this V-like groove portion such that it may slide on the bottom of this groove portion. The upper surface member 47a and the lower surface member 47b are both formed as arc-like members in order to maintain the state in which the optical disk D contacts with the bottom of the V-like groove portion. As shown in FIG. 1, this disk holding portion 47 is constantly biased toward the central side of the disk compartment 23 under the spring force of a lever coil spring 52.

As shown in FIG. 1, one end of the coil spring 52 is supported by the receiving portion provided on the bearing portion 35c of the flat surface portion 11a and the other end thereof is fixed to the spring receiving portion 15c of the support lever 15. The spring receiving portion 15c is provided near the bearing portion 49a of the circumferential-direction arm portion 15a so as to project in the outer direction. The spring receiving portion 15c has an operation member 15d, which projects downwardly, provided at its side opposite to the bearing portion 49a. Further, a cam pin 48 is provided at the outside of the operation member 15d so that it may project in the lower direction by a large length.

The cam pin 48 extends through the flat surface portion 11a and projects to the rear surface side, and the flat surface portion 11a has an arc-like pin hole 51b to maintain rotation of this cam pin 48.

Figure 2:
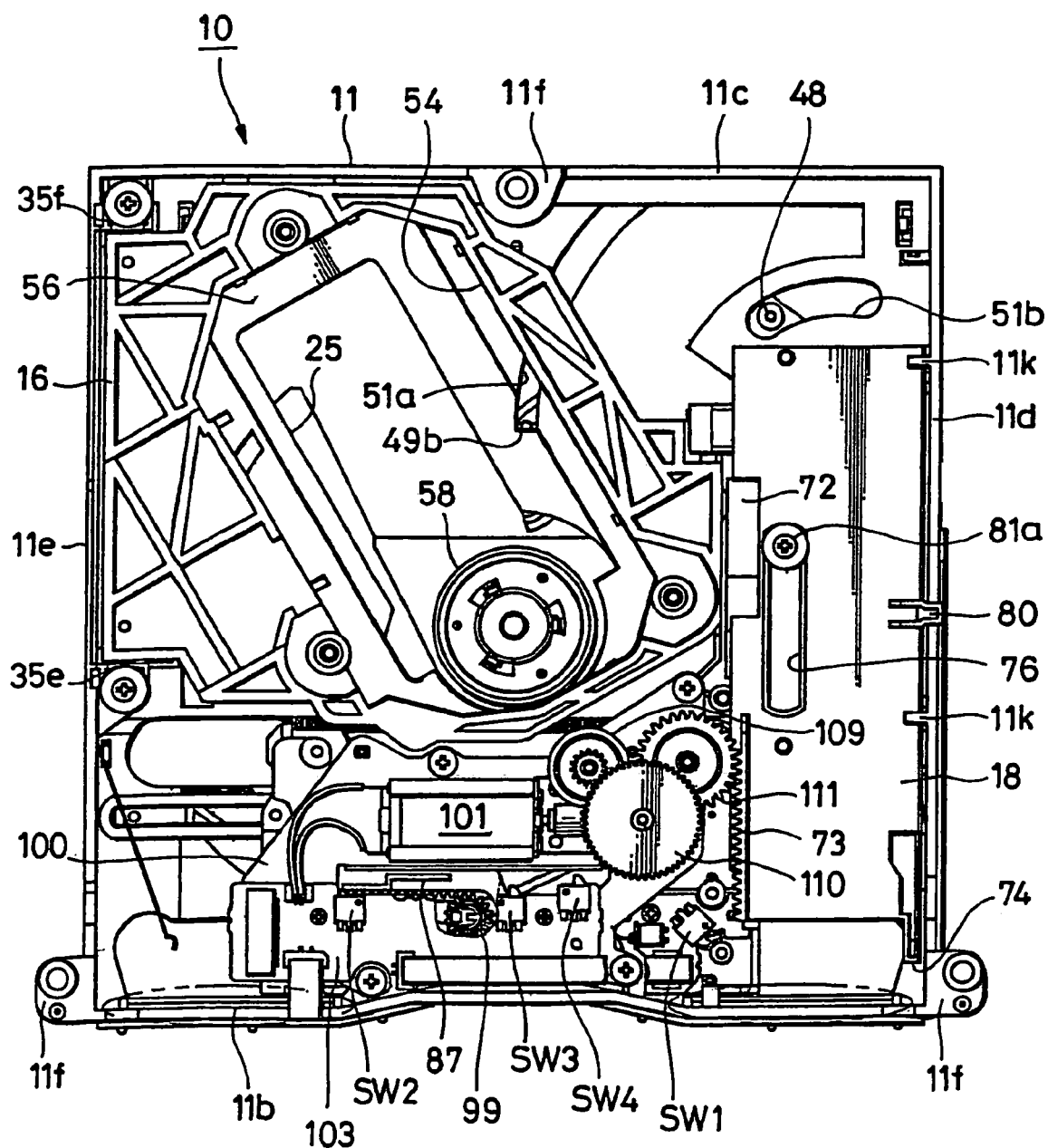
FIG. 2 is a bottom view showing a disk recording and reproducing apparatus concerning a disk recording and/or reproducing apparatus according to an embodiment of the present invention.
Figure 3:
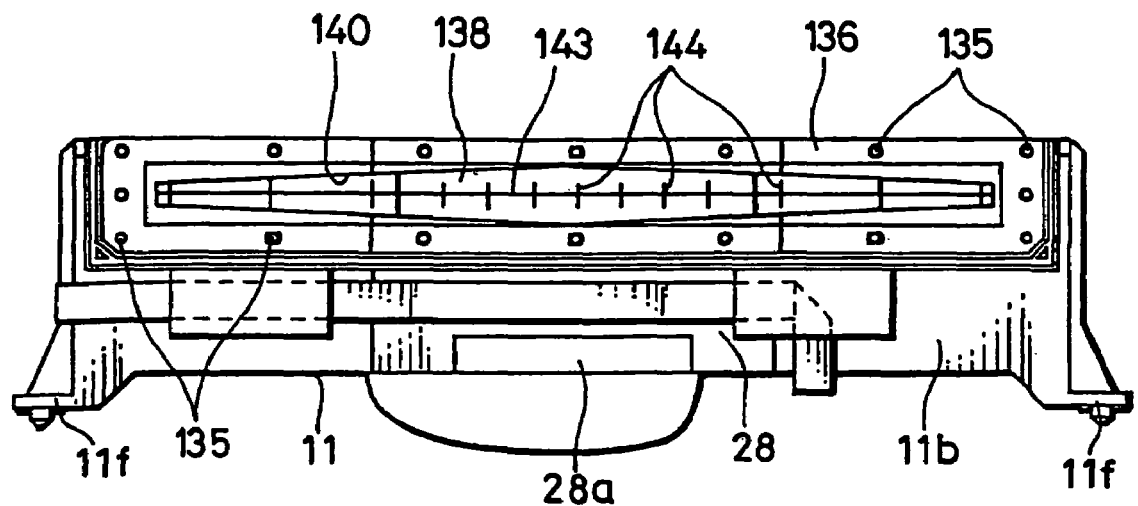
FIG. 3 is a front view showing a disk recording and reproducing apparatus concerning a disk recording and/or reproducing apparatus according to an embodiment of the present invention.

As shown in FIG. 2, on the inside of the left side surface portion 11e of the main chassis 11, there are provided a pair of bearing portions 35e, 35f which are spaced apart from each other with a predetermined interval in the front and rear direction X. The bearing portions 35e, 35f support the assembly body holder 16 at the rear portion of the back surface of the flat surface portion 11a such that the assembly body holder can be elevated and lowered in the upper and lower direction Z.

Figure 14:
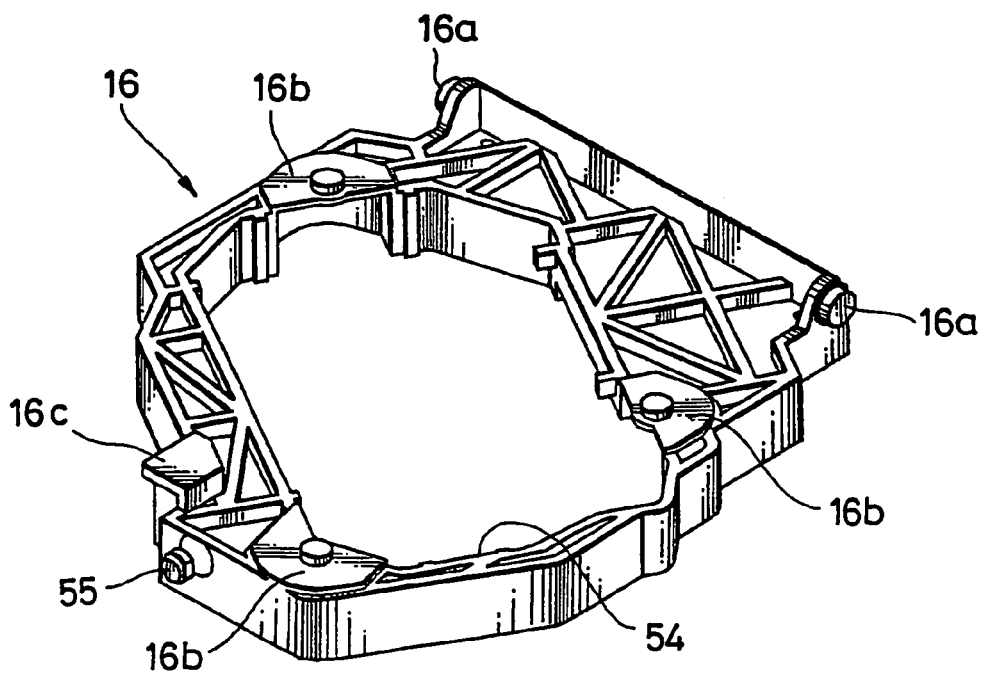
FIG. 14 is an enlarged perspective view showing an assembly body holder of the disk recording and reproducing apparatus shown in FIG. 5.

As shown in FIG. 14 in an enlarged-scale, the assembly body holder 16 is comprised of a frame body having an opening portion 54 for the pickup table assembly body 17 and is provided at its one side with a pair of shaft portions 16a, 16a that project outwardly at the both ends, respectively. The pair of bearing portions 35e, 35f supports the pair of shaft portions 16a, 16a so that the assembly body holder 16 can freely rotate in the upper and lower direction Z.

The assembly body holder 16 has at its side opposing the side in which the pair of shaft portions 16a, 16 are provided cam protrusion 55 protruding in the direction perpendicular to the direction in which the pair of bearing portions 16a, 16a are connected. The opening portion 54 of this assembly body holder 16 is extended at a certain angle in the direction crossing the direction in which the cam protrusion 55 protrudes. At the three positions of the outer edge of this opening portion 54, there are provided mount portions 16b for supporting the pickup table assembly body 17. Then, the assembly body holder 16 has a stopper portion 16c, which prevents the assembly body holder 16 from rotating in the lower direction by more than a predetermined amount, provided near the cam protrusion 55.

Figure 15:
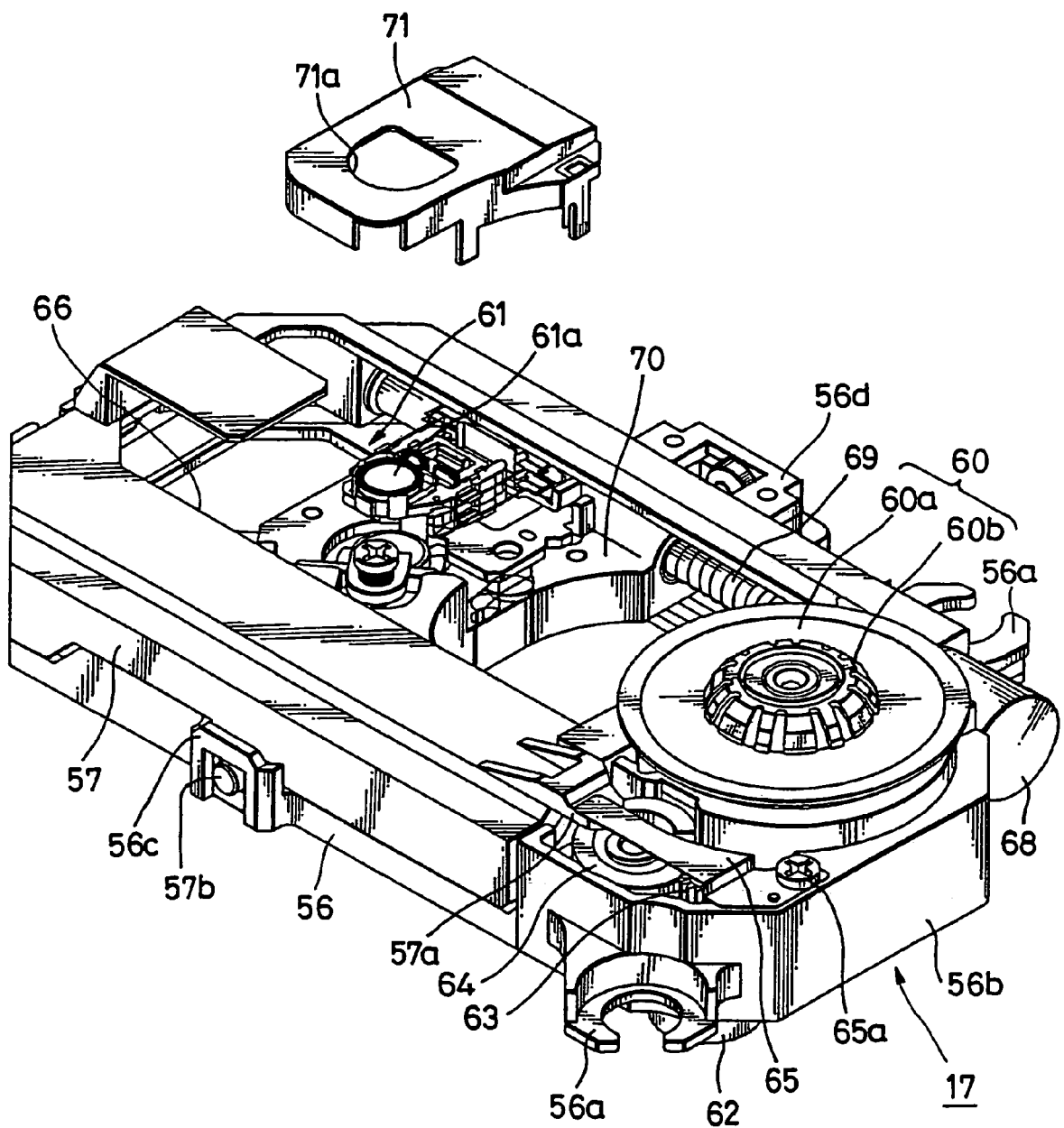
FIG. 15 is a perspective view of a pick-up table assembly body which is applied to the disk recording and reproducing apparatus shown in FIG. 5 according to an embodiment of the present invention.

The pickup table assembly body 17 that is mounted on this assembly body holder 16 has an arrangement shown in FIG. 15 and the like. Specifically, the pickup table assembly body 17 is composed of a spindle chassis 56 to which there is fixed a spindle motor 58 (see FIG. 2) to which a turntable 60 having the optical disk D for recording and reproducing an information signal loaded is fixed and a pickup chassis 57 for slidably supporting an optical pickup device 61, which shows a specific example of an optical pickup device for writing and reading an information signal on and from the optical disk D loaded on the turntable 60, and so on.

The spindle chassis 56 is formed of a frame-like member having a front surface portion, right and left surface portions and a rear surface portion. At the three positions of this spindle chassis 56, there are provided pawl-like support portions 56a having flat C-like shapes that can support the assembly body holder 16 through insulators, not shown. The spindle motor 58 is attached to the inside of a motor attachment mount 56b provided at the front surface portion of this spindle chassis 56 (see FIG. 2). A rotary shaft of this spindle motor 58 extends through the motor attachment mount 56b and projects above the spindle chassis 56, and the turntable 60 is integrally fixed to the projected portion of this rotary shaft.

As shown in FIG. 25, the turntable 60 includes a mount portion 60a on which there is mounted a peripheral edge portion of a center hole d of the optical disk D and an engagement portion 60b which engages with the center hole d. The mount portion 60a of the turntable 60 is shaped like a disk having a diameter slightly larger than the center hole d of the optical disk D, and the engagement portion 60b is provided at the central portion of the mount portion so as to project in the upper direction. This engagement portion 60b incorporates therein an annular magnet 59 and attraction force of this magnet 59 can attract the above-mentioned chucking member 40 to the turntable 60. As a consequence, the optical disk D that has been loaded on the turntable 60 is held by the chucking member 40 and the turntable 60 and thereby integrated therewith in the rotating direction.

To the inside of the motor attachment mount 56b of the spindle chassis 56, there is attached a tilt motor 62 in parallel to the spindle motor 58. A rotary shaft of the tilt motor 62 extends through the motor attachment mount 56b in the upper direction and a tilt gear 63 is fitted into and fixed to the upper end portion of the rotary shaft of the tilt motor. A gear portion of a tilt cam 64 is meshed with the tilt gear 63, and a cam protruded portion 57a provided on the pickup chassis 57 is opposed to the spiral cam surface formed on the upper surface of the tilt cam 64. This cam protruded portion 57a is pressed against the cam surface by a plate spring 65 screwed to the spindle chassis 56 by a fixing screw 65a.

The spindle chassis 56 has its approximately central portions in the longitudinal direction of both side surface portions provided with a pair of bearing portions 56c, 56d which are projecting in the lateral direction. A pair of shaft portions 57b, 57b provided on the pickup chassis 57 are fitted into the pair of bearing portions 56c, 56d, whereby the pickup chassis 57 can be supported to the spindle chassis 56 so that the pickup chassis can swing freely.

The pickup chassis 57 is formed of a frame-like member that can be laid over the upper portion of the spindle chassis 56. To the inside of this pickup chassis 57, there is supported the optical pickup device 61 such that the optical pickup device can move close to or away from the turntable 60. Then, the pickup chassis 57 has on its upper surface formed an opening portion 66 through which the optical head 61a of the optical pickup device 61 passes. At substantially central portions in the longitudinal direction of the side surface portions of the pickup chassis 57, there are provided the pair of shaft portions 57b, 57b which are projecting to the outside in the state in which their axial lines may coincide with each other, respectively.

Further, the pickup chassis 57 has a douser 67 attached to the upper surface of its rear portion. This douser 67 covers the upper portion of the optical head 61a of the optical pickup device 61, which has been moved in the outermost side of the optical disk, to protect the objective lens. A feed motor 68 is attached to the front end portion of one front surface of this pickup chassis 57 by a fixing means such as attachment screws. A rotary shaft of the feed motor 68 is served as a feed shaft 69 in which a spiral screw groove is formed at the outer peripheral surface. A rear end portion of this feed shaft 69 is rotatably supported to the rear portion of this pickup chassis 57.

The pickup chassis 57 has a guide shaft, not shown, attached to its opposite side of the feed shaft 69 in such a manner that the guide shaft may become parallel to the feed shaft 69. While being supported by this guide shaft, the optical pickup device 61 can move close to the turntable 60 or move away from the turntable 60 by rotation force of the feed shaft 69 in response to the rotation direction of the feed shaft. To this end, the optical pickup device 61 is provided with a slide member 70 through which the feed shaft 69 and a guide shaft are extended. This slide member 70 has a slide rack attached thereto, not shown, and rack teeth of this slide rack are meshed with screw grooves of the feed shaft 69.

The optical pickup device 61 includes a biaxial actuator that can independently move the objective lens of the optical head 61a in the focusing direction (upper and lower direction) and in the tracking direction (lateral direction). This biaxial actuator can be driven by mainly electromagnetic force, and a plate spring system, which is classified as a difference of a supporting system for a movable portion, can be used. Also, it is needless to say that other support systems such as a wire support system, a hinge system and a shaft slide system can be applied. In the figure, reference numeral 71 denotes a biaxial cover that covers the biaxial actuator, and this biaxial cover 71 has an opening window 71a to expose the objective lens.

The pickup table assembly body 17 having the above-mentioned arrangement is mounted on the assembly body holder 16 and thereby can be integrally rotated in the upper and lower direction when the assembly body holder 16 is elevated in the upper direction or lowered in the lower direction. This assembly body holder 16 is elevated and lowered by an elevation cam mechanism comprising the cam protrusion 55 of the assembly body holder 16 and an elevation cam portion 72 provided on the cam plate 18.

Figure 23:
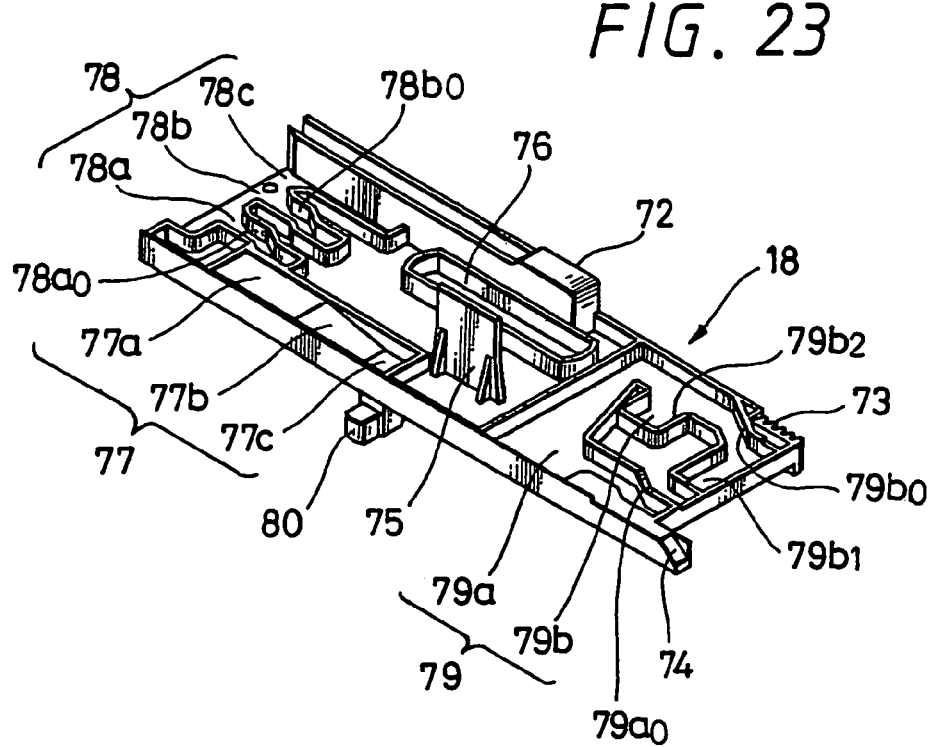
FIG. 23 is an enlarged perspective view of a cam plate of the disk recording and reproducing apparatus shown in FIG. 5.

As shown in FIG. 23, the cam plate 18 is formed of an approximately rectangular plate material and has the elevation cam portion 72 provided at an intermediate portion of one long side edge of its width direction. At one end in the longitudinal direction of the cam plate 18, that is, at the same long side as that of the elevation cam portion 72, there is provided a rack portion 73 having gears extending over a predetermined range of the longitudinal direction. A cam protrusion portion 74 that opens and closes the above-mentioned open/close shutter 13 is formed at one end in the longitudinal direction of the cam plate 18, that is, at the long side edge on the opposite side of the elevation cam portion 72. At the intermediate portions in the longitudinal direction of the cam plate 18, there are provided a switch operation member 75 and a guide hole 76 which are extended by predetermined lengths.

At one end in the longitudinal direction of the cam plate 18, there are provided a chucking cam portion 77 for elevating and lowering the above-mentioned chucking arm 14 and a lever cam portion 78 for controlling rotation of the support lever 15. Further, the cam plate 18 has a roller cam portion 79 provided at the other end of its longitudinal direction to control operations of a pair of roller assembly bodies 20, 21 that will be described later on. The cam plate 18 has an operation protrusion 80 provided at the intermediate portion of the long side edge on the opposite side of its elevation cam portion 72 to enable users to slide the cam plate 18 manually.

The elevation cam portion 72 of the cam plate 18 has an arrangement shown in FIGS. 28A to 28D. Specifically, the elevation cam portion 72 is composed of an upper horizontal portion 72a projecting in the upper surface of the cam plate 18, an inclined portion 72b continued from one end of this upper horizontal portion 72a to the oblique lower direction and a lower horizontal portion 72c continued from the lower end of this inclined portion 72b to the horizontal direction on the lower surface of the cam plate 18. This cam plate 18 is supported to the lower surface of the flat surface portion 11a of the main chassis 11 such that it can linearly slide in the front and rear direction.

A guide hole 76 is formed on the cam plate 18 in order to maintain slide operations of this cam plate 18. A guide shaft portion 11j that can slidably engage with this guide hole 76 is erected on the flat surface portion 11a of the main chassis 11. As shown in FIG. 2, the main chassis 11 has a pair of support portions 11k provided at its side surface portion 11d. In the state in which the pair of support portions 11k hold one side of the long side of the cam plate 18 and the guide shaft portion 11j is fitted into the guide hole 76, when a washer screw 81a is screwed into a tapped hole formed on its tip end face, the cam plate 18 is attached to the main chassis 11.

Figure 30A:
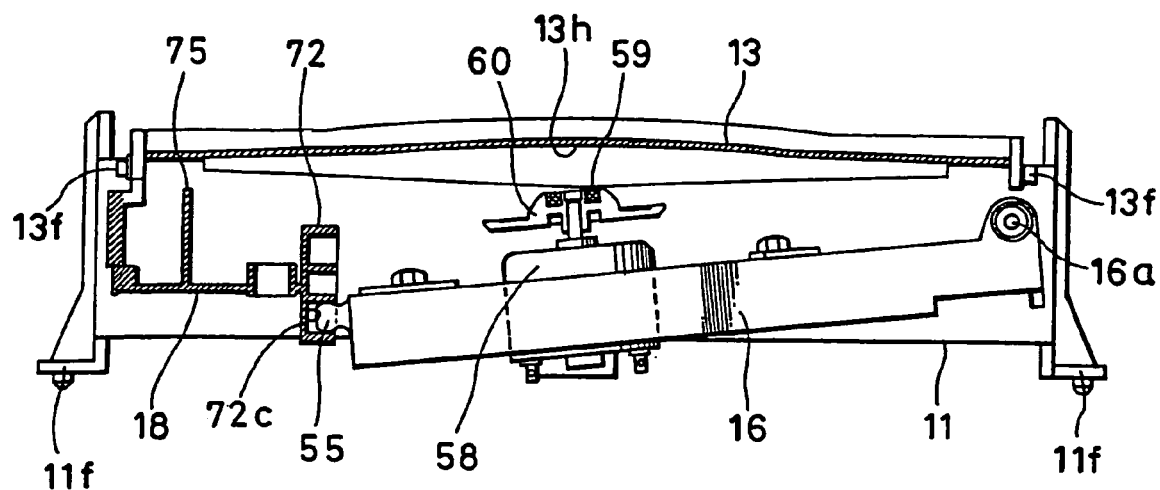
FIG. 30A is an explanatory diagram showing the cam plate, the turntable and the like from the front
Figure 30B:
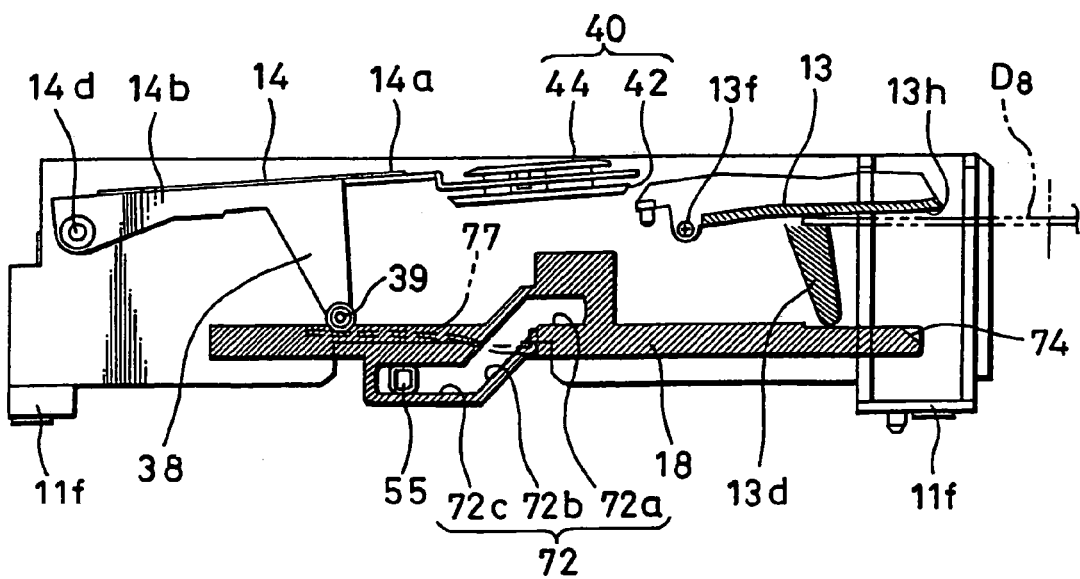
FIG. 30B is an explanatory diagram showing the open/close shutter, the chucking arm, the cam plate and the like from the side.

This cam plate 18 is slid in the front and rear direction X, whereby the assembly body holder 16 is elevated and lowered. Specifically, as shown in FIGS. 28A and 28B, when the cam plate 18 is located at the foremost portion of the main chassis 11, the cam protrusion 55 is located at the lower horizontal portion 72c that is located at the lowermost position of the elevation cam portion 72. Accordingly, as shown in FIGS. 30A and 30B, the assembly body holder is placed in the state in which its head is inclined in the forward direction. In this case, the turntable 60 is placed in the standby state at the lower position.

Figure 34A:
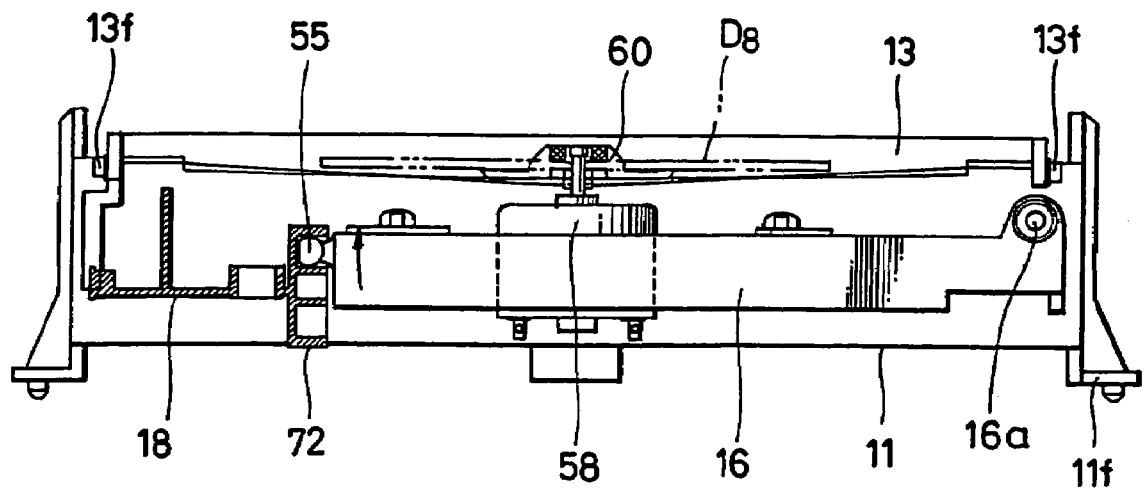
FIG. 34A is an explanatory diagram showing the cam plate, the turntable and the like from the front
Figure 34B:
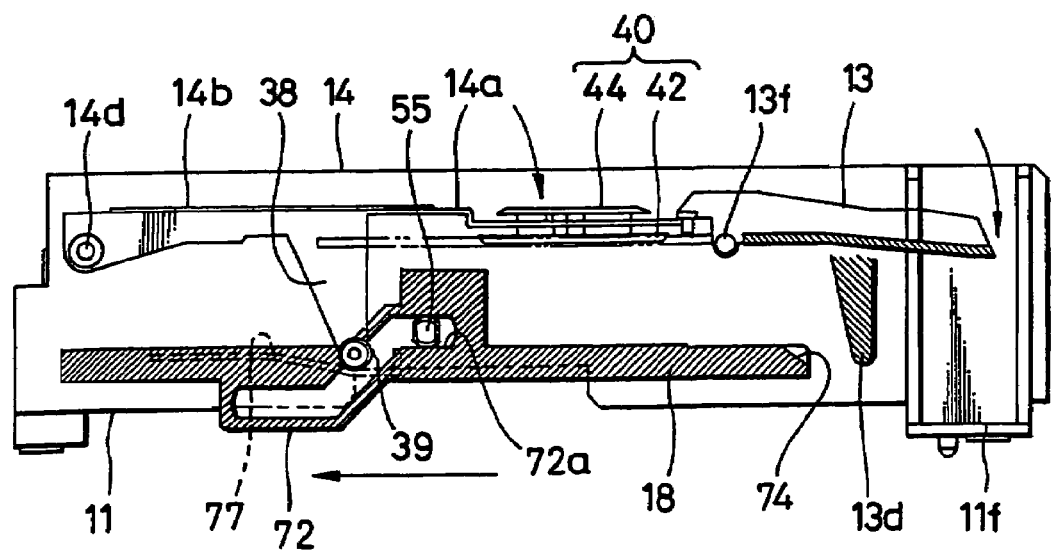
FIG. 34B is an explanatory diagram showing the open/close shutter, the chucking arm, the cam plate and the like from the side.
Figure 35:
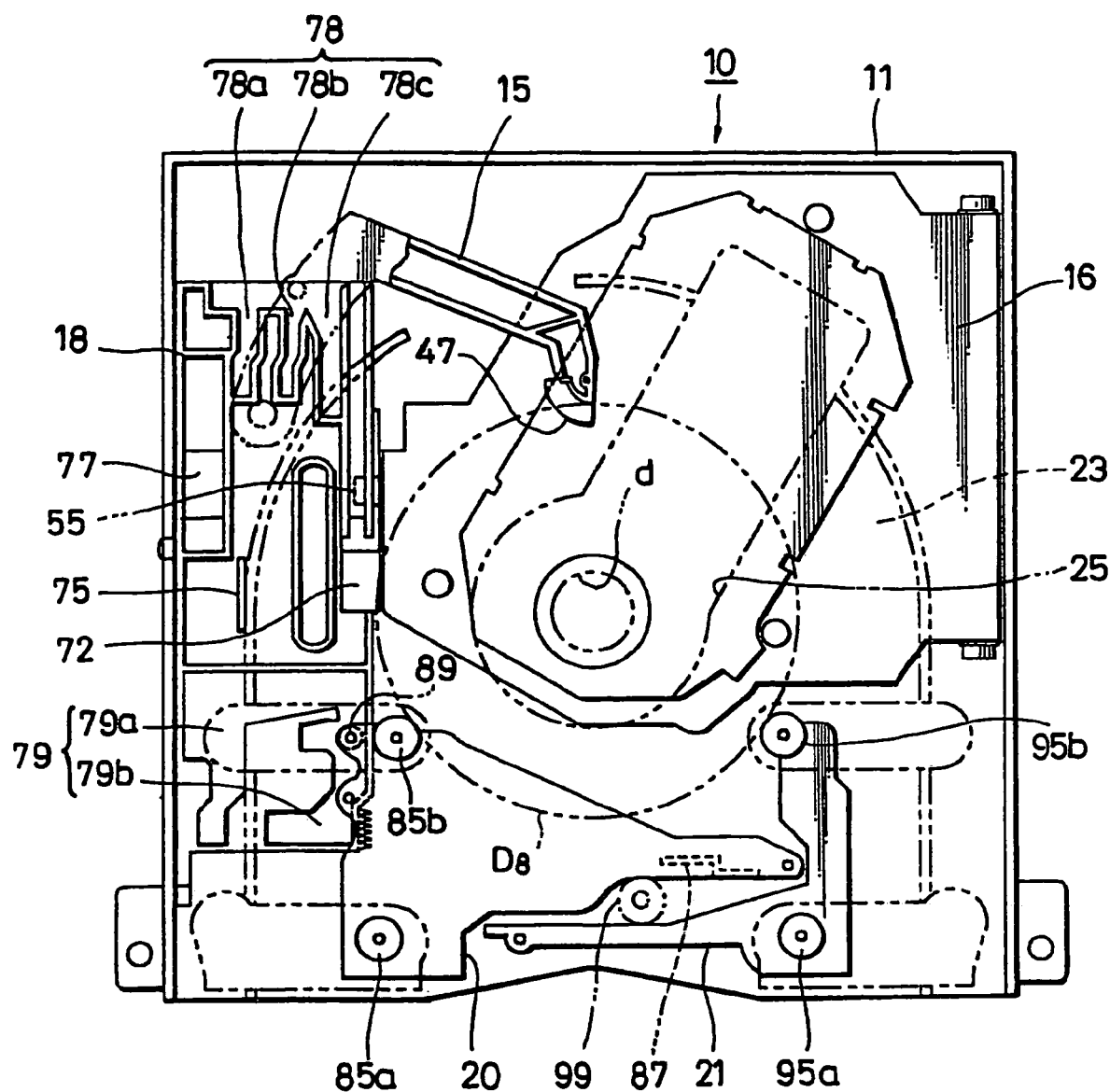
FIG. 35 is an explanatory diagram showing the state in which the optical disk is being ejected from the disk compartment when the 8 cm optical disk is available in the disk recording and reproducing apparatus shown in FIG. 5.
Figure 36A:
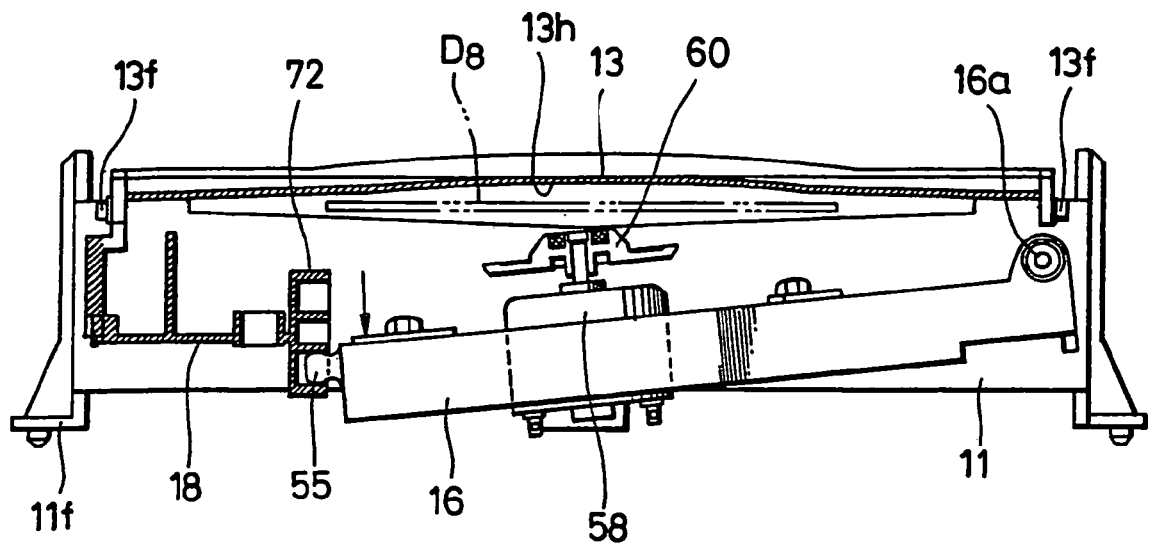
FIG. 36A is an explanatory diagram showing the cam plate, the turntable and the like from the front
Figure 36B:
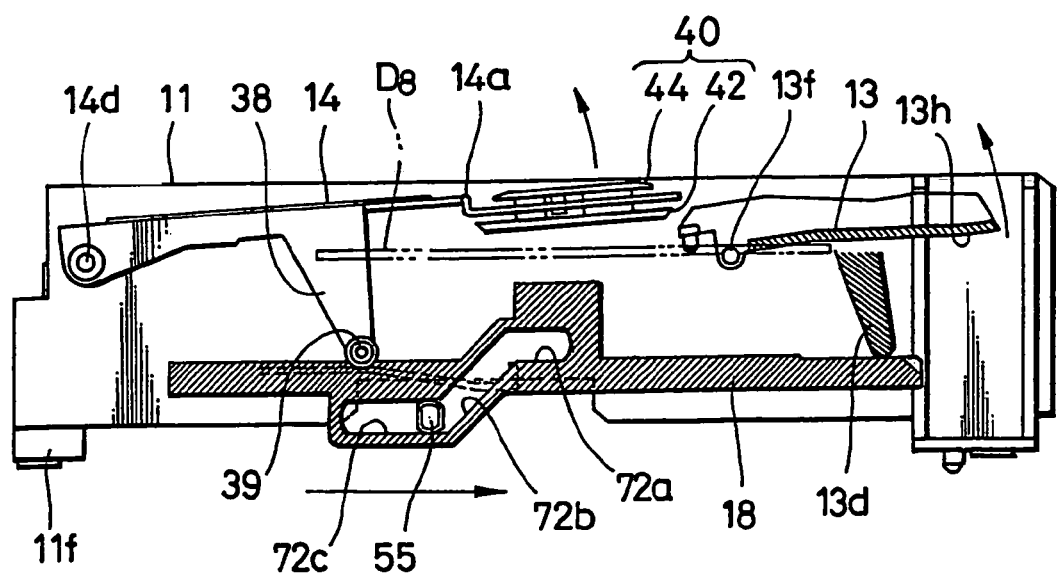
FIG. 36B is an explanatory diagram showing the open/close shutter, the chucking arm, the cam plate and the like from the side.

In this state, when the assembly body holder 16 is moved from the intermediate position shown in FIG. 28C to the rearmost portion shown in FIG. 28D, the cam protrusion 55 moves to the upper horizontal portion 72a through the inclined portion 72b of the elevation cam portion 72. As a consequence, as shown in FIGS. 34A and 34B, the assembly body holder 16 changes to approximately the horizontal state and the turntable 60 moves to the high position. At that time, the turntable 60 supports thereon the optical disk D accommodated within the disk compartment 23 and lifts up this optical disk D up to a predetermined height.

The chucking cam portion 77 of the cam plate 18 has an arrangement shown in FIG. 23 and so on. Specifically, the chucking cam portion 77 is composed of an upper horizontal portion 77a extending in the longitudinal direction of the cam plate 18, an inclined portion 77b continued from the front side of this upper horizontal portion 77a to the forwardly descending direction and a lower horizontal direction 77c continued from the lower end of this inclined portion 77b to the front side. With this chucking cam portion 77, there is brought in rotatable contact a roller 39 that is rotatably supported to the drive lever 38 of the chucking arm 14 as shown in FIG. 30 and so forth.

In this case, when the roller 39 is located at the upper horizontal portion 77a of the chucking cam portion 77, as shown in FIG. 30 and so on, the free end side of the chucking arm 14 is elevated so that the chucking member 40 is lifted to the high position. As a consequence, the disk compartment 23 can increase its upper space in which the disk is loaded.

On the other hand, when the roller 39 moves to the lower horizontal portion 77c from the upper horizontal portion 77a through the inclined portion 77b, as shown in FIG. 34B and the like, the free end side of the chucking arm 14 is lowered so that the chucking member 40 is descended to the lower position. As a consequence, the chucking member 40 is placed in an approximately the horizontal state and thereby is opposed to the turntable 60 that is lifted from the lower direction. At that time, when the optical disk D is accommodated within the disk compartment 23, the optical disk D is held between the turntable 60 and the chucking member 40 and thereby the optical disk D is chucked.

The lever cam portion 78 of the cam plate 18 has an arrangement shown in FIGS. 23 and 28A. Specifically, the lever cam portion 78 is composed of a first cam portion 78a for holding the disk holding portion 47 of the support lever 15 at the outer peripheral edge of the disk compartment 234, a second cam portion 78b for holding the disk holding portion 47 at the intermediate portion of the disk compartment 23 in the radius direction and a third cam portion 78c for holding the disk holding portion 47 at the inner peripheral edge of the disk compartment 23. The first to third cam portions 78a to 78c are provided in the width direction of the cam plate 18 at a proper interval so that they may extend in the longitudinal direction, respectively.

Further, the first to third cam portions 78a to 78c are communicated with each other in the opposite side of the roller cam portion 79 of the cam plate 18, and to and from which there can selectively be inserted and ejected the cam pin 48 of the support lever 15 that engages with this lever cam portion 78. The first and second cam portions 78a and 78b have escape portions $78a_0$ and $78b_0$ provided at their bottom portions to enable the disk holding portion 47 to escape from the optical disk D at the outer peripheral edge of the disk compartment 23 and in the intermediate portion of the radius direction so that the optical disk D and the disk holding portion 47 can be prevented from slidably contacting with each other.

The roller cam portion 79 of the cam plate 18 has an arrangement shown in FIGS. 23, 28A and so forth. Specifically, the roller cam portion 79 has a large-diameter cam portion 79a and small-diameter cam portion 79b that can control the positions of the pair of roller assembly bodies 20, 21 in response to the diameter of the optical disk D. The large-diameter cam portion 79a and the small-diameter cam portion 79b are provided in the width direction of the cam plate 18 at a proper interval such that they may extend in the longitudinal direction, respectively. Further, the large-diameter cam portion 79a and the small-diameter cam portion 79b are communicated with each other on the lever cam portion 78 side of the cam plate 18, and to and from which there can selectively be inserted and ejected a cam pin, which will be described later on, of the drive-side roller assembly body 20 that engages with the roller cam portion 79.

The large-diameter cam portion 79a of the roller cam portion 79 has an escape portion $79a_0$ provided at its bottom portion to enable a drive roller 85b and a fixed roller 95b, which will be described later on, to escape from the optical disk D accommodated within the disk compartment 23 so that the optical disk D, the drive roller 85b and the fixed roller 95b can be prevented from slidably contacting with one another. The small-diameter cam portion 79b has escape portions $79b_0$ and $79b_1$ provided at its intermediate portion and bottom portion to enable the rollers 85b, 95b to escape from the optical disk D so that the optical disk D and the rollers 85b, 95b can be prevented from slidably contacting with each other.

The escape portion $79b_1$ provided at the intermediate portion of the small-diameter cam portion 79b is adapted to control the positions of the pair of roller assembly bodies 20, 21 when the small-diameter disk (e.g. disk having the diameter of 8 cm) $D_8$ is inserted into the disk recording and/or reproducing apparatus. When the large-diameter disk (e.g. disk having the diameter of 12 cm) $D_{12}$ is inserted into the recording and/or reproducing apparatus, the escape portion $79b_0$ provided at the bottom portion is adapted to control the positions of the pair of roller assembly bodies 20, 21.

The pair of the roller assembly bodies 20, 21 that are controlled in terms of position by the roller cam portion 79 of the cam plate 18 having the above-mentioned arrangement have the following arrangements.

Figure 16:
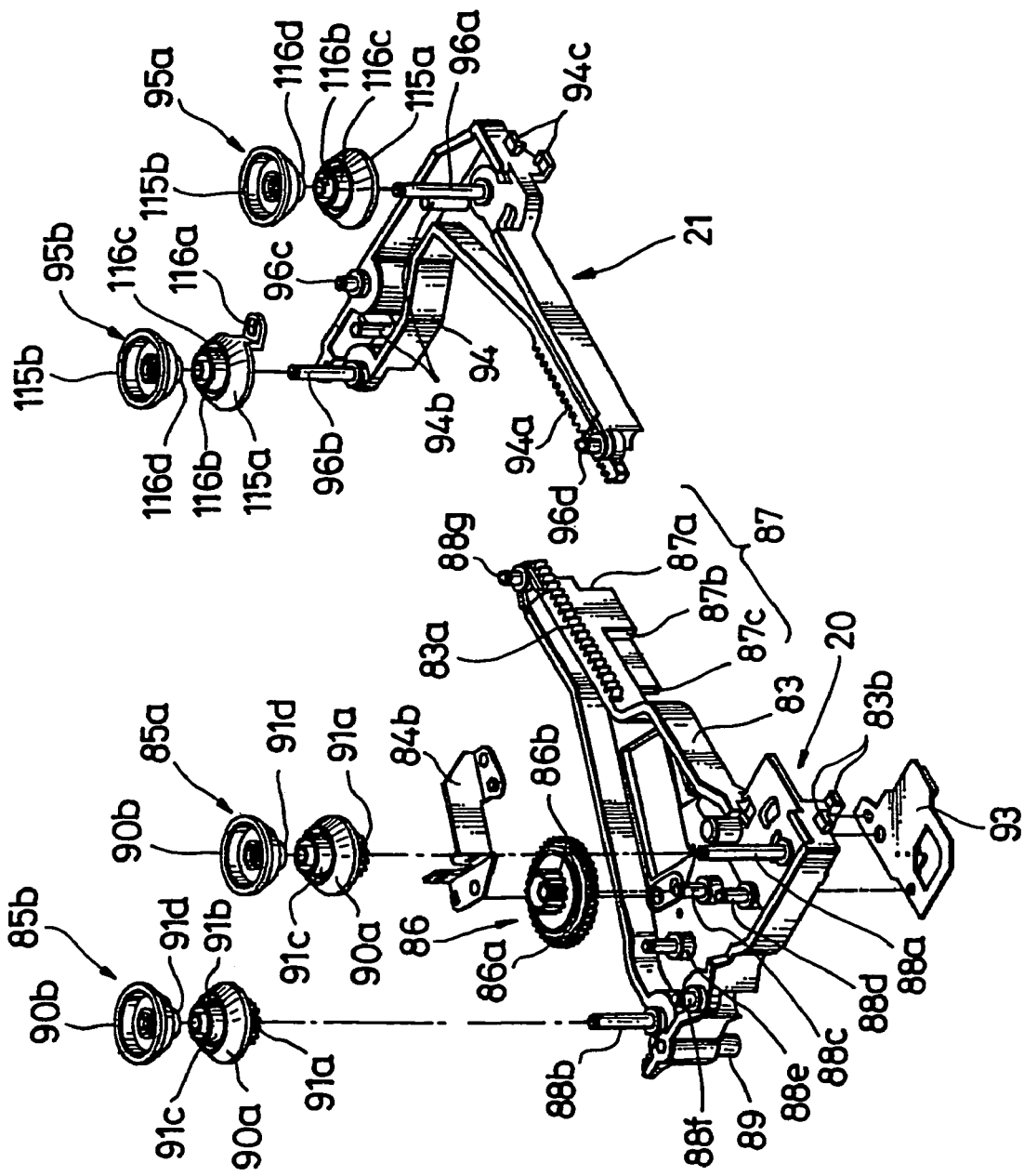
FIG. 16 is an enlarged perspective view showing a drive-side roller assembly body and a fixed-side roller assembly body of the disk recording and reproducing apparatus shown in FIG. 5 in an scale.
Figure 17A:
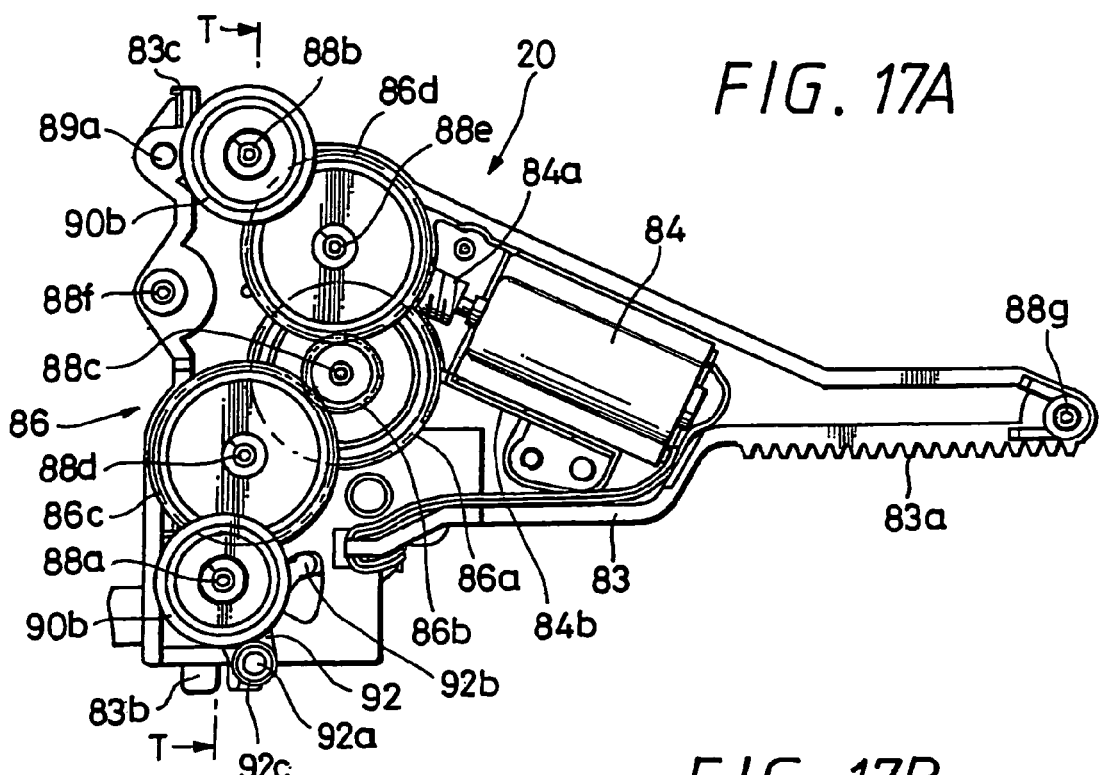
FIG. 17A is a plan view thereof.

As shown in FIGS. 16, 17A and the like, one drive-side roller assembly body 20 is comprised of a drive-side guide lever 83 serving as the first support member, a drive motor 84 which shows a specific example of the drive means mounted on this drive-side guide lever 83, a pair of drive rollers 85a, 85b which show a specific example of the first transport member rotatably attached to the drive-side guide lever 83, a first gear mechanism 86 for transmitting power of the drive motor 84 to the pair of drive rollers 85a, 85b to rotate the pair of drive rollers in the same direction and so forth.

The drive-side guide lever 83 of the drive-side roller assembly body 20 includes a roller support portion extending in the front and rear direction and an arm portion extending from one side of this roller support portion to the lateral direction, and the arm portion has a rack portion 83a whose gears are arranged in the right and left direction provided at its front surface. The rack portion 83a has an operation member 87 integrally provided at its bottom portion to turn on and turn off a second detection switch SW2, a third detection switch SW3 and a fourth detection switch SW4 for detecting positions which will be described later on.

The operation member 87 has a crank-like plane shape, and one end of the tip end side of the arm portion serves as a first operation portion 87a that is used to turn on and turn off the second detection switch SW2. Further, the intermediate bent portion of the operation member 87 serves as a second operation portion 87b that is used to turn on and turn off the third detection switch SW3. Then, the other end of the opposite side of the operation portion 87a of the operation member 87 serves as a third operation portion 87c that is used to turn on and turn off the fourth detection switch SW4.

The drive-side guide lever 83 has two roller support shafts 88a, 88b, three gear support shafts 88c, 88d, 88e, two guide pins 88f, 88g and one shaft pin 89a that are integrally implanted thereon. Only the shaft pin 89a projects to the lower surface side of the drive-side guide lever 83 and its projected portion rotatably supports a roller 89. This roller 89 engages with the roller cam portion 79 of the above-mentioned cam plate 18.

The first roller support shaft 88a rotatably supports the first drive roller 85a, and the second roller support shaft 88b rotatably supports the second drive roller 85b. The first gear support shaft 88c rotatably supports a worm wheel 86a, and a small-diameter gear 86b is integrally formed with this worm wheel 86a. The small-diameter gear 86b is meshed with a first intermediate gear 86c and a second intermediate gear 86d. Then, the first intermediate gear 86c is rotatably supported to the second gear support shaft 88d and the second intermediate gear 86d is rotatably supported to the third gear support shaft 88e.

A worm 84a is meshed with the worm wheel 86a and this worm 84a is fixed to the rotary shaft of the drive motor 84. The drive motor 84 is fixed to the drive-side guide lever 83 by a fixing means such as a fixing screw through the motor base 84b. Rotation force of this drive motor 84 is transmitted from the worm 84a to the worm wheel 86a and the small-diameter gear 86b and also transmitted to the respective gear portions 85c, 85c of the pair of drive rollers 85a, 85b from this small-diameter gear 86*b* through the respective intermediate gears 86*c*, 86*d*. Accordingly, the pair of drive rollers 85*a*, 85*b* are forced to rotate by rotation of the drive motor 84.

The small-diameter gear 86*b*, the first and second intermediate gears 86*c*, 86*d* and the gear portion 85*c* are all formed of helical gears. Thus, noises generated when the first gear mechanism 86 is driven can decrease.

Figure 17B:
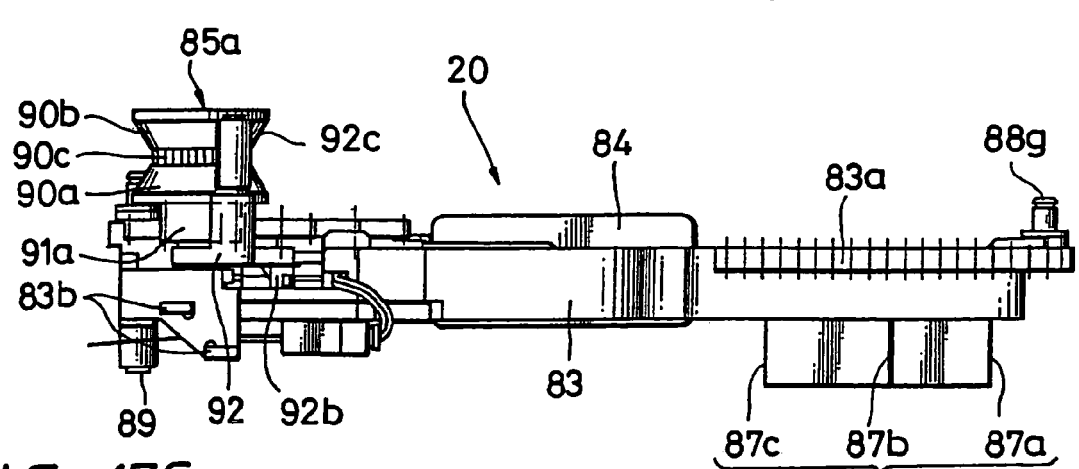
FIG. 17B is a front view thereof and FIG. 17C is a side view thereof.
Figure 17C:
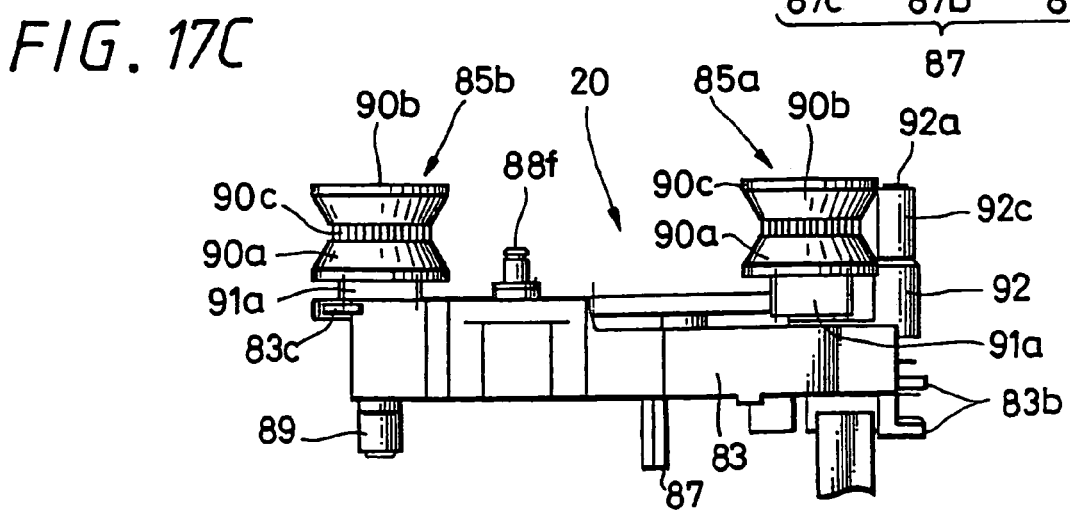
Figure 18:
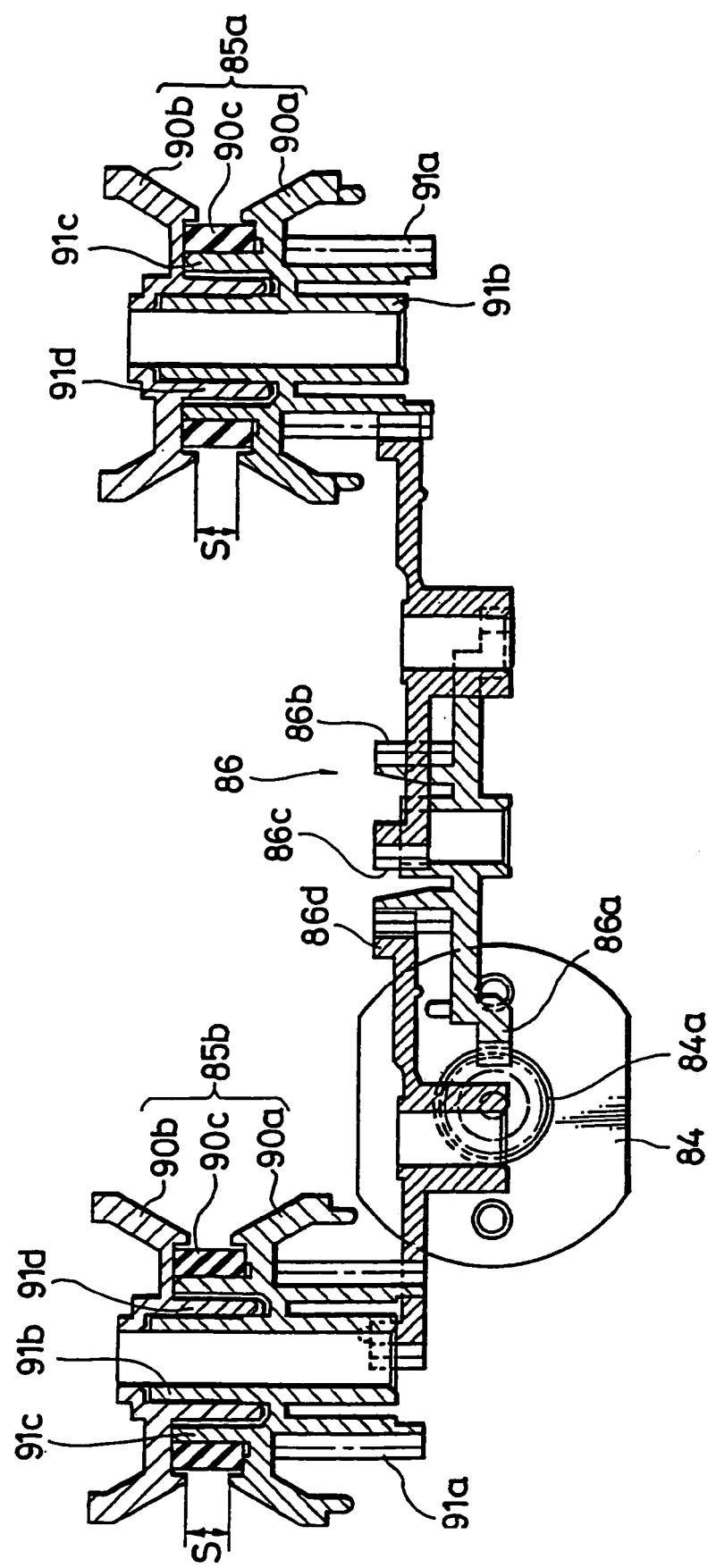
FIG. 18 is an enlarged cross-sectional view taken along the line T-T of the drive-side roller assembly body shown in FIG. 17A.

As shown in FIGS. 17B and 17C, the pair of drive rollers 85*a*, 85*b* project upwardly as compared with other assemblies such as the drive motor 84 and the intermediate gears 86*c*, 86*d*. As shown in FIG. 18 in a cross-sectional fashion, each of the drive rollers 85*a*, 85*b* is comprised of a drive member 90*a*, a rotating member 90*b* and a cushion member 90*c*. The drive member 90*b* is formed of an annular member whose upper surface is shaped as a conical tapered surface and has a gear portion 91*a* integrally formed at its lower surface. The rotating member 90*b* opposing the drive member 90*b* is formed of an annular member whose lower surface is shaped like an inverse conical tapered surface. The drive member 90*a* and the rotating member 90*b* have a clearance that is slightly larger than the thickness of the optical disk D and the groove portion has the annular cushion member 90*c* provided at its bottom.

Each drive member 90*a* has a cylindrical inner shaft portion 91*b* provided at its center to receive the roller support shafts 88*a*, 88*b* and also has a cylindrical outer shaft portion 91*c* provided at its center to become coaxial with this inner shaft portion 91*b*. Then, a cylindrical shaft portion 91*d* provided on the rotating member 90*b* is inserted between the inner shaft portion 91*b* and the outer shaft portion 91*c* with a proper clearance so that they can become rotatable relatively. When a snap ring is engaged with the upper end portion of the roller support shafts 88*a*, 88*b* passing through the these drive member 90*a* and rotating member 90*b*, the rotating member 90*b* is prevented from coming off. The rubber-like elastic body made of a suitable material such as rubber and soft plastics is engaged with the outer bearing portion 91*c* of the drive member 90*a*.

The cushion material 90*c* should preferably be made of a material softer than the optical disk D and whose friction resistance is large. This cushion member 90*c* is exposed from the clearance S between the-drive member 90*a* and the rotating member 90*b*. The outer peripheral edge of the optical disk D enters into this clearance S and comes in contact with the surface of the cushion member 90*c*. The outer peripheral edge of the optical disk D is urged against the drive-side cushion member 90*c* and friction force generated between the outer peripheral edge and the cushion member 90*c* gives rotation force to the optical disk D. As will be described later on, the optical disk D is rotated in cooperation with rotation force of the drive-side cushion member 90*c* and friction force of a fixed-side cushion member 90*c* which will be described later on.

As shown in FIGS. 17A to 17C, the first roller support shaft 88*a* has a detection member 92 rotatably attached thereto to detect whether or not the optical disk D should be inserted. This detection member 92 includes a support shaft 92*a* upwardly projected in the outside of the diametrical direction of the drive roller 85*a* and an operation pin 92*b* downwardly projecting in the outside of the diametrical direction of the like drive roller 85*a*. The support shaft 92*a* has the guide roller 92*c* rotatably supported thereto at approximately the same height as those of the drive-side and fixed-side cushion members 90*c*, 90*c*. The guide roller 92*c* and the operation pin 92*b* are disposed at the positions that are rotated about the roller support shaft 88*a* approximately 90 degrees.

The detection member 92 is biased under the spring force of a torsion coil spring, not shown, whereby the guide roller 92*c* is located in front of the drive roller 85*a*. In response to the operation pin 92*b* of this detection member 92, the drive-side guide lever 83 has the first detection switch SW1 attached thereto to detect whether or not the optical disk D is inserted from the disk entrance and exit slot 30.

The first detection switch SW1 and the following second to eighth detection switches SW2 to SW8 are all on/off change-over switches. When the operation member is pressed, they are energized to output an on-signal. When on the other hand the depression of the operation member is released, they are de-energized to output an off-signal.

The first detection switch SW1 is fixed to the lower surface of the drive-side guide lever 83 by screws through a printed-wiring board 93. The first detection switch SW1 is depressed and energized by the operation pin 92*b* that is biased under the spring force of the torsion coil spring. Specifically, when the optical disk D is inserted, the outer peripheral edge of the optical disk D (the same as in both cases of the large-diameter disk $D_{12}$ having the diameter of 12 cm and the small-diameter disk $D_8$ having the diameter of 8 cm as well) rotate the detection member 91 in the clockwise direction in FIG. 26, whereby the operation pin 92*b* presses the operation member to changeover the first detection switch SW1 to "on". Then, when the optical disk D is passed, the operation pin 92*b* is returned to the original state under the spring force of the torsion coil spring, whereby the first detection switch SW1 is de-energized.

Figure 19A:
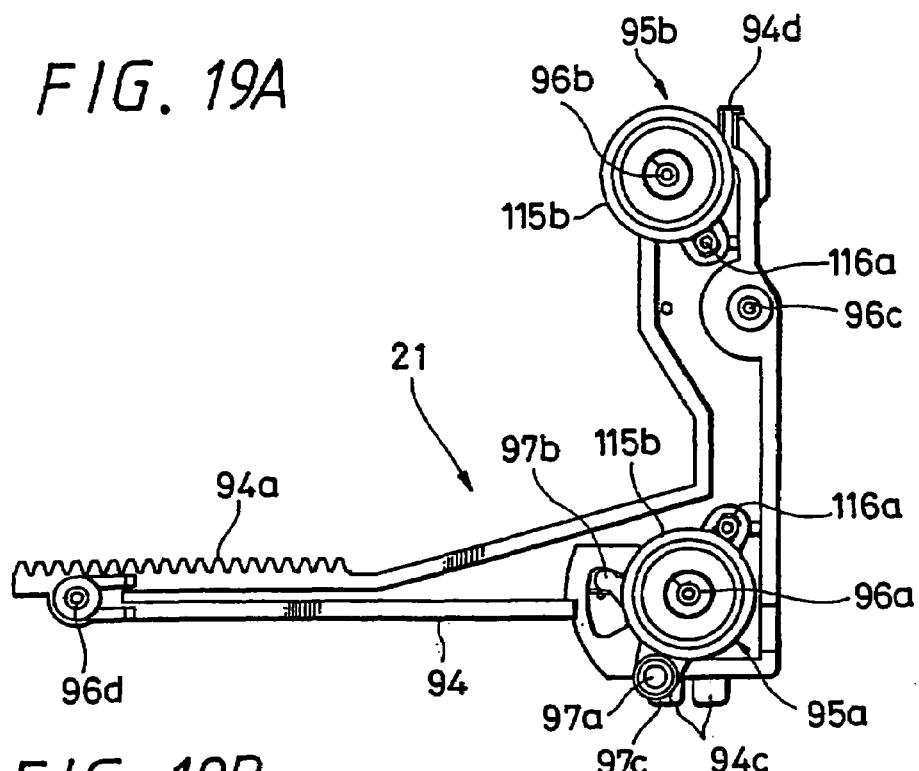
FIG. 19A is a plan view thereof.

As shown in FIGS. 16, 19A and so forth, the fixed-side roller assembly body 21 includes a fixed-side guide lever 94 serving as the second support member and a pair of fixed rollers 95*a*, 95*b* which show a specific example of the second transport member attached to this fixed-side guide lever 94 and the like. The fixed-side guide lever 94 includes a roller support portion extending in the front and rear direction and an arm portion extending from one side of this roller support portion to the lateral direction. The arm portion has a rack 94*a* with its gears arranged in the right and left direction provided at its rear surface.

Further, the fixed-side guide lever 94 has two roller support shafts 96*a*, 96*b* and two guide pins 96*c*, 96*d* implanted integrally therewith. A first fixed roller 95*a* is fitted over the first roller support shaft 96*a*, and a second fixed roller 95*b* is fitted over the second roller support shaft 96*b*. The pair of fixed rollers 95*a*, 95*b* are similar to the pair of drive rollers 85*a*, 85*b* except that a fixed member is fixed to the fixed-side guide lever 94.

Specifically, each of the fixed rollers 95*a*, 95*b* is composed of a fixed member 115*a*, a rotating member 115*b* and a cushion member, not shown. The fixed member 115*a* is formed of an annular member whose upper surface is shaped like a conical tapered surface and include a base member 116*a* to fix it to the fixed-side guide lever 94. These base members 116*a* are engaged with engagement pins 94*b* provided on the fixed-side guide lever 94. The respective fixed rollers 95*a*, 95*b* are fixed to the fixed-side guide lever 94 by caulking the tip end portions of the respective engagement pins 94*b*.

The rotating member 115*b* opposing the fixed member 115*a* is formed of an annular member whose lower surface is shaped like an inverse conical tapered surface. The fixed member 115*a* and the rotating member 115*b* have a clearance S slightly larger than the thickness of the optical disk D. The groove portion has an annular cushion member 115*c* (see FIGS. 19A to 19C and it has a similar arrangement to that of the cushion member 90*c* of the drive rollers 85*a*, 85*b*) provided at its bottom.

Each fixed member 115*a* has a cylindrical inner shaft portion 116*b* formed at its central portion to receive roller support shafts 96*a*, 96*b* and also has a cylindrical outer shaft portion 116*c* formed at its central portion to become coaxial with this inner shaft portion 116*b*. Then, the cylindrical shaft portion 116*d* provided on the rotating member 115*b* is inserted into the inner shaft portion 116*b* and the outer shaft portion 116*c* with a proper clearance so that the inner and outer shaft portions become rotatable relatively. When a snap ring is engaged with the upper end portions of the roller support shafts 96*a*, 96*b* which extend through the rotating members 115*a* and 115*b*, the rotating member 115*b* can be prevented from being coming off.

A cylindrical cushion member 115*c* made of a rubber-like elastic material such as rubber and soft plastics is fitted into the outer shaft portion 116*c* of the fixed member 115*a*. This cushion member 115*c* is exposed from a clearance between the fixed member 115*a* and the rotating member 115*b*. The outer peripheral edge of the optical disk D enters into this clearance and friction force generated between the outer peripheral edge and the fixed-side cushion member 115*c* gives rotation force to the optical disk D.

The drive-side roller assembly body 20 having the above-mentioned arrangement is supported to the lower portion of the front side of the flat surface portion 11*a* of the main chassis 11 such that it can slide in the right and left direction Y. At that time, as shown in FIG. 1, the first drive roller 85*a* and the guide roller 92*c* of the drive-side roller assembly body 20 project upwardly from the first roller through-hole 26*a* of the flat surface portion 11*a*, and the second drive roller 85*b* project upwardly from the second roller through-hole 26*b*.

Then, a first guide pin 88*f* projects upwardly from the first guide oblong hole 27*a* and a second guide pin 88*g* projects upwardly from the second guide oblong hole 27*b*. The respective guide pins 88*f*, 88*g* can be prevented from being disengaged from the respective guide oblong holes 27*a*, 27*b* by snap rings engaged with the upper end portions of the respective guide pins.

Further, as shown in FIGS. 17A to 17C, on the front of the drive-side guide lever 83, there are provided a pair of holding members 83*b*, 83*b* with a predetermined clearance in the upper and lower direction such that they may be slightly displaced in the right and left direction. The pair of holding members 83*b*, 83*b* are slidably engaged with the guide rail 11*m* provided on the inner surface of the front surface portion 11*b* of the main chassis 11. The drive-side guide lever 83 is provided with the spring receiving member 83*c*. The fixed-side roller assembly body 21 is disposed so as to oppose the drive-side roller assembly body 20 in the right and left direction Y.

Figure 19B:
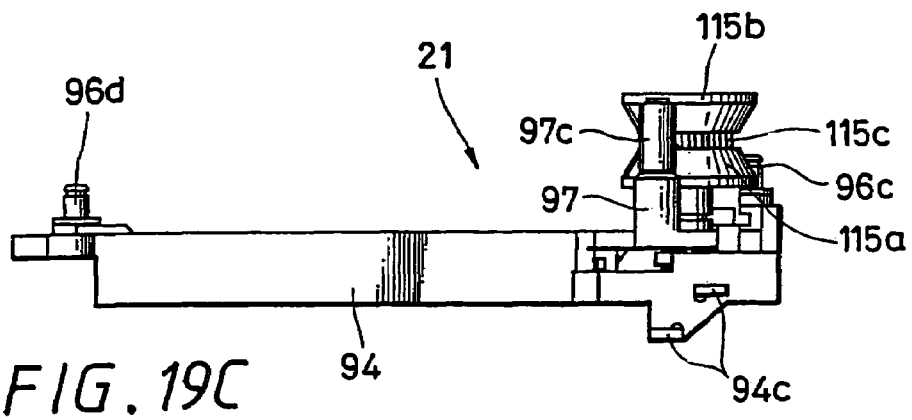
FIG. 19B is a front view thereof and FIG. 19C is a side view thereof.
Figure 19C:
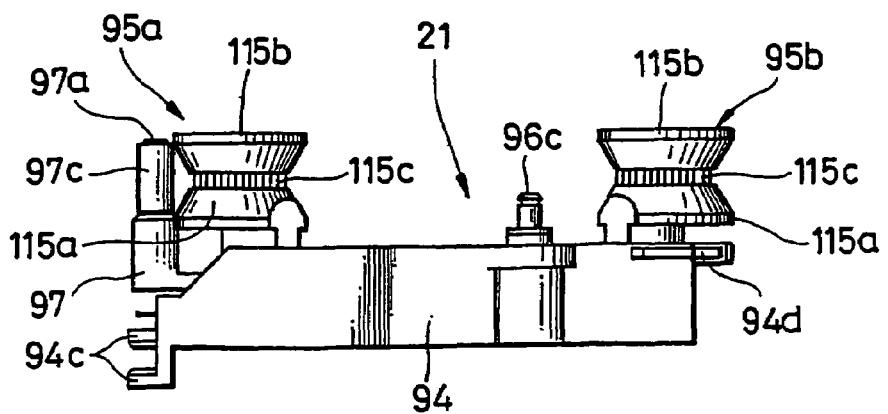

As shown in FIGS. 19A to 19C, the detection member 92 of the drive-side roller assembly body 20 is rotatably attached to the first roller support shaft 96*a* to strike a balance with a balance member 97. This balance member 97 includes a support shaft 97*a* upwardly projecting on the outside of the diametrical direction of the fixed roller 95*a* and a pin 97*b* projecting downwardly on the outside of the diametrical direction of the like fixed roller 95*a*. Then, the support shaft 97*a* rotatably supports the guide roller 97*c* at substantially the same height as that of the fixed-side cushion member. The guide roller 97*c* and the pin 97*b* are disposed at the positions displaced about the roller support shaft 96*a* approximately 90 degrees. This balance member 97 is biased under the spring force of a torsion coil spring, not shown, whereby the guide roller 97*c* is disposed in front of the drive roller 95*a*.

The fixed-side roller assembly body 21 having the above-mentioned arrangement is supported to the lower portion of the front side of the flat surface portion 11*a* of the main chassis 11 in such a manner that it can slide in the right and left direction Y. At that time, as shown in FIG. 1, the first fixed roller 95*a* of the fixed-side roller assembly body 21 and the guide roller 97*c* project upwardly from the third roller through-hole 26*c* of the flat surface portion 11*a*, and the second roller 95*b* projects upwardly from the fourth roller through-hole 26*d*.

The first guide pin 96*c* projects upwardly from the fourth guide oblong hole 27*d* and the second guide pin 96*d* projects upwardly from the third guide oblong hole 27*b*. Then, snap rings engaged with the upper end portions of the respective guide pins 96*c*, 96*d* can prevent these guide pins from being disengaged from the respective guide oblong holes 27*b*, 27*d*.

Further, as shown in FIGS. 19A to 19C, the fixed-side guide lever 94 has a pair of holding members 94*c* provided at its front with a predetermined clearance in the upper and lower direction and with a small displacement in the right and left direction Y. The pair of holding members 94*c* are engaged with the guide rail 11*m* formed on the inner surface of the front surface portion 11*b* of the main chassis 11 so as to become freely slidable. The fixed-side guide lever 94 is provided with a spring receiving member 94*d*, and one end of a tension coil spring 98, which shows a specific example of an elastic member, is fixed to this spring receiving member 94*d*. The tension coil spring 98 is extended in the right and left direction X and thereby fixed to the spring receiving member 83*c* provided on the drive-side guide lever 83. Under the spring force of the tension coil spring 98, the drive-side roller assembly body 20 and the fixed-side roller assembly body 21 are spring-biased in the direction in which they become close to each other.

Between the drive-side roller assembly body 20 and the fixed-side roller assembly body 21, there is disposed a drive gear 99 which is simultaneously meshed with the rack portion 83*a* of the drive-side guide lever 83 and the rack portion 94*a* of the fixed-side guide lever 94. The drive gear 99 is rotatably supported to the lower surface of the flat surface portion 11*a* of the main chassis 11 and the rack portion 94*a* and the rack portion 83*a* are meshed with each other so as to sandwich the drive gear 99 from the front and rear direction.

Accordingly, in FIG. 26, when the drive gear 99 rotates in the counter-clockwise direction, the drive-side roller assembly body 20 and the fixed-side roller assembly body 21 move, against spring force of the tension coil spring 98, in the direction in which they move away from each other. Conversely, when the drive gear 99 rotates in the clockwise direction, the drive-side roller assembly 20 and the fixed-side roller assembly 21 move in the direction in which they become close to each other.

Figure 24:
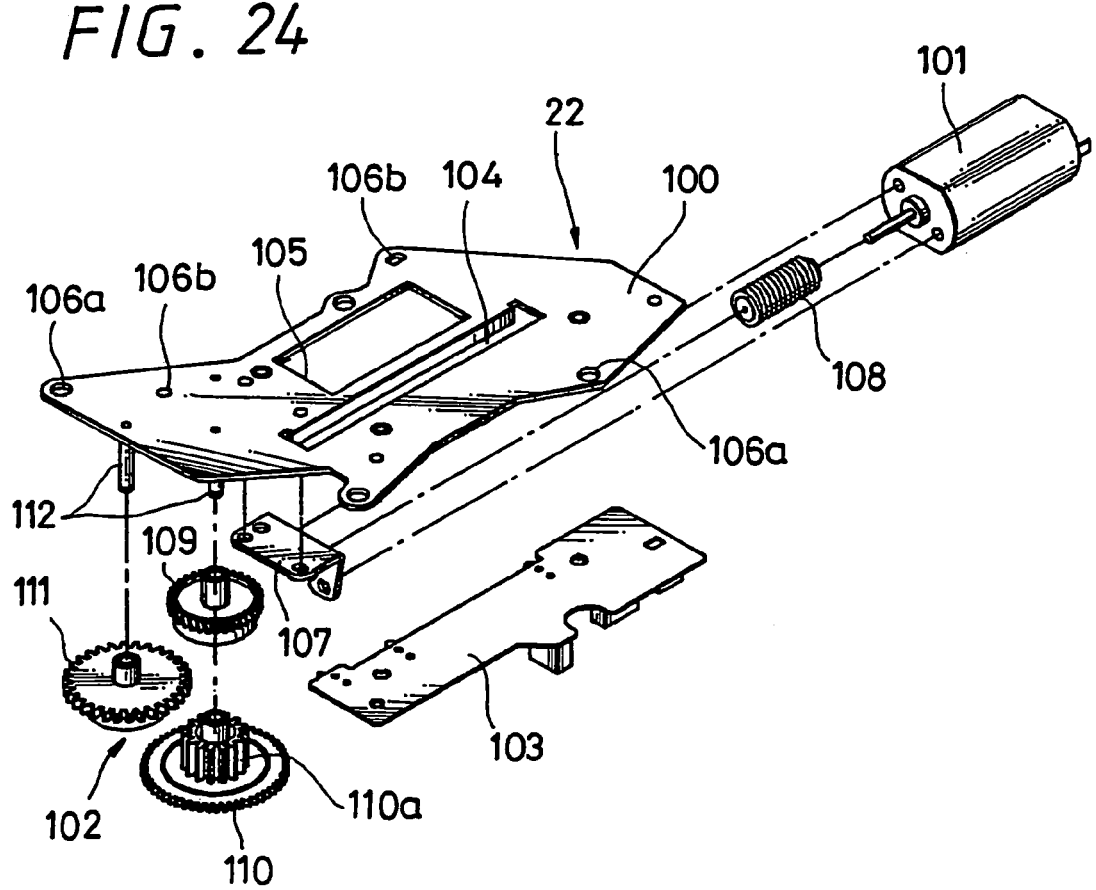
FIG. 24 is an enlarged exploded perspective view of a chuck drive assembly body of the disk recording and reproducing apparatus shown in FIG. 5.

As shown in FIG. 2, the chuck drive assembly body 22 is disposed under the two roller assembly bodies 20, 21 so as to cover both of the roller assembly bodies. The chuck drive assembly body 22 has an arrangement shown in FIG. 24 and so on. Specifically, the chuck drive assembly body 22 is composed of a base plate 100 fixed to the rear surface 11*a* of the main chassis 11 leaving a space in place to house the drive-side and fixed-side roller assembly bodies 20, 21 by a suitable fixing means such as set screws, a second drive motor 101, a second gear mechanism 102, a second printed wiring board 103 mounted on this base plate 100 and the like.

The base plate 100 has an oblong hole 104 formed at approximately its central portion to receive the operation portion 87 of the above-mentioned drive-side guide lever 83 and has an opening hole 105 formed at approximately its central portion to accommodate therein a part of the drive motor 101. Further, the base plate 101 has four attachment holes 106a and two positioning holes 106b, 106b bored thereon by which the base plate 100 is properly located at the predetermined position and attached by set screws of a predetermined number. In consequence, the operation portion 87 is inserted into the oblong hole 104 extended in the right and left direction Y and the lower end portion of the operation portion is projected through the lower surface of the base plate 100.

The second drive motor 101 is fixed to a bracket 107 by screws, and the motor 101 is attached to the base plate 100 by fastening this bracket 107 with set screws. The drive motor 101 has a worm 108 fixed to its rotary shaft, and a worm wheel 109 is meshed with the worn 108. A small-gear, not shown, is integrally formed with worm wheel 109. A third intermediate gear 110a is meshed with the small-diameter gear. The third intermediate gear 110 has a small-diameter gear 110a integrally formed therewith and the small-diameter 110a has a small-diameter gear, not shown, of an output gear 111 meshed therewith.

The output gear 111 of the chuck drive assembly body 22 is meshed with the rack portion 73 of the above-mentioned cam plate 18. When the drive motor 101 of this chuck drive assembly body 22 rotates, the cam plate 18 is guided by the guide shaft 11j of the main chassis 11 and the like and thereby is moved forward or backward in the front and rear direction X of the main chassis 11. The worm wheel 109 and the output gear 111 of the intermediate gear 110 are rotatably supported to three gear support shafts 112 fixed to the base plate 100.

The second printed-wiring board 103 is fixed to the front portion of the same lower surface as that of the drive motor 101 of the base plate by screws. As shown in FIG. 2 and the like, the printed-wiring board 103 has mounted thereon three detection means of the second detection switch SW2, the third detection switch SW3 and the fourth detection switch SW4 and various kinds of electronic components necessary for energizing these detection switches SW2 to SW4, the drive motor 101 and the like and controlling their operations.

As shown in FIG. 27, the three detection switches SW2 to SW4 are adapted to detect the position of the drive-side roller assembly body 20 as changes in the right and left direction Y depending upon the position of the optical disk D that passes the disk entrance and exit slot 30. It can be detected based upon the detected results of the three detection switches SW2 to SW4 in response to the size of the optical disk D ($D_{12}$ or $D_8$) whether the optical disk D exists in the disk compartment or the disk eject portion.

In FIG. 27, reference letter E represents the withdrawing start position of the optical disk D. When the user inserts the optical disk D up to this position, the loading mechanism starts loading operation which will be described later on so that the optical disk D is automatically withdrawn and loaded onto the disk loading portion. Reference letter F represents the eject completion position of the optical disk D. When the user operates the eject button, the loading mechanism executes the eject operation to eject the optical disk D and the optical disk D is automatically fed to this position.

In the same figure, the position shown by reference letter A represents the initial position of the drive-side roller assembly body 20. Before the optical disk D is inserted into the apparatus from the disk entrance and exit slot 30, the drive-side roller assembly body 20 is located at this position. At that very moment, the first operation portion 87a of the operation body 87 provided on the drive-side guide lever 83 is in contact with the second detection switch SW2 so that the second detection switch SW2 is placed in the on-state.

The position shown by reference letter B represents the loading position and eject position of the small-diameter disk $D_8$ when the small-diameter disk $D_8$ having the diameter of 8 cm of the optical disk D is in use. In the case of the small-diameter disk $D_8$, the drive-side roller assembly body 20 is located at the illustrated position both in the disk loading mode in which the small-diameter disk $D_8$ is inserted into the apparatus from the disk entrance and exit slot 30 and in the disk eject mode in which the small-diameter disk $D_8$ is ejected from the apparatus.

This loading and eject position is set to the position that is slightly outside the initial position of FIG. 27A. This difference of the position is set in order to enable the pair of drive rollers 85a, 85b and the fixed rollers 95a, 95b to escape from the small-diameter disk $D_8$ so that they can be prevented from contacting with one another because the small-diameter disk $D_8$ rotates in the disk loading mode. At that very moment, the first operation portion 87a of the operation body 87 is released from the second detection switch SW2a with the result that three second to fourth detection switches SW2 to SW4 are all turned off.

The position shown by reference letter C represents the position at which the large-diameter disk $D_{12}$ is ejected when the large-diameter disk $D_{12}$ having the diameter of 12 cm of the optical disk D is in use. In the case of this large-diameter disk $D_{12}$, when the large-diameter disk $D_{12}$ is ejected from the disk entrance and exit slot 30, the drive-side roller assembly body 20 is located at the illustrated position. At that very moment, the second operation portion 87b of the operation body 87 is brought in contact with the third detection switch SW3 so that only the third detection switch SW3 is energized and other detection switches SW2, SW4 are maintained in the off state.

Further, the position shown by reference letter D represents the position at which the large-diameter disk $D_{12}$ is loaded onto the apparatus when the large-diameter disk $D_{12}$ is in use. At that time, when the large-diameter disk $D_{12}$ is inserted from the disk entrance and exit slot 30 and reaches the disk loading portion, the drive-side roller assembly body 20 is located at the illustrated position. At that very moment, the second operation portion 87b of the operation body 87 is continuously pressing the third detection switch SW3 and the third operation portion 87c is brought in contact with the fourth detection switch SW4. Accordingly, the third detection switch SW3 and the fourth detection switch SW4 are both energized and then first detection switch SW2 is maintained in the off-state.

As shown in FIG. 28, there is provided a fifth detection switch SW5 that is used to detect the rotation position of the above-mentioned support lever 15. There are further provided a sixth detection switch SW6, a seventh detection switch SW7 and an eighth detection switch SW8 which are used to detect the position in the front and rear direction of the above-mentioned cam plate 18. The fifth to eighth detection switches SW5 to SW8 are attached to the third printed-wiring board 114 as shown in FIG. 6 and so forth.

The third printed-wiring board 114 is adapted to energize the fifth to eighth detection switches SW5 to SW8 and other electronic components and to exchange signals and has suitable electronic components such as connectors mounted thereon. This printed-wiring board 114 is properly located and fixed by screws to a small flat surface portion 11*n* formed at the left side portion in the flat surface portion 11*a* of the main chassis 11.

This printed-wiring board 114 has a through-hole 114*a* bored thereon for the drive lever 38 of the chucking arm 14 to pass therethrough and has also an engagement hole 114 bored thereon to engage the support shaft 50 of the main chassis 11. The fifth detection switch SW5 is attached to the end portion the side of the pin hole 51*b* formed on the flat surface portion 11*a* of this printed-wiring board 114, and the fifth to eighth detection switches SW5 to SW8 are attached to the inner edge portion of the small flat surface portion 11*n*.

The fifth detection switch SW5 is attached in the state in which its operation member is faced to the side of the pin hole 51*b* and turned on and off by the operation member 15*d* of the support lever 15. The sixth to eighth detection switches SW6 to SW8 are attached in such a manner that their action members may project to the inner edge of the small flat surface portion 11*n*. An upper end edge of the switch operation portion 75 whose upper end portion projects above the printed-wiring board 114 is opposed to these action members and the three detection switches SW6 to SW8 are turned on and off by this switch operation portion 75.

The sixth and seventh detection switches SW6, SW7 are adapted to detect whether the optical disk D is to be inserted into the apparatus or ejected from the apparatus. Thus, by visually confirming the on- and off-states of the two detection switches SW6, SW7, it is possible to detect the direction in which the optical disk D is to be transported.

As shown in FIGS. 28A, 28B, in this state, when the cam plate 18 is located at the foremost end, the two detection switches SW6, SW7 are turned on by the switch operation portion 75. When the optical disk D is inserted and thereby the switch operation portion 75 is moved in the rearward, first, the sixth detection switch SW6 is turned off and then the seventh detection switch SW7 is turned off. By visually confirming the states of the two detection switches, it is possible to detect that the optical disk D has been inserted into the apparatus.

When on the other hand the optical disk D is completely inserted into the apparatus and located in the disk loading portion, the two detection switches SW6, SW7 are both turned off. In this state, when the user selects the eject operation so that the optical disk D is moved toward the disk entrance and exit slot 30, the switch operation portion 75 is moved in the forward direction. Consequently, as shown in FIG. 28C, first, the seventh detection switch SW7 is turned on and then the sixth detection switch SW6 is turned on. By visually confirming the states of these two detection switches, it is possible to detect that the optical disk D has been ejected from the apparatus.

The eighth detection switch SW8 is adapted to detect whether or not the optical disk D is completely inserted into the apparatus and located at the disk loading portion. As shown in FIG. 28D, when the cam plate 18 is moved in the rearmost portion, the eighth detection switch SW8 is turned on by the switch operation portion 75. In this state, when the user operates the eject button, the loading mechanism executes the eject operation to eject the optical disk D from the disk entrance and exit slot 30.

While the above-mentioned main chassis 11 and assembly body holder 16 should most preferably made of ABS (acrylonitrile butadiene styrene resin) and AS (acrylonitrile styrene resin), for example, it is needless to say that they can be made of other engineering plastics and metals such as aluminum alloy. While the open/close shutter 13, the support lever 15, the cam plate 18, the drive-side guide lever 83, fixed-side guide lever 94, the drive rollers 85*a*, 85*b*, the fixed rollers 95*a*, 95*b* and the cap roller 90 should most preferably made of POM (polyacetal), for example, it is needless to say that they can be made of other engineering plastics and metals such as aluminum alloy.

Moreover, while the chucking arm 14 and the base plate 100 should most preferably made of metals such as stainless steel, for example, it is needless to say that they can be made of ABS, AS and other engineering plastics.

The drive-side guide lever 83, the rack portion 83*a*, the fixed-side guide lever 94, the rack portion 94*a*, the tension coil spring 98 and the drive gear 99 constitute a space adjustment mechanism that can adjust a space by making a pair of transport members come close to or away from each other in response to the size of the optical disk D (diameter of the disk-like recording medium). The roller cam portion 79 and the roller 89 constitute a disk selection cam mechanism that can control an adjustment amount of the space adjustment mechanism. Further, the cam plate 18, the drive lever 13, the second drive motor 101, the second gear mechanism 102 and the output gear 111 constitute a shutter open and close mechanism.

When in use, the disk recording and reproducing apparatus 10 having the above-mentioned arrangement is accommodated within a housing 120 shown in FIG. 51. The housing 120 is comprised of a cube-like container that is large enough to accommodate the main chassis 11, control circuits for controlling devices and mechanisms mounted on the main chassis and other devices and mechanisms and so forth. Specifically, the housing 120 includes a cube-like main body portion 120*a*, an upper portion 120*b* integrally formed at the upper portion of this main body portion 120*a* and a ceiling portion 120*c* that covers the upper surface of the upper portion 120*b*.

On the front surface of the main body portion 120*a*, there are disposed a display portion 121 composed of a suitable device such as a liquid-crystal display to display control states, operation states and other information, operation switches 122, 123 serving as input means for inputting control signals, operation signals and the like. The upper portion 120*b* is shaped like a conscripted portion by reducing lengths of the front surface and the right and left side surfaces. As a result, a flared portion like a terrace is set around the upper portion 120*b*. This upper portion 120*b* has an opening portion 124 formed at its front to inwardly oppose the disk entrance and exit slot 30 of the built-in disk recording and reproducing apparatus 10.

The housing 120 has a disk holding portion 125 of a concave arc-like shape provided at approximately a central portion in the longitudinal direction of the opening portion 124. The recess portion of the gate member 12 is opposed to the inside of this disk holding portion 125. The ceiling portion 120*c* has an opening window 126 formed at its position opposing the disk compartment 23 of the disk recording and reproducing apparatus 10 to enable users to see through the inside of the housing. The opening window 126 has an expanded portion 126*a* to cover the upper portion of the arm portion 14*a* of the chucking arm 14. The expanded portion 126*a* is shaped substantially like the arm portion 14*a* and hence users can visually confirm approximately the whole of the optical disk D except this expanded portion 126*a* through the opening window 126.

Operations of the disk recording and reproducing apparatus 10 having such arrangement will be described with reference to FIGS. 26 to 28 and FIGS. 29 to 50. FIGS. 26 to 28 are diagrams to which reference will be made in explaining relationships between the optical disk D and the eight detection switches SW1 to SW8. FIGS. 29 to 38 are diagrams showing the states in which the small-diameter disk $D_8$ having the diameter of 8 cm is inserted into and ejected from the apparatus (loading and unloading). FIG. 49 is a diagram showing operation timing charts useful for explaining operations of the eighth detection switches SW1 to SW8 and the two drive motors 84, 101 when the small-diameter disk $D_8$ is inserted into and ejected from the apparatus.

Further, FIGS. 39 to 48 are diagrams showing the states in which the large-diameter disk $D_{12}$ having the diameter of 12 cm is inserted into and ejected from the apparatus. FIG. 50 is a diagram showing operation timing charts useful for explaining operations of the eighth detection switches SW1 to SW9 and the two drive motors 84, 101 when the large-diameter disk $D_{12}$ is inserted into and ejected from the apparatus.

Figure 29:
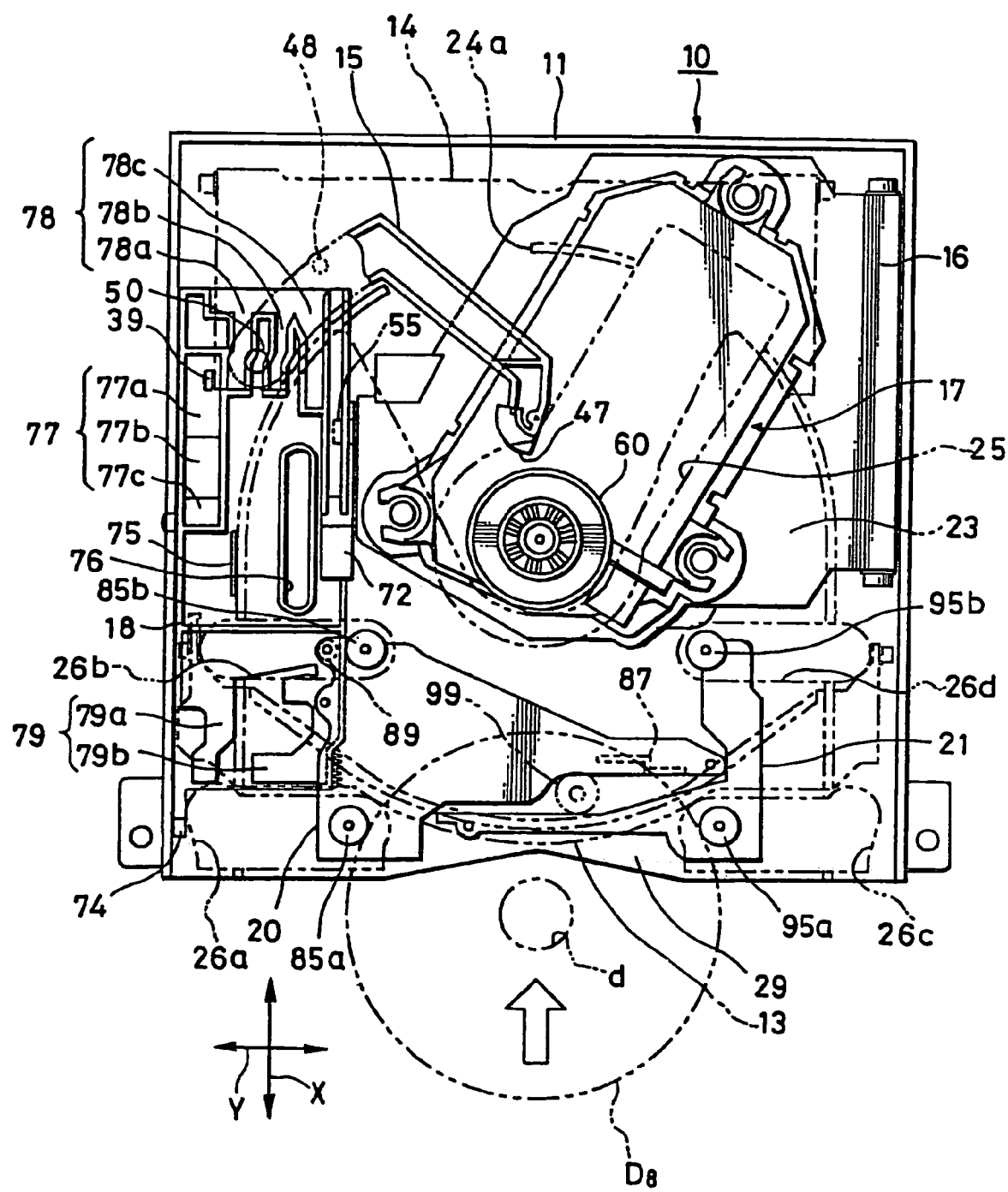
FIG. 29 is an explanatory diagram showing the state in which an optical disk is being inserted into a disk entrance and exit slot when an 8 cm optical disk is available in the disk recording and reproducing apparatus shown in FIG. 5.

First, the case of the small-diameter disk $D_8$ will be described. As shown in FIGS. 29 and 30B, when the user inserts the tip end portion of the small diameter disk $D_8$ into the disk entrance and exit slot 30 of the gate member 12 (front and rear direction X), the above tip end portion enters into the lower side of the shutter portion 13a of the open/close shutter 13. At that time, since the cam plate 18 is located at the foremost portion that is the initial set position, the drive lever 13d of the open/close shutter 13 is laid over the upper surface of the cam plate 18. As a consequence, the open/close shutter 13 is placed in the state in which the shutter portion 13a is slightly lifted upwardly about the pair of rotary shaft portions 13f, 13f against the spring force of the compression coil spring 37.

In this case, the shutter portion 13a has approximately the same height as that of the disk entrance and exit slot 30 and also has a V-like (or U-like) first guide portion 13h recessed downwardly on its lower surface that slidably contacts with the outer peripheral edge of the upper surface of the small-diameter disk $D_8$. Then, the main chassis 11 has a V-like (or U-like) second guide portion 29 recessed thereon upwardly. Accordingly, the disk entrance and exit slot 30 has a barrel-like opening portion formed at its rear portion and which opening portion increases its width at its central portion and decreases its width in the respective ends. Consequently, since the first guide portion 13h of the shutter portion 13a serves as the guide surface to guide the small-diameter disk $D_8$, the user can easily insert the tip end portion of the small-diameter disk $D_8$ into the lower side of the shutter portion 13a.

With respect to the chucking arm 14, since the roller 39 that has been supported to the lower end of the drive lever 38 is laid over the upper horizontal plane 77a of the chucking cam portion 77 of the cam plate 18, the chucking arm 14 is raised in the upper direction against the spring force of the chucking coil spring 45. Accordingly, because the arm portion 14a is located at the upper position, the chucking member 40 held at its tip end portion also is raised upwardly by a predetermined height.

Further, the cam protrusion 55 of the assembly body holder 16 is located at the lower horizontal portion 72c of the elevation cam portion 72 provided in the cam plate 18. Consequently, as shown in FIG. 30A, the assembly body holder 16 is sinking forward so that the turntable 60 of the pickup table assembly body 17 mounted on the assembly body holder 16 is lowered downwardly from the opening portion 25 of the main chassis 11. As a consequence, the disk compartment 23 set at approximately the central portion of the flat surface portion 11a of the main chassis 11 is opened widely and becomes able to house the small-diameter disk $D_8$.

In this state, when the small-diameter disk $D_8$ is inserted, the guide curved surface of the shutter portion 13a contacts with the drive-side guide roller 92c located at the front side of the drive roller 85a located forward, of the pair of drive rollers 85a, 85b of the drive-side roller assembly body 20, and the fixed-side guide roller 97c located at the front side of the fixed roller 95a located forward, of the pair of fixed rollers 95a, 95b of the fixed-side roller assembly body 21, to expand these guide rollers 92c, 97c to the outside with pressure, respectively. Specifically, in FIG. 26, the drive-side guide roller 92c is rotated in the clockwise direction and the fixed-side guide roller 97c is rotated in the counter-clockwise direction.

As a result, the detection member 92 that supports the drive-side guide roller 92c is rotated in the clockwise direction so that its operation pin 92b rotates in the same direction to press the first detection switch SW1. Consequently, the first detection switch SW1 is switched from the on-state to the off-state and its detection signal is outputted. This time is a time t1 shown in FIG. 49, and a drive current flows to the first drive motor 84 of the drive-side roller assembly body 20 based upon this detection signal.

Thus, the first drive motor 84 is rotated in the predetermined direction that has been determined previously (direction in which the small-diameter disk $D_8$ is transported to the disk loading portion). As a result, rotation force of the first drive motor 84 is transmitted from the worm 84a fixed to its rotary shaft through the first gear mechanism 86 (worm wheel 86a, small-diameter gear 86b, intermediate gears 86c, 86d) to the respective gear portions 85c of the pair of drive rollers 85a, 85b. Thus, the pair of drive rollers 85a, 85b that have been rotatably supported to the drive-side guide lever 83 are rotated in the counter-clockwise direction in FIG. 29. At that time, since the drive-side cushion members 90c made of the rubber-like elastic material are fitted into the outer shaft portions 85e of the drive rollers 85a, 85b, the drive-side cushion members 90c are rotated integrally with the drive rollers 85a, 85b.

Further, when the small-diameter disk $D_8$ is inserted, the tip end portion of the disk is guided by the front drive roller 85a and is brought in contact with the drive-side cushion member 90c provided at the bottom of the groove portion and is also guided by the fixed roller 95a located at the front, of the pair of fixed rollers 95a, 95b fixed to the fixed-side guide lever 94 of the fixed-side roller assembly body 21 and is brought in contact with the fixed-side cushion member 115c provided at the bottom. Thus, the small-diameter $D_8$ is supported by the three points of the drive roller 85a, the fixed roller 95a and the user. Then, rotation force of the front drive roller 85a is transmitted to one end of the outer peripheral edge of the small-diameter disk $D_8$ by friction force generated between the cushion members 90c, 115c and the small-diameter disk $D_8$. On the other hand, the other end of the outer peripheral edge of the small-diameter disk $D_8$ is stopped at that position by friction force generated between it and the fixed roller 95a.

As a result, rotation force for enabling the small-diameter disk $D_8$ to rotate toward the disk compartment 23 set at the inside of the main chassis 11 is generated in the small-diameter disk, whereby the small-diameter disk $D_8$ is rotated in the disk insertion direction in which it is inserted into the disk compartment 23. When the small-diameter disk $D_8$ is rotated in the disk insertion direction, the front drive roller 85*a* and the front fixed roller 95*a* are moved, against spring force of the tension coil spring 98, in the direction in which they are moved away from each other in the right and left direction Y.

When the front drive roller 85*a* is moved, the second detection switch SW2 that had been turned on by the operation member 87 of the drive-side guide lever 83 is switched to the off-state and its detection signal is outputted. This time is a time t2 shown in FIG. 49. Then, when the largest diameter portion (diameter portion) of the small-diameter disk $D_8$ reaches to the front drive roller 85*a* and the front fixed roller 95*a*, the outer peripheral edge of the disk is detached from the drive-side guide roller 92*c* and force for pressing the operation pin 92*b* is released. As a consequence, the spring force of the torsion coil spring returns the detection member 93 to the initial position and the first detection switch SW1 is again switched from the on-state to the off-state. This time is a time t3 shown in FIG. 49.

At that time, because the first guide portion 13*h* is provided on the lower surface of the shutter portion 13*a* of the open/close shutter 13, when the small-diameter disk $D_8$ is moved, the open/close shutter 13 can be lifted easily. At that time, the outer peripheral edge of the upper surface of the small-diameter disk $D_8$ is brought in slidable contact with the first guide portion 13*h*, and the outer peripheral edge of the lower surface of the small-diameter disk $D_8$ is brought in slidable contact with the second guide portion 29 with the result that the signal recording surface that had been set to the inside of the small-diameter disk can be prevented from contacting with the flat surface portion 11*a* or the like. Therefore, upon disk loading, there is no risk that the signal recording surface will be scratched, damaged or smudged by foreign matter. Such effects can also be achieved when the small-diameter disk $D_8$ is ejected. This relationship applies to the large-diameter disk $D_{12}$, which will be described later on, as well.

The small-diameter disk $D_8$ is supported by the drive roller 85*a*, the fixed roller 95*a* and the wiper member 31 attached to the disk entrance and exit slot 30 and rotated toward the disk insertion direction by rotation force of the drive roller 85*a* while it is being maintained in substantially the horizontal state. Then, when the largest diameter portion (diameter portion) of the small-diameter disk $D_8$ passes the front drive roller 85*a* and the front fixed roller 95*a*, spring force of the tension coil spring 98 pulls the drive-side roller assembly body 20 and the fixed-side roller assembly body 21 in the direction in which they become close to each other.

Subsequently, the tip end portion of the small-diameter disk $D_8$ is guided by the rear drive roller 85*a* and thereby is brought in contact with the drive-side cushion member 90*c* provided at the bottom of the groove portion and is also guided by the rear fixed roller 95*a* and thereby is brought in contact with the fixed-side cushion member provided at the bottom of the groove portion. Thus, the small-diameter disk $D_8$ is supported by totally four points of the front and rear two drive rollers 85*a*, 85*b* and the front and rear two fixed rollers 95*a*, 95*b*. Then, when the rear end portion of the small-diameter disk $D_8$ is detached from the front drive roller 85*a* and fixed roller 95*a*, the small-diameter disk is rotated by rotation force of the drive roller 85*b* and transported to the disk compartment 23 while being supported by the rear drive roller 85*b* and fixed roller 95*b*.

Figure 31:
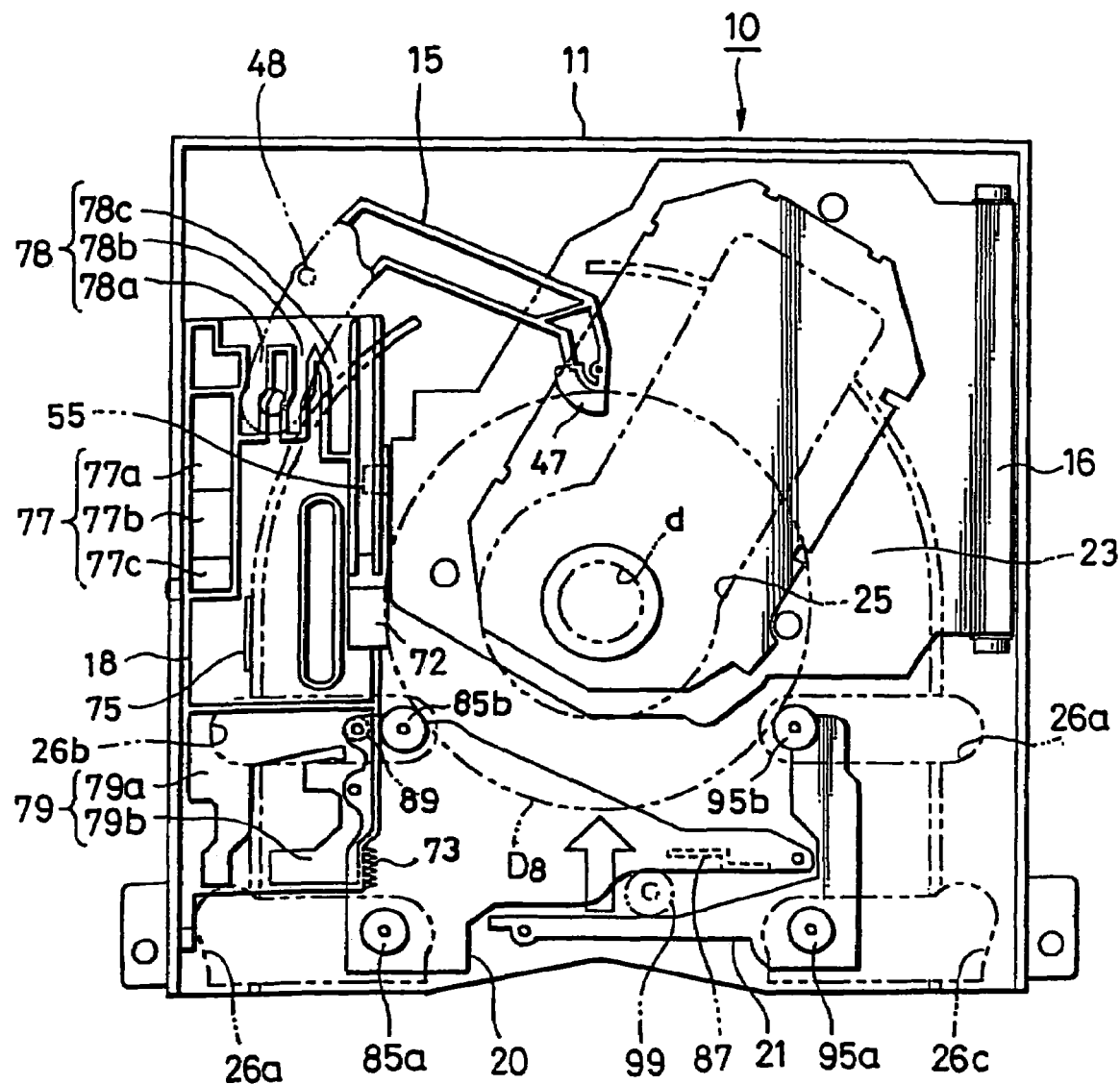
FIG. 31 is an explanatory diagram showing the state in which the optical disk is stored in a disk compartment when the 8 cm optical disk is available in the disk recording and reproducing apparatus shown in FIG. 5.
Figure 32A:
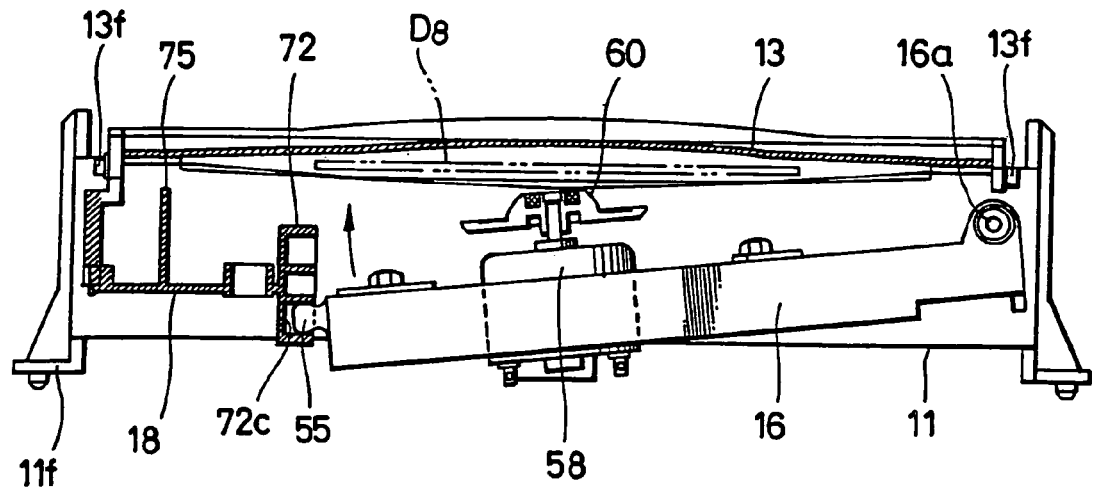
FIG. 32A is an explanatory diagram showing the cam plate, the turntable and the like from the front
Figure 32B:
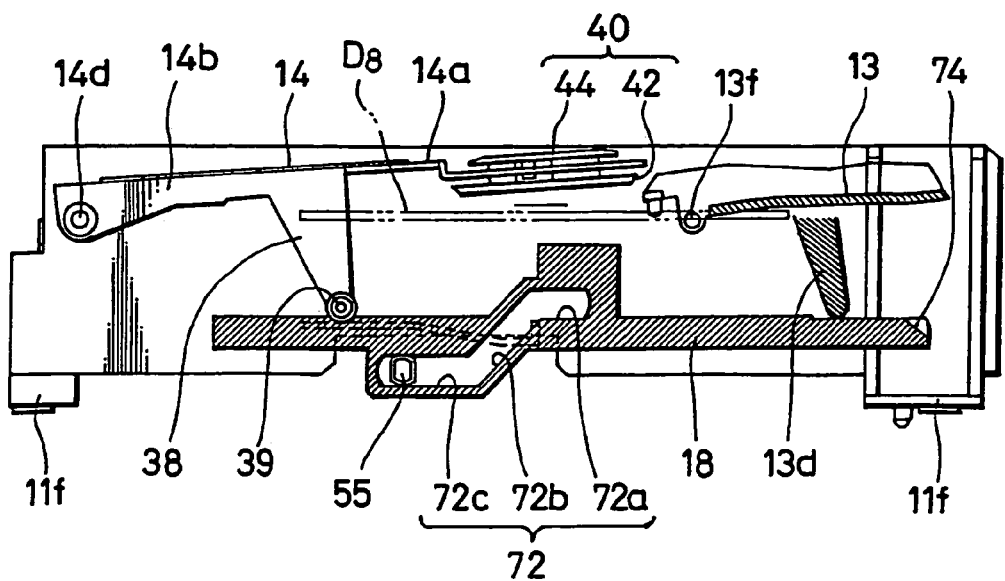
FIG. 32B is a diagram showing the open/close shutter, the chucking arm, the cam plate and the like from the side.
Figure 33:
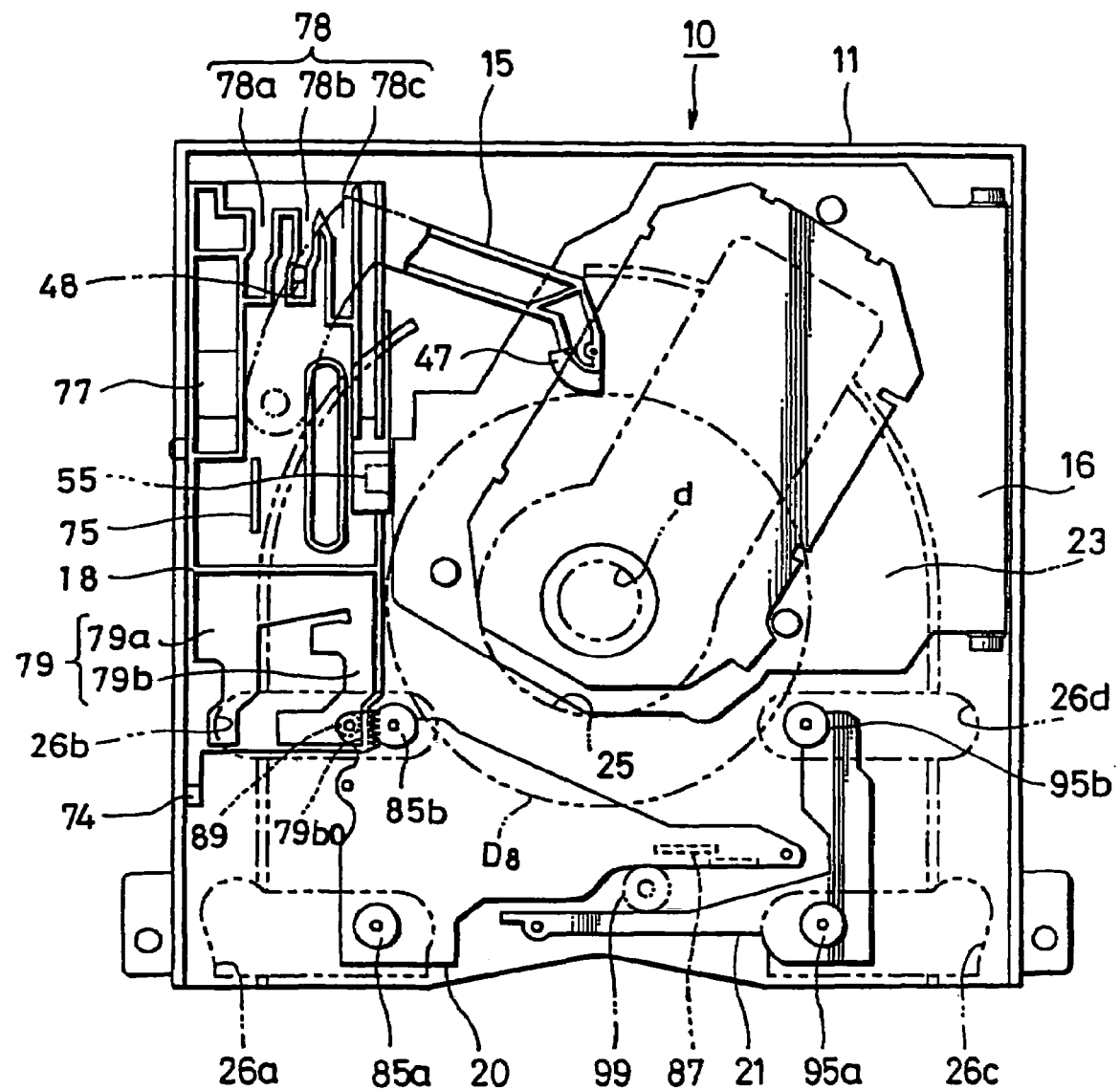
FIG. 33 is an explanatory diagram showing the state in which the loading of the optical disk has been finished when the 8 cm optical disk is available in the disk recording and reproducing apparatus shown in FIG. 5.

At that very moment, when the tip end portion of the small-diameter disk $D_8$ passes the central portion of the disk compartment 23, the tip end portion of the disk is engaged with the disk holding portion 47 of the support lever 15 that is being placed near the central portion of the disk compartment. Consequently, the small-diameter disk $D_8$ is supported by three points of the rear drive roller 85*b* and fixed roller 95*b* and the disk holding portion 47. FIGS. 31 and 32A, 32B show this state, and at that time, the cam plate 18 is located at the initial front end portion. Accordingly, the open/close shutter 13 and the chucking arm 14 are both raised in the upper direction and the assembly body holder 16 is lowered in the forward direction so that their attitudes are not changed at all.

Next, the small-diameter disk $D_8$ is further transported to the disk insertion direction by rotation force given thereto from the rear drive roller 85*b* to thereby move the support lever 15, against spring force of the spring member spring-biased at the inside of the disk compartment 23, in the direction in which it is ejected from the disk compartment 23 (in the counter-clockwise direction in FIG. 31). As a result, the operation member 15*d* of the support lever 15 contacts with the fifth detection switch SW5 and this fifth detection switch SW5 is switched from the off-state to the on-state to output its detection signal. This time is a time t4 shown in FIG. 49.

In this state, the small-diameter disk $D_8$ is moved to the disk loading portion which is the center of the disk compartment 23 and the rear drive roller 85*b* and fixed roller 95*b* are detached from the small-diameter disk $D_8$, whereby the drive-side roller assembly body 20 and the fixed-side roller assembly body 21 are returned to the initial position in which they become closest to each other under the spring force of the tension coil spring 98.

As a result, the first operation portion 87*a* of the operation member 87 contacts with the second detection switch SW2 and this second detection switch SW2 is switched from the off-state to the on-state to output its detection signal. This time is a time t5 shown in FIG. 49. The supply of the drive current to the first drive motor 84 is stopped based upon this detection signal, whereby rotations of the pair of drive rollers 85*a*, 85*b* are stopped.

At that time, as shown in FIG. 31, the cam pin 48 provided on the support lever 15 is opposed to the position at which it faces to the second cam portion 78*b* of the lever cam portion 78. The roller 89 that has been rotatably supported to the shaft pin 89*a* of the drive-side roller assembly body 20 is opposed to the position at which it faces to the small-diameter cam portion 79*b* of the roller cam portion 79.

After driving of the first drive motor 84 had been stopped, as shown in FIG. 49, when a first delay time DT1 that had been set previously passes, the drive current is outputted to the second drive motor 101 of the chuck drive assembly body 22. Thus, the second drive motor 101 is rotated in a predetermined direction (direction in which the cam plate 18 is moved in the rearward) that had been determined previously. As a result, rotation force of the second drive motor 101 is transmitted from the worm 108 fixed to the rotary shaft of the second drive motor through the first gear mechanism 102 (worm wheel 109, intermediate gear 110 and output gear 111) to the rack portion 73 of the cam plate 18, whereby the cam plate 18 is moved rearward from the position shown in FIG. 31 to the position shown in FIG. 33 (in the front and rear direction X).

After the cam plate 18 had been moved in the rearward, first, the sixth detection switch SW6 is switched from the on-state to the off-state by the switch operation member 75. This time is a time t6 shown in FIG. 49. Subsequently, the seventh detection switch SW7 is switched from the off-state to the on-state by the switch operation member 75. This time is a time t7 shown in FIG. 49. It can be detected by visually confirming that the two detection switches SW6, SW7 are turned on and off sequentially that the small-diameter disk $D_8$ is being transported toward the disk loading portion.

At the same time, the cam pin 48 of the support lever 15 enters into the second cam portion 78b of the lever cam portion 78 in unison with the rearward movement of the cam plate 18. On the other hand, the roller of the drive-side roller assembly body 20 enters into the small-diameter cam portion 79b of the roller cam portion 79.

Next, when the cam plate 18 is moved up to the rearmost portion, the switch operation member 75 comes in contact with the eighth detection switch SW8 so that the eighth detection switch SW8 is switched from the off-state to the on-state. This time is a time t8 shown in FIG. 49. Then, after the cam plate 18 had reached to the rearmost portion, when a second delay time DT2 that had been set in advance passes, the supply of the drive current to the second drive motor 101 is stopped and the second detection switch SW2 is switched from the on-state to the off-state. This time is a time t9 shown in FIG. 49. Thus, the second drive motor 101 is stopped and the cam plate 18 is held in the state in which it is stopped at the rearmost portion.

At that time, as shown in FIGS. 34A and 34B, based upon the rearward operation of the cam plate 18, the cam protrusion 55 is slid from the lower horizontal portion 72c of the elevation cam portion 72 through the inclined portion 72b to the upper horizontal portion 72a. As a result, the assembly body holder 16 is elevated about the pair of shaft portions 16a, 16a provided at the rear end portion in such a way as to elevate the side of the cam protrusion 55 of the tip end portion, and its attitude is changed to approximately the horizontal state. In consequence, the upper portion of the pickup table assembly body 17 supported to the assembly body holder 16 enters into the opening portion 25 of the main chassis 11 from the underside.

As a result, the turntable 60 fixed to the tip end portion of the rotary shaft of the spindle motor 58 of the pickup table assembly body 17 is opposed to the small-diameter disk $D_8$. In accordance with the upward rotation of the turntable, the engagement portion 60b is fitted into the center hole d of the small-diameter disk $D_8$. Then, the chucking arm 14 and the open/close shutter 13 are lowered in unison with the motion of the turntable 60.

Specifically, since the chucking arm 14 is constantly biased in the direction in which it becomes close to the disk compartment 23 under the spring force of the coil spring 45, the roller that had rotatably been supported to the lower end of the drive lever 38 is slid from the upper horizontal portion 77a of the chucking cam portion 77 through the inclined portion 77b to the lower horizontal portion 77c in unison with the rearward movement of the cam plate 18. At that time, since the height position of the roller 39 is gradually lowered by the cam portion 77, the arm portion 14a is forced to be lowered so that the chucking arm member 40 held at the tip end portion of the arm portion is made to approach the turntable 60.

Thus, the chucking member 40 and the turntable 60 are opposed to each other across the small-diameter disk $D_8$. As a result, the magnet 59 incorporated within the turntable 60 attracts the chucking member 40 magnetically with the result that the small-diameter disk $D_8$ is held by the chucking member 40 and the turntable 60 from the upper and lower direction. Thus, chucking of the small-diameter disk $D_8$ is completed and the small-diameter disk $D_8$ is unitarily rotated in unison with rotation of the turntable 60.

At that time, the cam pin 48 is laid over the escape portion $78b_0$ set in the deep portion of the second cam portion 78b, whereby the support lever 15 is slightly rotated in the counter-clockwise direction. Consequently, the disk holding portion 47 is further moved to the outside, whereby the disk holding portion 47 is spaced apart from the small-diameter disk $D_8$ and their engagement is released. In like manner, since the roller 89 is laid over the escape portion $79b_0$ set in the deep portion of the small-diameter cam portion 79b, the inside drive roller 85b and fixed roller 95b are further moved to the outside slightly.

Thus, the two rollers 85b, 95b are detached from the small-diameter disk $D_8$ and their engagement is released. As a result, since the small-diameter disk $D_8$ is supported by only the chucking member 40 and the turntable 60, the outer peripheral edge of the disk can be prevented from slidably contacting with the drive roller 85b and the fixed roller 95b or the disk holding portion 47.

Furthermore, since the open/close shutter 13 is constantly biased forwardly under the spring force of the compression coil spring 37, when the cam plate 18 is moved in the rearward, the drive lever 13d relatively moved in the front direction and thereby released in the front side through the cam portion 74 provided at the front end portion of the cam plate 18. Consequently, the open/close shutter 13 is changed from the slightly upward state shown in FIG. 32 to the slight downward state shown in FIG. 34B.

As a result, the lower surface of the shutter portion 13 is urged against the disk guide portion 29 of the main chassis 11 and the inside of the disk entrance and exit slot 30 is tightly closed by the shutter portion 13a. Consequently, even when the user intends to insert the second optical disk D into the apparatus from the disk entrance and exit slot 30 inadvertently, such insertion operation can be prevented reliably and erroneous insertion of the second optical disk can be prevented highly reliably.

After loading had been completed through such operations, an information signal can be recorded on and reproduced from the small-diameter disk $D_8$ in the later stage and recording and reproducing operations can be executed. Since the third detection switch SW3 and the fourth detection switch SW4 are used only to control the large-diameter disk $D_{12}$, they are not operated both in this loading mode and in the unloading mode which will be mentioned next.

Next, disk eject operation (unloading) in which the small-diameter disk $D_8$ is ejected from the disk entrance and exit slot 30 after an information signal had been recorded on and reproduced from the disk will be described. When the user selects the disk eject operation by the eject button, a drive current is supplied to the second drive motor 101 and the second drive motor is energized to rotate. This time is a time t10 shown in FIG. 49. At the same time the second drive motor 101 is energized, the second detection switch SW2 is switched from the off-state to the on-state.

In this case, the second drive motor 101 is rotated in the direction opposite to the disk insertion direction, whereby the cam plate 18 is moved in the disk eject direction. Unloading of the small-diameter disk $D_8$ can be executed by effecting control operations in which the second drive motor 101 for moving the cam plate 18 forward and the first drive motor 84 for rotating the pair of drive rollers 85a, 85b are rotated in opposite directions.

Specifically, when the cam plate 18 is moved forward, since the cam pin 48 is disengaged from the second cam portion 78b, the support lever 15 is rotated in the counter-clockwise direction in FIG. 31 under the spring force of the coil spring 52 and hence the disk holding portion 47 is engaged with the outer peripheral edge of the small-diameter disk $D_8$. Then, pressing force generated in the disk holding portion 47 under the spring force of the coil spring 52 is given to the insertion side end portion of the small-diameter disk $D_8$, whereby the small-diameter disk $D_8$ is pressed against the side of the disk entrance and exit slot 30.

In this case, when the cam plate 18 is moved forward, first, since the switch operation member 75 is detached from the eighth detection switch SW8, the eighth detection switch SW8 is switched from the on-state to the off-state. This time is a time t11 shown in FIG. 49. After the eighth detection switch SW8 had been switched, the seventh detection switch SW7 is switched from the on-state to the off-state. This time is a time t12 shown in FIG. 49.

After the seventh detection switch SW7 had been switched to the off-state, when a third delay time DT3 that had been set in advance elapses, the supply of the drive current to the second drive motor 101 is stopped. Thus, the second drive motor 101 is stopped and the forward movement of the cam plate 18 is stopped. After the supply of the drive current to the second drive motor 101 had been stopped, when a fourth delay time DT4 that had been set in advance elapses, the drive current is supplied to the first drive motor 84. In this case, the first drive motor 84 is rotated in the direction opposite to the disk insertion direction and the pair of drive rollers 85a, 85b are rotated in the clockwise direction which is the opposite direction to the above-mentioned rotation direction.

In that case, the outer peripheral edge on the eject side of the small-diameter disk $D_8$ that is pressed forward by the support lever 15 is brought in contact with the rear drive roller 85b and the rear fixed roller 95b. As a consequence, when the drive roller 85b is rotated in the reverse direction, rotation force directing in the direction opposite to the direction of the loading mode is given to the small-diameter disk $D_8$, whereby the small-diameter disk $D_8$ is rotated toward the disk entrance and exit slot 30. Function to rotate the small-diameter disk $D_8$ is transmitted to the pair of front drive roller 85a and front fixed roller 95a through cooperative actions of the pair of rear drive roller 85b and rear fixed roller 95b and the pair of front drive roller 85a and front fixed roller 95a, whereby the small-diameter disk $D_8$ is transported to the disk entrance and exit slot 30.

In this case, when the largest diameter portion of the small-diameter disk $D_8$ passes the pair of rear drive roller 85b and rear fixed roller 95b, the operation member 87 is detached from the second detection switch SW2 through operations of the drive-side assembly body 20 and hence the second detection switch SW2 is switched from the on-state to the off-state. This time is a time t13 shown in FIG. 49. Subsequently, the support lever 15 moves to the innermost portion to detach the operation member 15d from the fifth detection switch SW5 so that the fifth detection switch SW5 is switched from the on-state to the off-state. This time is a time t14 shown in FIG. 49.

Thereafter, when the small-diameter disk $D_8$ reaches to the disk entrance and exit slot 30, the outer peripheral edge of the small-diameter disk $D_8$ outwardly expands both of the drive guide roller 92c and the fixed guide roller 97c which are disposed at the right and left of the disk entrance and exit slot 30. Thus, the operation pin 92b of the detection member 92 is brought in contact with the first detection switch SW1, whereby the first detection switch SW1 is switched from the off-state to the on-state. This time is a time t15 shown in FIG. 49.

Figure 37:
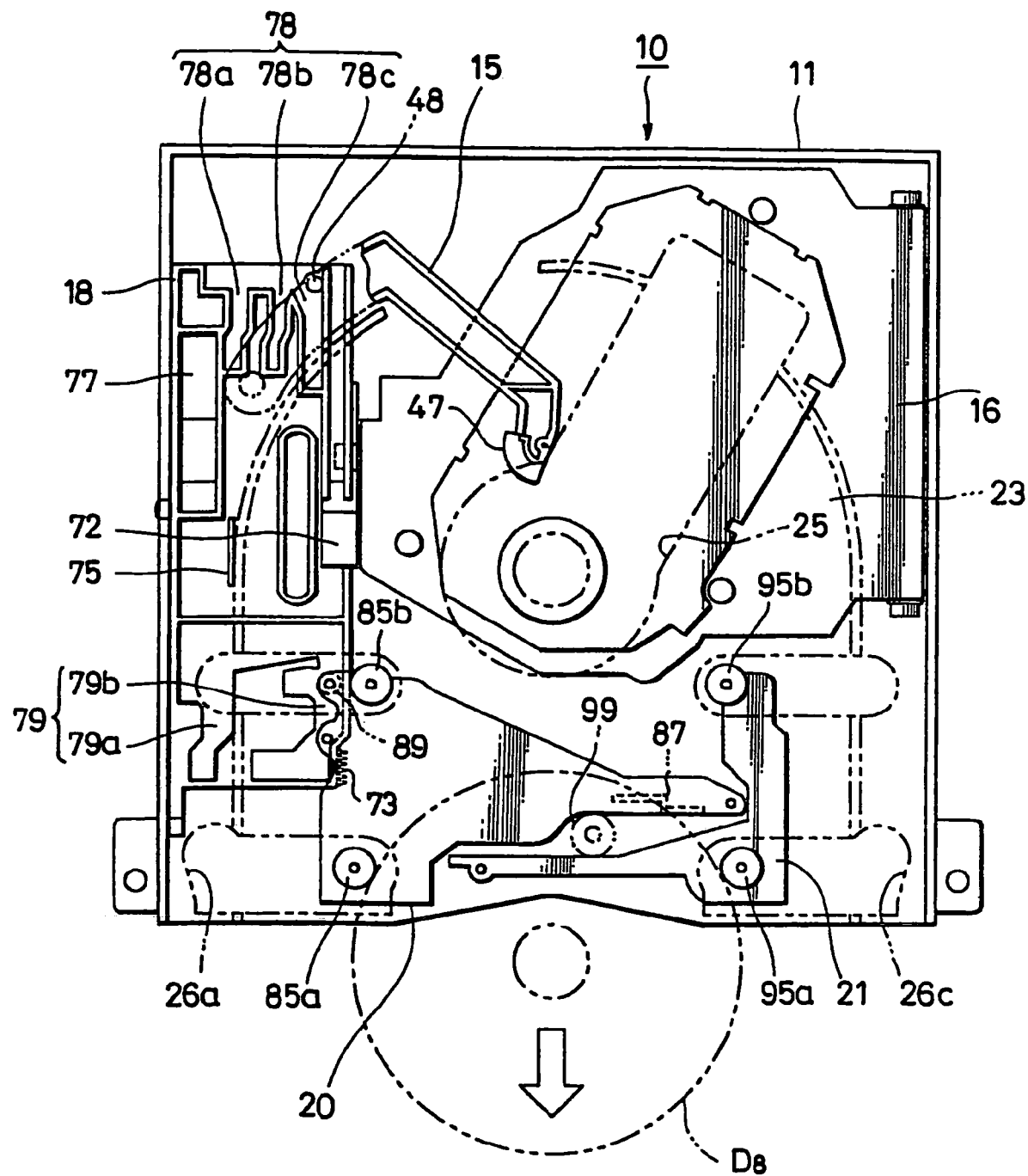
FIG. 37 is an explanatory diagram showing the state in which the optical disk is being ejected from the disk entrance and exit slot when the 8 cm optical disk is available in the disk recording and reproducing apparatus shown in FIG. 5.
Figure 38A:
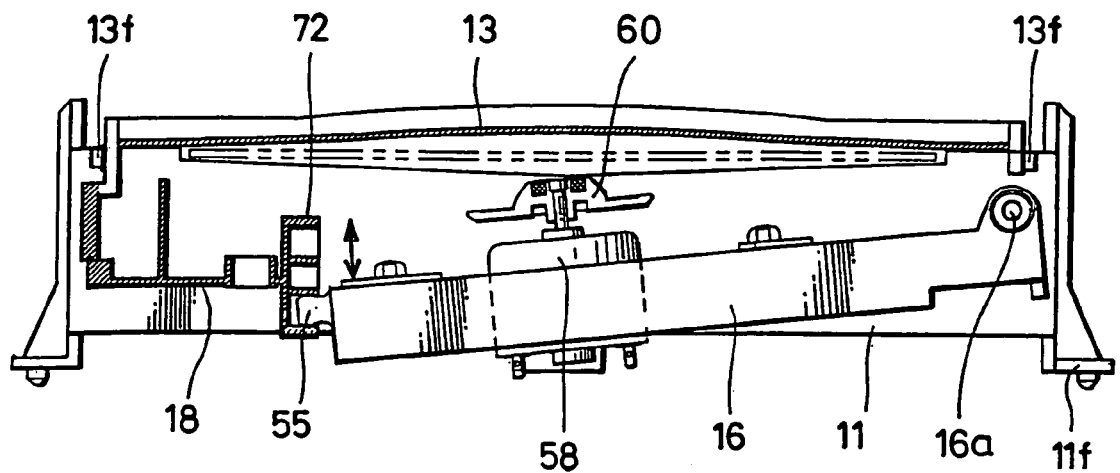
FIG. 38A is an explanatory diagram showing the cam plate, the turntable and the like from the front and FIG.
Figure 38B:
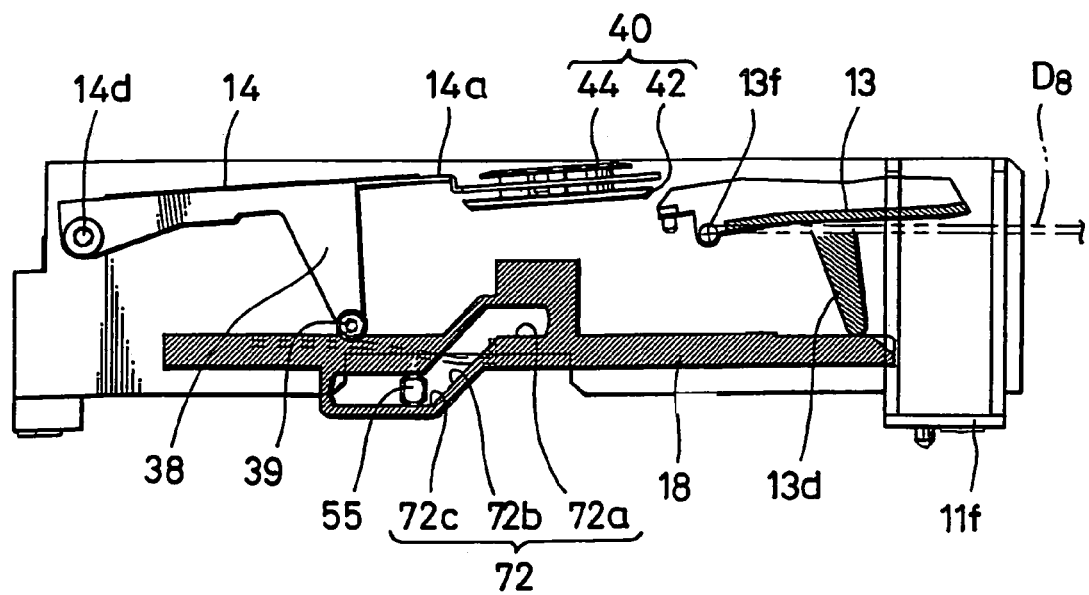

From a time in which the first detection switch SW1 is switched to the on-state, rotation of the first drive motor 84 is controlled and the first drive motor begins to decelerate. Then, after a predetermined time DS that had been set in advance passed, the supply of the drive current to the first drive motor 84 is interrupted and rotation of the first drive motor is brought to an end. At the same time, the second detection switch SW2 is switched from the off-state to the on-state. This time is a time t16 shown in FIG. 49. Consequently, as shown in FIG. 37, the small-diameter disk $D_8$ is projected sufficiently from the disk entrance and exit slot 30 and hence the user can pull out the small-diameter disk $D_8$ from the disk entrance and exit slot. This time is a time t17 shown in FIG. 49.

At that time, as shown in FIGS. 36A, 36B and FIGS. 38A, 38B, the open/close shutter 13, the chucking arm 14, the assembly body holder 16 and the cam plate 18 are all returned to the original positions and their attitudes are similar to those shown in FIGS. 30A, 30B.

Then, after a predetermined time had passed, the disk recording and reproducing apparatus is moved to the next standby state to allow the optical disk D to be inserted thereto again. Specifically, the first detection switch SW1 is switched from the on-state to the off-state, the on-state of the second detection switch SW2 is maintained and the sixth detection switch SW6 is switched from the off-state to the on-state. Thus, it becomes possible to insert the next optical disk D into the disk recording and reproducing apparatus.

The case of the large-diameter disk $D_{12}$ having the diameter of 12 cm will be described next. As shown in FIG. 39 and FIGS. 40A, 40B, when the user inserts the tip end portion of the large-diameter disk $D_{12}$ into the disk entrance and exit slot 30 of the gate member 12 (in the front and rear direction X), the tip end portion of the large-diameter disk enters into the underside of the shutter portion 13a of the open/close shutter 13. At that time, since the cam plate 18 is located at the most front portion which is the initial set position and the shutter portion 13a of the open/close shutter 13 is slightly raised in the upper direction, the lower surface of the shutter portion 13a serves as an arc-like guide surface to enable the user to insert the tip end portion of the large-diameter disk $D_{12}$ into the underside of the shutter portion 13a with ease.

Since the roller 39 is laid over the upper horizontal plate 77a of the chucking cam portion 77 of the cam plate 18 and is raised in the upper direction, the chucking member 40 held at the tip end portion of the chucking arm 14 also is elevated in the upper direction by a predetermined height. Further, since the cam protrusion 55 of the assembly body holder 16 is located at the lower horizontal portion 72c of the elevation cam portion 72 of the cam plate 18, the assembly body holder 16 leans forward with the result that the turntable 60 of the pickup table assembly body 17 mounted on the assembly body holder 16 is lowered from the opening portion 25 of the main chassis 11 in the lower direction.

In this state, when the large-diameter disk $D_{12}$ is inserted into the disk entrance and exit slot 30, the tip end portion of the disk guided and entered by the guide curved surface of the shutter portion 13a comes in contact with the drive guide roller 92c disposed in front of the front drive roller 85a and the fixed guide roller 97c disposed in front of the front fixed roller 95a to thereby expand these guide rollers 92c, 97c to the outside, respectively. Specifically, in FIG. 26, the drive guide roller 92c is rotated in the clockwise direction and the fixed guide roller 97c is rotated in the counter-clockwise direction.

As a result, the detection member 92 that supports the drive guide roller 92c is rotated in the clockwise direction, whereby the operation pin 92b is rotated in the same direction to press the first detection switch SW1. Thus, the first detection switch SW1 is switched from the off-state to the on-state and thereby its detection signal is outputted. This time is a time t1 shown in FIG. 50. Based upon this detection signal, a drive current is outputted to the first drive motor 84 of the drive-side roller assembly body 20. Thus, the first drive motor 84 is rotated in the direction in which the large-diameter disk $D_{12}$ is transported to the disk loading portion.

Consequently, rotation force of the first drive motor 84 is transmitted from the worm 84 fixed to the rotary shaft of the first drive motor through the first gear mechanism 86 to the respective gear portions 85c of the pair of drive rollers 85a, 85b. Thus, the pair of drive rollers 85a, 85b is rotated in the counter-clockwise direction in FIG. 39 and the drive-side cushion members 90c made of rubber-like elastic materials integrally fitted into the outer shaft portions 85e of the respective drive rollers 85a, 85b are rotated.

Further, when the large-diameter disk $D_{12}$ is pressed, the tip end portion of the disk is brought in contact with the front drive-side cushion member 90c and the like front fixed-side cushion member. Thus, the large-diameter disk $D_{12}$ is supported by three points of the front drive roller 85a, the fixed roller 95a and the user. Then, rotation force of the front drive roller 85a is transmitted to a part of the outer peripheral edge of the large-diameter disk $D_{12}$ by friction force generated between the drive-side cushion member 90c and the large-diameter disk $D_{12}$. On the other hand, the other end of the outer peripheral edge of the large-diameter disk $D_{12}$ is fixed to that position by friction force generated between it and the fixed-side cushion member.

As a result, rotation force for moving the large-diameter disk to the disk compartment 23 is generated in the large-diameter disk, whereby the large-diameter disk $D_{12}$ is rotated to the disk insertion direction. When the large-diameter disk $D_{12}$ is rotated, the front drive roller 85a and the front fixed roller 95a are moved in the direction in which they are spaced apart from each other in the right and left direction Y against spring force of the tension coil spring 98. After the front drive roller 85a had been moved, the second detection switch SW2 that had been pressed and energized by the operation member 87 is switched to the off-state and its detection signal is outputted. This time is a time t2 shown in FIG. 50.

Then, when a space between the front drive roller 85a and the front fixed roller 95a becomes wider, the third detection switch SW3 is switched from the off-state to the on-state by the operation member 87 and its detection signal is outputted. This time is a time t3 shown in FIG. 50. When the space between the front drive roller 85a and the front fixed roller 95a further increases, the outer peripheral edge of the disk is detached from the drive-side guide roller 92c so that force that presses the operation pin 92 is released. As a result, the detection member 92 is returned to the initial position under spring force and hence the first detection switch SW1 is again switched from the on-state to the off-state. This time is a time t4 shown in FIF. 50.

Further, when the space between the front drive roller 85a and the front fixed roller 95a increases, the fourth detection switch SW4 is switched from the off-state to the on-state by the operation member 87 and its detection signal is outputted. This time is a time t5 shown in FIG. 50. Then, when the largest diameter portion (diameter portion) of the large-diameter disk $D_{12}$ passes the front drive roller 85a and the front fixed roller 95a, since the drive-side roller assembly body 20 and the fixed-side roller assembly body 21 are constantly biased inwardly under the spring force of the tension coil spring 98, the space between the two rollers 85a, 95a increases. As a result, the operation member 87 is temporarily detached from the fourth detection switch SW4 and hence the fourth detection switch SW4 is switched from the on-state to the off-state. This time is a time t6 shown in FIG. 50.

Subsequently, when the central portion of the large-diameter disk $D_{12}$ moves from the side of the front drive roller 85a to the side of the rear drive roller 85b, since the diameter of the large-diameter disk $D_{12}$ increases, the fourth detection switch SW4 is again switched from the off-state to the on-state and its detection signal is outputted. This time is a time t7 shown in FIG. 50. At that time, the large-diameter disk $D_{12}$ is supported by the drive-side cushion member 90c, the fixed-side cushion member 115c and the wiper member 31 attached to the disk entrance and exit slot 30 and is rotated in the disk insertion direction by rotation force of the drive-side cushion member 90c while it is being maintained in approximately the horizontal state.

Subsequently, the tip end portion of the large-diameter disk $D_{12}$ is guided by the rear drive roller 85b and is also guided by the drive-side cushion member 90c provided on the bottom of the groove portion and the rear-side fixed roller 95a, thereby being brought in contact with the fixed-side cushion member 115c provided at the bottom of the groove portion. As a result, the large-diameter disk $D_{12}$ is supported by totally four points of the drive-side front and rear two cushion members 90c, 90c and the fixed-side front and rear two cushion members 115c, 115c. Then, when the rear end portion of the large-diameter disk $D_{12}$ is detached from the front drive roller 85a and fixed roller 95a, while the large-diameter disk is being supported by the rear drive roller 85b and fixed roller 95b, the large-diameter disk is rotated by rotation force of the drive roller 85b and thereby transported to the disk compartment 23.

In this case, when the tip end portion of the large-diameter disk $D_{12}$ passes the central portion of the disk compartment 23, the tip end portion of the disk is brought in contact with the disk holding portion 47 of the support lever 15 that is on-standby near the central portion of the disk compartment. As a result, the large-diameter disk $D_{12}$ is supported by three points of the rear drive roller 85b and fixed roller 95b and the disk holding portion 47. In this state, when the large-diameter disk $D_{12}$ is further transported to the disk insertion direction and reaches to the disk compartment 23, the large-diameter disk is placed in the states shown in FIG. 41 and FIGS. 42A, 42B. At that time, the cam plate 18 is placed at the initial front end portion. Accordingly, the open/close shutter 13 and the chucking arm 14 are both leaning in the upper direction and the assembly body holder 16 is leaning in the forward direction. Their attitudes are not changed at all.

In that case, the support lever 15 is moved toward the direction in which the large-diameter disk is ejected (in the counter-clockwise direction shown in FIG. 41) against spring force of the coil spring 52, whereby the operation member 15d of the support lever 15 is brought in contact with the fifth detection switch SW5. Thus, the fifth detection switch SW4 is switched from the off-sate to the on-state and its detection signal is outputted. This time is a time t8 shown in FIG. 50.

Then, the large-diameter disk $D_{12}$ is moved up to the disk loading portion that is the center of the disk compartment 23 and the rear drive roller 85b and fixed roller 95b become closer than a predetermined space, whereby the second operation portion 87c of the operation member 87 is brought in contact with the fourth detection switch SW4 and its detection signal is outputted. This time is a time t9 shown in FIG. 50. Based upon this detection signal, the supply of the drive current to the first drive motor 84 is stopped and thereby rotations of the pair of drive rollers 85a, 85b are stopped.

At that time, as shown in FIG. 41, the cam pin 48 provided at the support lever 15 is opposed to the position which faces to the first cam portion 78a of the lever cam portion 78. The roller 89 that is rotatably supported to the shaft pin 89a of the drive-side roller assembly body 20 is opposed to the position which faces to the large-diameter cam portion 79a of the roller cam portion 79.

After driving of the first drive motor 84 had been brought to an end, as shown in FIG. 50, when the first delay time TD1 that was set in advance elapsed, the drive current is outputted to the second drive motor 101 of the chuck drive assembly body 22. Thus, the second drive motor 101 is rotated in a predetermined direction that was determined in advance (in the direction in which the cam plate 18 is moved in the rearward).

In consequence, rotation force of the second drive motor 101 is transmitted from the worm 108 fixed to the rotary shaft of the second drive motor through the first gear mechanism 102 (worm wheel 109, intermediate gear 110 and output gear 111) to the rack portion 73 of the cam plate 18, whereby the cam plate 18 is moved in the rearward from the position shown in FIG. 41 to the position shown in FIG. 43 (in the front and rear direction X).

When the cam plate 18 is moved in the rearward, first, the sixth detection switch SW6 is switched from the on-state to the off-state by the switch operation member 75. This time is a time t10 shown in FIG. 50. Subsequently, the seventh detection switch SW7 is switched from the off-state to the on-state by the switch operation member 75. This time is a time t11 shown in FIG. 50. By visually confirming the order in which the two detection switches SW6, SW7 are turned on and off, it is possible for the user to know that the large-diameter disk $D_{12}$ is transported to the side of the disk loading portion.

At the same time, when the cam plate 18 is moved in the rearward, the cam pin 48 of the support lever 15 enters into the first cam portion 78a of the lever cam portion 78. On the other hand, the roller 89 of the drive-side roller assembly body 20 enters into the large-diameter cam portion 79a of the roller cam portion 79 at that position. Then, the fourth detection switch SW4 is switched from the off-state to the on-state. This time is a time t12 shown in FIG. 50.

Next, when the cam plate 18 is moved to the rearmost portion, the switch operation member 75 comes in contact with the eighth detection switch SW8 to switch the eighth detection switch SW8 from the off-state to the on-state. This time is a time t13 shown in FIG. 50. Then, after the cam plate 18 had moved to the rearmost portion, when the second delay time DT2 that was set in advance elapsed, the supply of the drive current to the second drive motor 101 is stopped, whereby the second drive motor 101 is stopped and the cam plate 18 is held in the state in which it is stopped at the rearmost portion.

In that case, as shown in FIGS. 44A and 44B, based upon the rear movement of the cam plate 18, the cam protrusion 55 is slid from the lower horizontal portion 72c of the elevation cam portion 72 through the inclined portion 72b to the upper horizontal portion 72a. As a result, the assembly body holder 16 is elevated about the pair of shaft portions 16a, 16a provided at the rear end portion such that it may raise the side of the cam protrusion 44 at the tip end portion. Hence, its attitude is changed in approximately the horizontal state, whereby the upper portion of the pickup table assembly body 17 supported to the assembly body holder 16 enters into the opening portion 25 of the main chassis 11 from the underside.

Consequently, the turntable 60 fixed to the tip end portion of the rotary shaft of the spindle motor 58 of the pickup table assembly body 17 is opposed to the large-diameter disk $D_{12}$. When the turntable is rotated in the upper direction, the engagement portion is fitted into the center hole d of the large-diameter disk $D_{12}$. The chucking arm 14 and the open/close shutter 13 are lowered in the lower direction in unison with the movement of the turntable 60.

Specifically, since the chucking arm 14 is constantly biased in the direction in which it approaches the disk compartment 23 under the spring force of the coil spring 45, the roller 39 that is rotatably supported to the lower end of the drive lever 38 is slid from the upper horizontal portion 77a of the chucking cam portion 77 through the inclined portion 77b to the lower horizontal portion 77c in unison with the rearward movement of the cam plate 18. In that case, since the height position of the roller 39 is progressively lowered by the cam portion 77, the arm portion 14a is pushed down and the chucking arm 40 held at the tip end of the arm portion is moved close to the turntable 60.

Thus, the chucking member 40 and the turntable 60 are opposed to each other across the large-diameter disk $D_{12}$ in the upper and lower direction. As a result, the magnet 59 incorporated within the turntable 60 magnetically attracts the chucking member 40 so that the large-diameter disk $D_{12}$ is sandwiched by the chucking member 40 and the turntable 60 in the upper and lower direction. Thus, chucking of the large-diameter disk $D_{12}$ is completed and the large-diameter disk $D_{12}$ is rotated in unison with the rotation of the turntable 60.

In that case, since the cam pin 48 is laid over the escape portion $78a_0$ set at the deep portion of the first cam portion 78a, the support lever 15 is slightly rotated in the counterclockwise direction. Consequently, the disk holding portion 47 is further moved to the outside slightly and thereby the disk holding portion 47 is detached from the large-diameter disk $D_{12}$ and the engagement is released. Similarly, since the roller 89 is laid over the escape portion $79a_0$ set at the deep portion of the large-diameter cam portion 79a, the inner drive roller 85b and fixed roller 95b are further moved to the outside slightly.

Therefore, the two rollers 85b, 95b are detached from the large-diameter disk $D_{12}$ and thereby the engagement is released. As a result, since the large-diameter disk $D_{12}$ is supported by only the chucking member 40 and the turntable 60, the outer peripheral edge of the disk can be prevented from slidably contacting with the drive roller 85b, the fixed roller 95b or the disk holding portion 47.

Furthermore, since the open/close shutter 13 is constantly biased in the forward direction under the spring force of the compression coil spring 37, when the cam plate 18 is moved in the rearward, the drive lever 13d is relatively moved in the forward direction and is released to the front side through the cam portion 74 provided at the front end portion of the cam plate 18. Consequently, the open/close shutter 13 is changed from the slightly upward state shown in FIG. 42 to the slightly downward state shown in FIG. 44. Thus, the lower surface of the shutter portion 13a is forced to contact with the disk guide portion 29 of the main chassis 11 and thereby the inside of the disk entrance and exit slot 30 is tightly closed by the shutter portion 13a.

As a consequence, even when the user intends to insert the second optical disk D into the apparatus from the disk entrance and exit slot 30 inadvertently, such insertion operation can be reliably prevented and hence it is possible to prevent the user from inserting the second disk into the apparatus by mistake highly reliably. After loading of the large-diameter disk had been completed through such operations, an information signal can be recorded on and reproduced from the large-diameter disk $D_{12}$ and recording and reproducing operations can be executed.

Next, a disk eject operation (unloading) in which the large-diameter disk $D_{12}$ is ejected from the disk entrance and exit slot 30 after an information signal had been recorded on and reproduced from the large-diameter disk will be described. When the user selects the disk eject operation by operating the eject button, for example, the drive current is supplied to the second drive motor 101 and thereby the second drive motor is rotated. This time is a time t14 shown in FIG. 50.

In this case, the second drive motor 101 is rotated in the direction opposite to the disk insertion direction and thereby the cam plate 18 is moved in the disk eject direction. Unloading of the large-diameter disk $D_{12}$ can be executed by effecting control in which the second drive motor 101 for moving the cam plate 18 forward and the first drive motor 84 for rotating the pair of drive rollers 85a, 85b are rotated in opposite directions.

Specifically, when the cam plate 18 is moved in the forward direction, since the cam pin 48 is released from the first cam portion 78a, the support lever 15 is rotated in the clockwise direction in FIG. 45 under the spring force of the coil spring 52, whereby the disk holding portion 47 is engaged with the outer peripheral edge of the large-diameter disk $D_{12}$. Then, pressing force generated in the disk holding portion 47 under the spring force of the coil spring 52 is given to the insertion side end portion of the large-diameter disk $D_{12}$, whereby the large-diameter disk $D_{12}$ is pressed to the side of the disk entrance and exit slot 30.

In this case, after the cam plate 18 had moved forward and a third delay time DT3 that was set in advance had elapsed, the switch operation member 75 is detached from the eighth detection switch SW8 so that the eighth detection switch SW8 is switched from the on-state to the off-state. This time is a time t15 shown in FIG. 50. After the eighth detection switch SW8 had been switched as described above, the fourth detection switch SW4 is switched from the on-state to the off-state. This time is a time t16 shown in FIG. 50. Subsequently, the seventh detection switch SW7 is switched from the on-state to the off-state. This time is a time t17 shown in FIG. 50.

After the seventh detection switch SW7 had been switched to the off-state, when a fourth delay time DT4 that was set in advance elapsed, the supply of the drive current to the second drive motor 101 is brought to an end. As a result, the second drive motor 101 is stopped and forward movement of the cam plate 18 is stopped. Further, after the supply of the drive current to the second drive motor 101 had been stopped, when a fifth delay time DT5 that was set in advance elapsed, the drive current is supplied to the first drive motor 84. In this case, the first drive motor 84 is rotated in the direction opposite to the disk insertion direction and the pair of drive rollers 85a, 85b are rotated in the clockwise direction that is the opposite direction of the rotation direction.

In that case, the outer peripheral edge on the eject side of the large-diameter disk $D_{12}$ that is pressed forward by the support lever 15 is brought in contact with the rear drive roller 85b and the rear fixed roller 95b. As a result, when the drive roller 85b is rotated in the reverse direction, rotation force in the direction opposite to that of the loading mode is given to the large-diameter disk $D_{12}$. Thus, the large-diameter disk $D_{12}$ is rotated to the side of the disk entrance and exit slot 30. Function for rotating the large-diameter disk $D_{12}$ is transmitted to the pair of front drive roller 85a and front fixed roller 95a through cooperative actions of the pair of rear drive roller 85b and rear fixed roller 95b and the pair of front drive roller 85a and front fixed roller 95a, whereby the large-diameter disk $D_{12}$ is transported up to the disk entrance and exit slot 30.

In this case, since the largest diameter portion of the large-diameter disk $D_{12}$ enters into the pair of rear drive roller 85b and rear fixed roller 95b, first, the fourth detection switch SW4 is switched from the off-state to the on-state by the operation member 87 of the drive-side roller assembly body 87. This time is a time t18 shown in FIG. 50. Subsequently, the support lever 15 is moved toward the inside, whereby the operation member 15d is detached from the fifth detection switch SW5 and the fifth detection switch SW5 is switched from the on-state to the off-state. This time is a time t19 shown in FIG. 50.

Then, the largest-diameter portion of the large-diameter disk $D_{12}$ passes the pair of rear drive rollers 85b and rear fixed rollers 95b to detach the operation member 87 to thereby switch the fourth detection switch SW4 from the on-state to the off-state. This time is a time t20 shown in FIG. 20. Subsequently, the largest-diameter portion of the large-diameter disk $D_{12}$ enters into the pair of front drive roller 85a and front fixed roller 95a to switch again the fourth detection switch SW4 from the off-state to the on-state. This time is a time t21 shown in FIG. 50. Then, the large-diameter disk $D_{12}$ passes the pair of front drive roller 85a and front fixed roller 95a to switch again the fourth detection switch SW4 from the on-state to the off-state. This time is a time t22 shown in FIG. 50.

Thereafter, when the large-diameter disk $D_{12}$ reaches to the disk entrance and exit slot 30, the outer peripheral edge of the large-diameter disk $D_{12}$ extends both of the drive-side guide roller 92c and the fixed-side guide roller 97c disposed at the right and left of the disk entrance and exit slot 30 to the outside. Thus, since the operation pin 92b of the detection member 92 comes in contact with the first detection switch SW1, the first detection switch SW1 is switched from the off-state to the on-state. This time is a time t23 shown in FIG. 50.

From a time in which the first detection switch SW1 is switched to the on-state, deceleration of the first drive motor 84 is started by controlling rotation of the first drive motor. After a predetermined time DS that had been set in advance elapsed, the supply of the drive current to the first drive motor 84 is interrupted to stop rotation of the first drive motor. At the same time, the third detection switch SW3 is switched from the on-state to the off-state. This time is a time t24 shown in FIG. 50. Thus, as shown in FIG. 47, the large-diameter disk $D_{12}$ is sufficiently projected from the disk entrance and exit slot 30 so that the user becomes able to pull out the large-diameter disk $D_{12}$ from the disk entrance and exit slot. This time is a time t25 shown in FIG. 50.

In that case, the user pulls out the large-diameter disk $D_{12}$ from the disk entrance and exit slot, whereby the first detection switch SW1 is switched from the on-state to the off-state. In this case, as shown in FIGS. 46A, 46B and FIGS. 48A, 48B, the open/close shutter 13, the chucking arm 14, the assembly body holder 16 and the cam plate 18 are all returned to the original positions so that they are returned to attitudes similar to those of FIGS. 40A, 40B.

In this case, as shown in FIG. 52, since the opening portion 124 to which the disk entrance and exit slot 30 of the housing 120 in which the disk recording and reproducing apparatus 10 is housed is faced has the arc-like disk holding portion 125 concaved at the inside of the central portion, the user can eject the optical disk D with fingers on the outer peripheral edge of the optical disk and the center hole d. Thus, when the user ejects the optical disk D from the disk recording and reproducing apparatus, there can decrease a risk that the user will touch the signal recording surface of the optical disk. Accordingly, the signal recording surface of the optical disk can be prevented from being smudged by undesirable materials such as oil when the user touches the signal recording surface. Thus, an information signal can be recorded on and reproduced from the optical disk highly reliably.

Thereafter, after a predetermined time elapsed, the disk recording and reproducing apparatus is moved to the next standby mode such that the user can insert again the optical disk D into the disk recording and reproducing apparatus. Specifically, the second detection switch SW2 is switched from the on-state to the off-state and the sixth detection switch SW6 is switched from the off-state to the on-state. Thus, it becomes possible for the user to insert the next optical disk D into the disk recording and reproducing apparatus.

Figure 10:
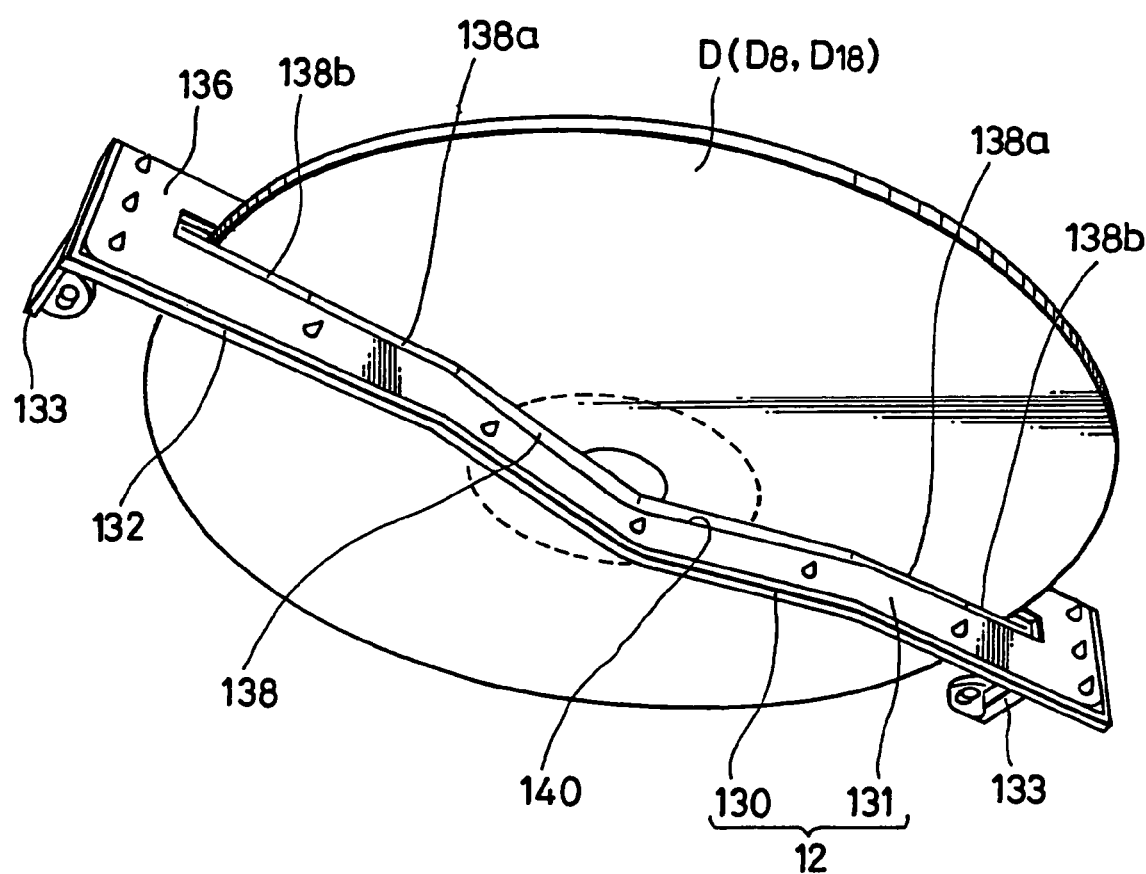
FIG. 10 is a perspective view showing the state in which an optical disk is being inserted into the gate member of the disk recording and reproducing apparatus shown in FIG. 5.

In the above-mentioned loading mode and unloading mode, as shown in FIG. 10, when the optical disk D ($D_8$, $D_{12}$) into the opening portions 134, 140 of the gate member 12, the optical disk D is held by the upper and lower slot edges of the slot 143 of the gate cover 138 from the upper and lower direction. At that time, resistance force that acts when the optical disk D passes the gate cover changes depending upon the direction in which the optical disk D passes, i.e., whether the optical disk D is placed in the loading state or in the unloading state.

Figure 11A:
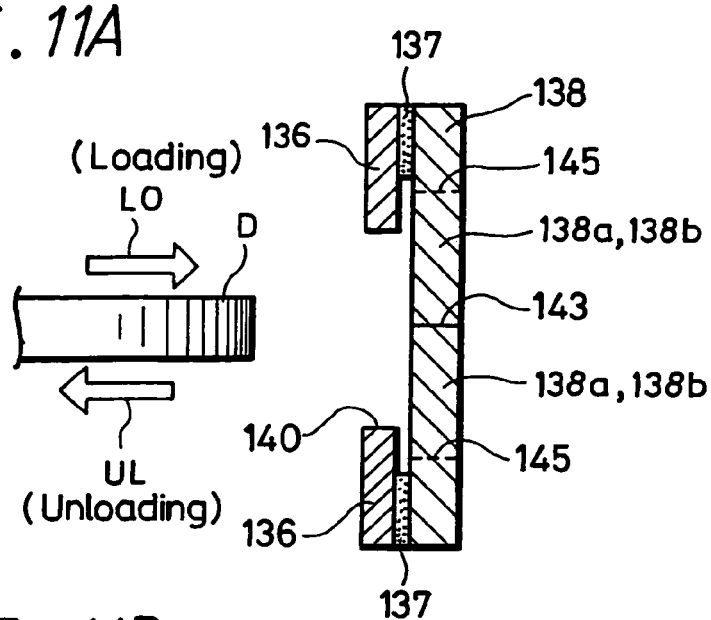
FIG. 11A is a diagram to which reference will be made in explaining the state presented before and after the optical disk passes the gate member.
Figure 11B:
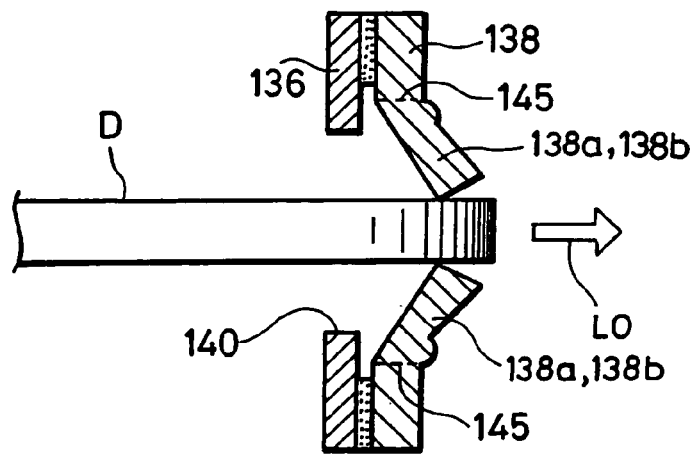
FIG. 11B is a diagram to which reference will be made in explaining state of the gate member upon loading and FIG. 11C is a diagram to which reference will be made in explaining the state of the gate member upon unloading.
Figure 11C:
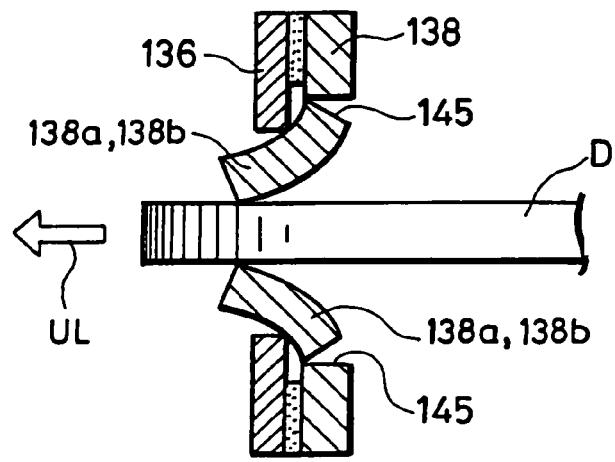

FIGS. 11A, 11B are diagrams to which reference will be made in explaining the state in which resistance force is changed by the gate cover 138. FIG. 11A is a diagram showing the state presented before and after the optical disk D passes the gate cover 138. FIG. 11B is a diagram showing the state of the loading mode and FIG. 11C is a diagram showing the state of the unloading mode. In the loading mode and the unloading mode, the largest outer diameter portion of the small-diameter disk $D_8$ is brought in slidable contact with the small-diameter support member 138a of the gate cover 138 and the largest outer diameter portion of the large-diameter disk $D_{12}$ is brought in slidable contact with the large-diameter support member 138b of the gate cover 138.

In the loading mode shown in FIG. 11B, the small-diameter support member 138a of the gate cover 138 is deformed about the slit 145 by the outer peripheral edge of the small-diameter disk $D_8$. Similarly, the large-diameter support member 138b of the gate cover 139 is deformed about the slit 145 by the outer peripheral edge of the large-diameter disk $D_{12}$.

At that time, since the small-diameter support member 138a and the large-diameter support member 138b are deformed freely, the small-diameter support member 138a or the large-diameter support member 138b is linearly deformed about the slit 145 considerably. In addition, the deformed portion is the slit 145 and hence the small-diameter support member or the large-diameter support member can be deformed with ease. Accordingly, since resistance force applied from the small-diameter support member 138a and the large-diameter support member 138b to the optical disk D ($D_8$, $D_{12}$) is extremely small, the optical disk D can pass the slot 143 with ease.

On the other hand, in the loading mode shown in FIG. 11C, the small-diameter support member 138a of the gate cover 138 is started to be curved from the peripheral edge of the mask opening portion 140 of the frame 136 by the outer peripheral edge of the small-diameter disk $D_8$. Similarly, the large-diameter support member 138b of the gate cover 138 is started to be curved from the peripheral edge of the mask opening portion 140 of the frame 136 by the outer peripheral edge of the large-diameter disk $D_{12}$. At that time, a distance from the peripheral edge of the mask opening portion 140 to the surface of the optical disk D is shorter than a distance from the slit 145 to the surface of the optical disk D. In addition, the small-diameter support member 138a and the large-diameter support member 138b are urged against the peripheral edge of the mask opening portion 140 at its portion without the slit 145.

Consequently, since the small-diameter support member 138a and the large-diameter support member 138b are curved in an arc fashion, large inside resistance is generated and hence resistance applied to the optical disk D ($D_8$, $D_{12}$) from the small-diameter support member 138a and the large-diameter support member 138b increases. As a result, resistance force generated when the optical disk D passes the slot 143 of the gate cover 138 increases so that the optical disk D becomes difficult to pass the gate cover. The optical disk D is held by resistance force of the gate cover 138 and the optical disk D can be prevented from being dropped from the disk entrance and exit slot 30 by its weight.

Figure 20:
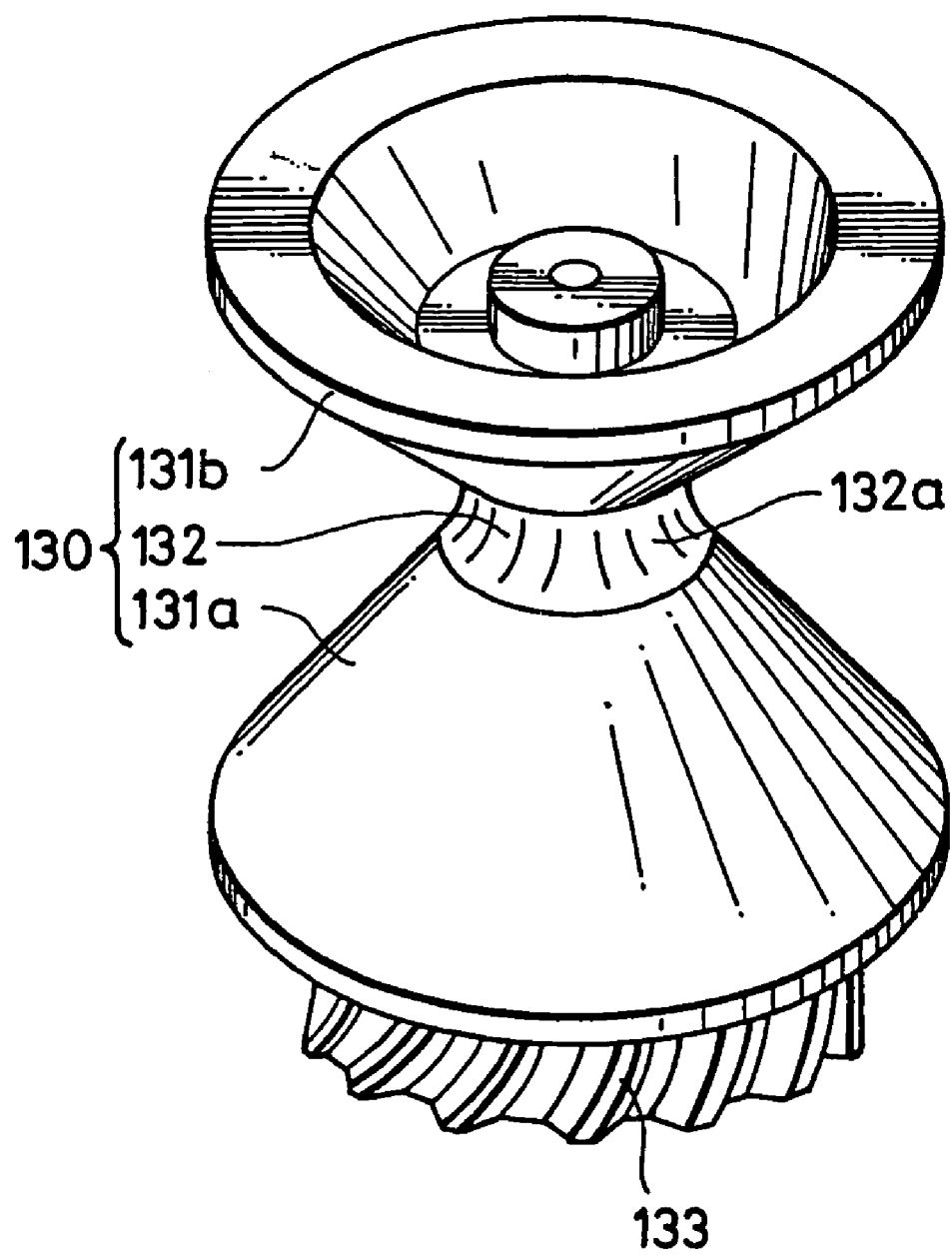
FIG. 20 is a perspective view of a drive roller to be used for applying to the drive-side roller assembly body shown in FIGS. 16 according to a second embodiment.
Figure 21A:
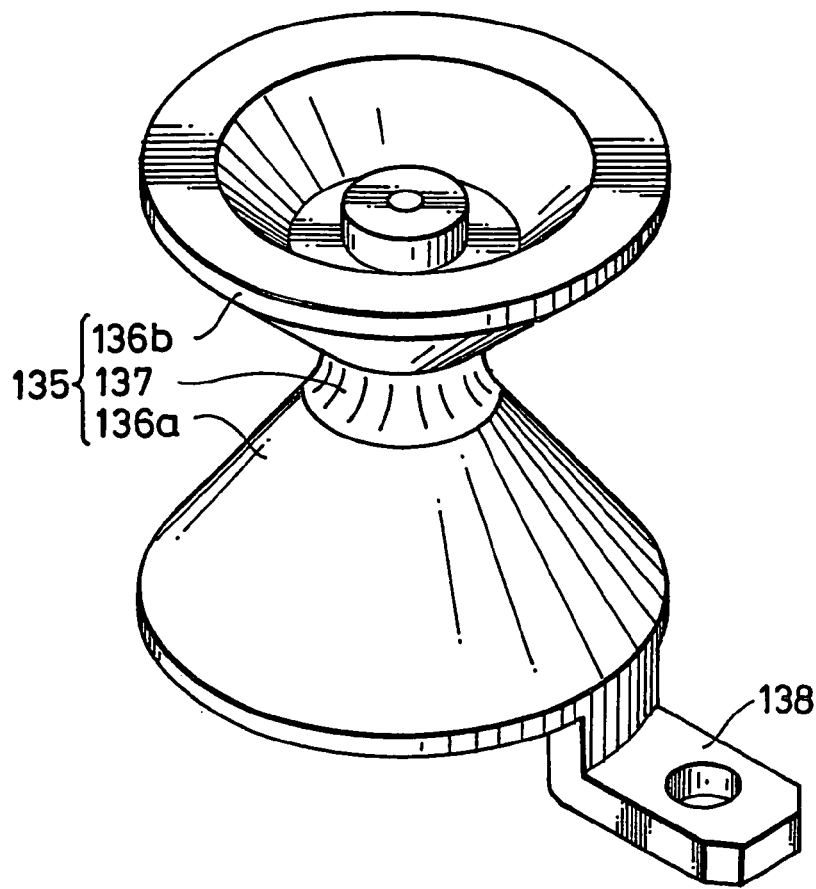
FIG. 21A is a perspective view thereof and FIG. 21B is a longitudinal cross-sectional view of the central portion of the stationary roller.
Figure 21B:
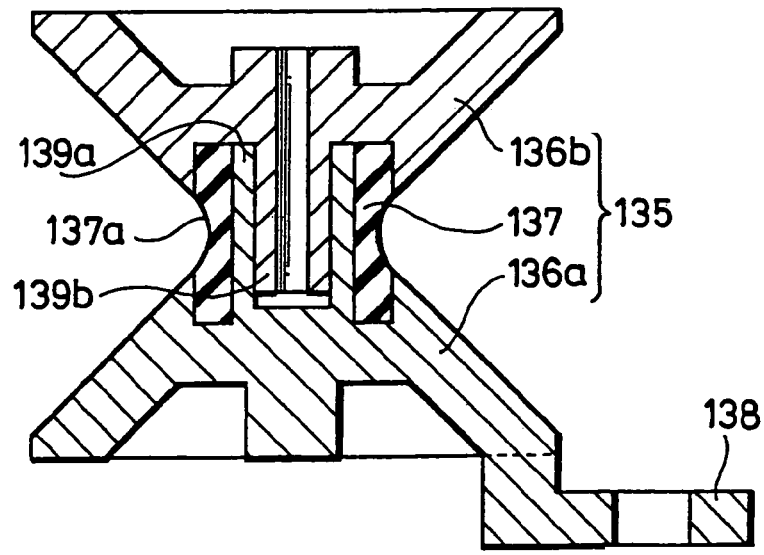

FIG. 20 is a diagram showing a drive roller that is the above-mentioned transport roller according to a second embodiment of the present invention. FIGS. 21A and 21B are diagrams showing a fixed roller that is the above-mentioned second transport roller according to a second embodiment of the present invention. A drive roller 130 includes a drive member 131a, a balance member 131b and a cushion member 132, and a gear portion 133 is integrally formed with the lower surface of the drive member 131a. The cushion member 132 of the drive roller 130 has an annular groove 132a in which a concave portion with an arc-like cross-sectional shape is continued in the circumferential direction formed in somewhere of the axis direction of its outer peripheral surface. This annular groove 132a receives the outer peripheral edge of the optical disk D and hence the optical disk D can be transported in the horizontal direction.

The fixed roller 135 includes a fixed member 136a, a balance member 136b and a cushion member 137, and a base member 138 is integrally formed on the lower portion of the fixed member 136a. The cushion member 137 of the fixed roller 135 includes an arrangement similar to that of the cushion member 132 of the drive roller 130. This cushion member has an annular groove 137a in which a concave portion with a cross-sectionally arc-like shape is continued in the circumferential direction formed in somewhere of the axis direction of its outer peripheral surface. This annular groove 137a receives the outer peripheral edge of the optical disk D and hence the optical disk D can be transported in the horizontal direction.

As shown in FIG. 21B, while an outer shaft portion 139a is formed on the fixed member 136a, an inner shaft portion 139b that engages with this outer shaft portion 139a is formed on the balance member 136b. The outer shaft portion 139a and the inner shaft portion 139b are engaged with each other by fixing means such as pressure insertion means, whereby the fixed member 136a and the balance member 136b are formed integrally with each other. Then, the balance member 137 is fitted into the outer shaft portion 139a by means such as pressure insertion means and thereby integrally formed so that the balance member cannot be rotated.

Figure 22A:
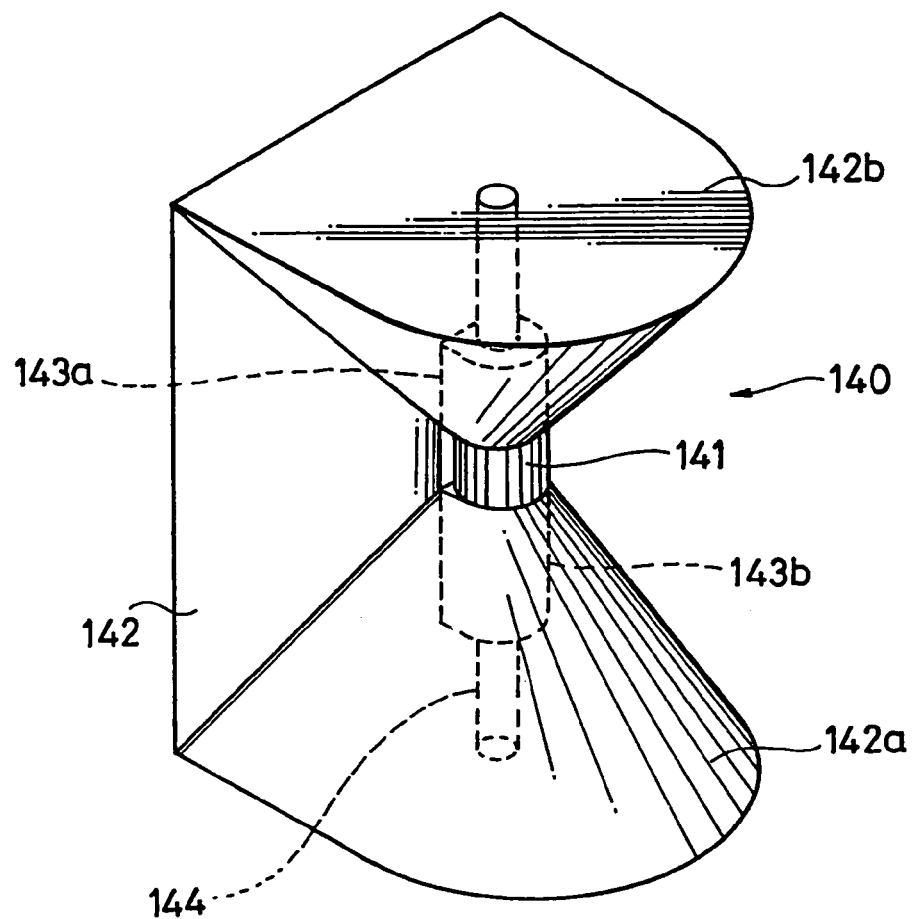
FIG. 22A is a perspective view thereof and FIG. 22B is a longitudinal cross-sectional view of the central portion of the drive roller.
Figure 22B:
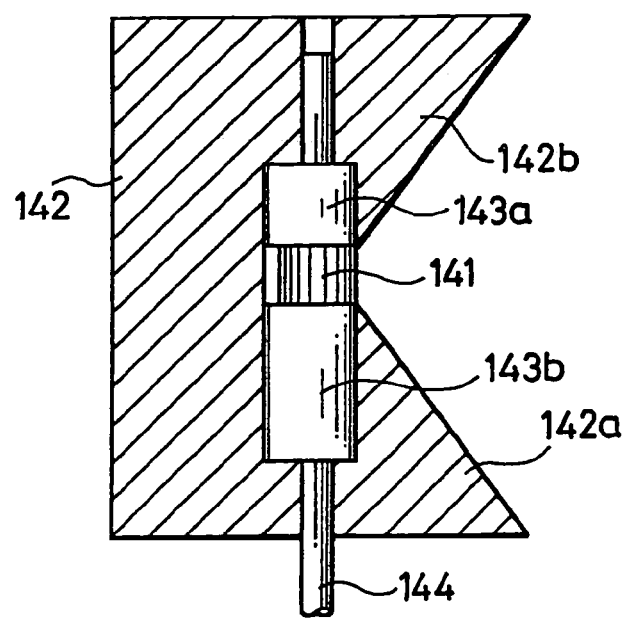

FIGS. 22A and 22B show a transport roller according to a third embodiment of the present invention. A transport roller 140 has an arrangement in which only a cushion member 141 that contacts with the outer peripheral edge of the optical disk D can rotate freely. Specifically, the transport roller 140 comprises a roller-like cushion member 141 and a holder 142 for rotatably holding this cushion member 141. The holder 142 includes a lower support portion 142a of a cone shape whose upper portion is decreased in diameter and an upper support portion 142b of a cone shape whose lower portion is decreased in diameter. A space S is set between the two support portions 142a and 142b. The cushion member 141 is rotatably interposed in this space S.

Bearing members 143a, 143b are disposed on the upper and lower of the cushion member 141. The cushion member 141 is fixed by a rotary shaft 144 that extends through the lower support portion 142a to the upper support portion 142b together with the bearing members 143a, 143b and thereby the cushion member can be rotated unitarily. This transport roller 140 can be used as a fixed-side transport roller. In that case, the cushion member 141 should be fixed so that this transport roller becomes unable to rotate.

While the present invention has been described so far, it is needless to say that the present invention is not limited to the above-mentioned embodiments. While the disk recording and reproducing apparatus capable of recording (writing) information recorded on the optical disk and reproducing (reading) information from the optical disk as described above, it is needless to say that the present invention is not limited thereto and that the present invention is applied to a recording disk recording apparatus capable of only recording information or a reproducing disk reproducing apparatus capable of only reproducing information.

Further, while the present invention is applied to a disk recording and reproducing apparatus capable of using both the 8 cm-optical disk and the 12 cm-optical disk as described above, it is needless to say that the present invention is not limited thereto and that the present invention is applied to other optical disks of other sizes.

As described above, the present invention is not limited to the above-mentioned embodiments and can be variously modified without departing from the gist of the present invention.

INDUSTRIAL APPLICABILITY

As described above, according to the disk recording and/or reproducing apparatus of the present invention, since the disk-like recording medium can be transported between the disk loading portion and the disk entrance and exit slot by slightly touching the outer peripheral edge of the diametrical direction of the disk-like recording medium and has no members that contact with the signal recording surface of the disk-like recording medium, foreign matters can be prevented from being pressed against the signal recording surface, the signal recording surface can be prevented from being scratched by foreign matters, the disk-like recording medium can be reliably supported by three points of the pair of transport rollers and the support lever so that the disk-like recording medium can be transported to the predetermined position with high accuracy, and an information signal that was recorded beforehand can be read out from the optical disk and a new information signal can be written in the optical disk reliably.

Further, except when the disk-like recording medium is inserted into and ejected from the disk recording and/or reproducing apparatus, dusts can be reliably prevented from entering into the housing by reliably closing the disk entrance and exit slot. Further, when the disk-like recording medium is inserted into and ejected from the disk recording and/or reproducing apparatus, resistance force of the gate cover can be changed in response to the direction in which the disk-like recording medium passes the gate cover. Therefore, when the disk-like recording medium is inserted into the disk recording and/or reproducing apparatus, the disk-like recording medium can be easily inserted into the disk recording and/or reproducing apparatus. On the other hand, when the disk-like recording medium is ejected from the disk recording and/or reproducing apparatus, the user can hold the disk-like recording medium that was pulled out in somewhere of the disk entrance and exit slot. There can be removed a risk that the disk-like recording medium will drop from the disk entrance and exit slot unintentionally.

The invention claimed is:

1. A disk recording and/or reproducing apparatus comprising:
    a housing having a disk entrance and exit slot into and from which a disk recording medium is inserted and ejected;
    a gate member on said housing so as to cover said disk entrance and exit slot; and
    a disk transport mechanism for transporting said disk recording medium so that said disk recording medium passes said disk entrance and exit slot,
    wherein said gate member includes a gate cover for closing said disk entrance and exit slot and which includes (i) a recess slot through which said disk recording medium passes and (ii) a plurality of slits provided on said gate cover and that extend in the direction parallel to said recess slot, the slits for changing resistance force of a recess slot peripheral edge portion that contacts said disk recording medium when said disk recording medium passes said recess slot in response to the direction in which said disk recording medium passes said recess slot.

2. A disk recording and/or reproducing apparatus according to claim 1, wherein said gate cover is formed of a material selected from a cloth, a synthetic resin sheet or synthetic resin film having flexibility, and a flexible rubber sheet.

3. A disk recording and/or reproducing apparatus according to claim 1, wherein said recess slot of said gate cover is provided with a crossing recess slot extending in the direction perpendicular to a longitudinal direction at proper positions in said longitudinal direction of said recess slot.

4. A disk recording and/or reproducing apparatus according to claim 3, wherein said gate cover includes a first support member and a second support member, which is larger than the first support member in diameter, which is formed by said crossing recess slot.

5. A disk recording and/or reproducing apparatus according to claim 1, further comprising a frame attached to one surface of said gate cover and whose inner peripheral edge portion is extended up to the portion nearer to said recess slot than said slits.

6. A disk recording and/or reproducing apparatus according to claim 5, wherein said frame is located on said gate cover at its side opposite to said housing so that resistance force produced when said disk recording medium is inserted into said housing decreases and resistance force produced when said disk recording medium is ejected from said housing increases.

7. A disk recording and/or reproducing apparatus according to claim 5, wherein said slits are set to positions distant from said recess slot rather than a peripheral edge of an opening portion of said frame.

8. A disk recording and/or reproducing apparatus according to claim 5, wherein said disk transport mechanism rotatably transports said disk recording medium.

9. A disk recording and/or reproducing apparatus according to claim 1, wherein said gate cover includes a first support member and a second support member, the second support member being larger than the first support member in diameter.

10. A disk recording and/or reproducing apparatus according to claim 1, wherein said slits make said resistance force produced when said disk recording medium is inserted into said housing decrease and resistance force produced when said disk recording medium is ejected from said housing increase.

11. A disk recording and/or reproducing apparatus according to claim 1, wherein said disk transport mechanism rotatably transports said disk recording medium.

* * * * *